(12) United States Patent
Persaud

(10) Patent No.: US 10,743,525 B2
(45) Date of Patent: Aug. 18, 2020

(54) ROD THAT TRAPS CREATURES SAFELY AND MONITORS THEIR WELL-BEING

(71) Applicant: Gwenevere Persaud, Winnetka, CA (US)

(72) Inventor: Gwenevere Persaud, Winnetka, CA (US)

( * ) Notice: Subject to any disclaimer, the term of this patent is extended or adjusted under 35 U.S.C. 154(b) by 117 days.

(21) Appl. No.: 16/152,410

(22) Filed: Oct. 4, 2018

(65) Prior Publication Data

US 2020/0107526 A1 Apr. 9, 2020

(51) Int. Cl.
| | | |
|---|---|---|
| *A01K 63/02* | (2006.01) | |
| *B65D 81/22* | (2006.01) | |
| *G01K 1/02* | (2006.01) | |
| *B65D 85/50* | (2006.01) | |

(52) U.S. Cl.
CPC .............. *A01K 63/02* (2013.01); *B65D 81/22* (2013.01); *B65D 85/50* (2013.01); *G01K 1/02* (2013.01)

(58) Field of Classification Search
CPC ......... A01K 63/02; B65D 81/22; B65D 85/50
See application file for complete search history.

(56) References Cited

U.S. PATENT DOCUMENTS

| | | | |
|---|---|---|---|
| 6,505,431 B1* | 1/2003 | Christian | ............... A01K 91/08 43/19.2 |
| 2015/0080904 A1* | 3/2015 | Kovarik | ............... A01K 15/003 606/113 |

* cited by examiner

*Primary Examiner* — Kristen Matter

(57) ABSTRACT

This invention includes several variations of a machine for catching small creatures unharmed, particularly small fish and other aquatic creatures. Most embodiments include a hollow container, attached to a specially designed fishing rod via an insulated fishing line containing electrical wires. The user can lower the insulated fishing line into water and wait for a creature to swim into the hollow container, then the user can use electronic controls to remotely snap the hollow container shut, hopefully trapping the creature alive and unharmed within. The invention also makes a fun and interesting tool for children. Embodiments of the invention include the ability to monitor the temperature and other conditions inside the container, and also the ability to communicate remotely with the container, and monitor the conditions therein, through a program downloaded on the user's computer or phone.

28 Claims, 58 Drawing Sheets

ROD THAT TRAPS CREATURES SAFELY AND MONITORS THEIR WELL-BEING

DESCRIPTION OF THE RELATED ART

This application claims priority to U.S. Provisional Application 62/568,196, filed Oct. 4, 2017, and U.S. Design Application 29625336, filed Nov. 8, 2017, both of which list Gwenevere Persaud as their inventor, and both of which are hereby incorporated by reference in their entirety.

To transfer fish or other aquatic organisms between aquariums, or to take the fish out of an aquarium while the aquarium is being cleaned, a person must usually employ a net to catch the fish and move it to another aquarium. The inventor herein had to do this with her pet fish, Goldie, and this patent application is dedicated to Goldie.

Fish and most aquatic creatures draw their oxygen from water, so being out of water is potentially hurtful to them. If an aquatic organism, such as a fish, is taken out of water while being moved between aquariums, this risks damage to the fish, or other aquatic organism. The present invention circumvents this problem by catching the aquatic organism without harming it, and keeping the aquatic organism in water while transferring it between aquariums. The present invention can also monitor the temperature and other conditions within the water immersing the aquatic organism, while the aquatic organism is being transferred. This is important for fish that require specific temperature ranges or other specific conditions.

The present invention also allows the user to catch wild fish or other aquatic creatures without harming them, which is useful to a person trying to harvest living wild fish to display in an aquarium. It can also be useful to enthusiasts trying to capture other aquatic creatures, such as tadpoles, without harming them, or to move fish eggs, amphibian eggs, or the eggs of other aquatic or semiaquatic creatures without harming the eggs.

Students at elementary schools such as Canterbury Elementary School, in Arleta, Calif., where the inventor has attended elementary school, would find this invention useful for helping take care of their classroom pets, or for capturing creatures such as tadpoles or items like frog eggs to observe in the classroom.

Embodiments of the invention can also be used to catch land creatures such as mice or insects. The invention can also be used by insect enthusiasts who wish to create collections of live insects, or capture insects without harming them. In principle, the invention could also be used to catch a bird or bat, unharmed, by waiting for the bird or bat to fly into the open container ball and then closing the container ball. The principle for catching both land and water creatures is similar: The user waits for the two halves (or all the parts of the container ball, if the container ball is divided into more than two parts), of the container ball (6) to surround the creature, and then the user commands the two halves (or all of the parts, if there are more than two part) of the container ball (6) to close in on each other and shut, surrounding the creature, unharmed, inside the container ball. This may be accomplished in most embodiments by waiting for the creature to walk, or swim, in between the two halves of the container ball. In some embodiments, there will be a light, or bait, between the two halves of the container ball, encouraging the creature to come between the two halves, so it can be caught. In some embodiments, there will be a motion sensor, which will detect when a creature has moved between the parts of the container ball, and a processor will then cause the container ball to shut.

In some embodiments, the user can monitor conditions inside the container ball, and to some extent control those conditions, using an "app" or other program, on a PC or phone, or a program stored on a processor within the handle, container connection device, or container ball.

For example, detectors which protrude into the container ball, and monitor the conditions inside the container ball (The measured parameters) and which are directly or indirectly connected to the main wire group can send information about those conditions, via the main wire group, to a processor in the handle. This processor in the handle can be connected to digital gauges in the handle, which will display the values of the measured parameters received by the processor in the handle.

Some parts of some embodiments of the invention will be coated with solar panels, which will provide power to those embodiments of the apparatus.

The drawings of this patent application will show handles, long rods, main wire groups, and container balls of a certain size, relative to the other components of the invention, but versions of the invention, including the embodiments herein, will function effectively with handles, main wire groups, reels, wire holding rings, and container balls and other components, of different sizes, relative to other components of the invention, than those portrayed herein. For example, an embodiment of the invention could include a main wire group and/or a long rod much longer than those portrayed herein.

Inventions of the Prior Art and their Differences from the Present Invention Zheng et. al. disclosed a fishing drone at U.S. Pat. App. Pub. No. 20180111669. This is different from the present invention, because Zheng's invention is clearly designed to catch fish in the traditional manner. There is nothing in Zheng's invention comparable to the container ball, which can hold fish without harming them. The fishing ball (41) of Zheng's invention is also different from the container ball of the present invention, because Zheng's fishing ball is not hollow, and is designed to catch fish in the traditional manner.

Curcio disclosed a fish catch-and-release device at U.S. Pat. App. Pub. No. 20170339932. Curio's device works on different principles from our invention, and does not have the capacity to trap a fish, alive, the way our invention does.

Saxton et. al., in Application no. 20180028929, disclosed a ball-shaped toy, but this is not designed to be hollow enough to include a fish, is different from the present invention, and does not include the components that allow a user to hold the invention like a fishing rod and reel in, or out, the container ball as needed.

Harrell, in U.S. Pat. App. Pub. No. 2017055510, disclosed a fishing rod with a buoyant part, but the structure of this fishing rod, as disclosed in Harrell's drawings, is clearly very different from the structure of the fishing rod in our invention.

Goosey in U.S. Pat. App. Pub. No. 20170055507 disclosed a buzz baiting fishing lure system, but our invention includes components, such as the container ball, that are not present in Goosey's invention.

Birger and Zeev, in U.S. Pat. App. Pub. No. 20160316726, disclosed a floating habitat for growing fish, but that is different from the present invention, because the present invention includes the ability for remote computerized control of conditions within the container ball, and also includes the fishing rod, which Birger and Zeev's invention does not include.

Kovarik et. al. describe apparatuses for gripping and cleaning up pet waste, in U.S. Pat. App. Pubs No. 200150052798 and 20150080904, but these apparatuses do not include the ability to give electronic commands to the container ball, or control the conditions inside the container ball.

Kovarik et. al. also describe a tool for netting fish at U.S. Pat. No. 8,985,659, but that tool is very different from the present invention, because the present invention uses insulated electronic components, and also specifically can trap the fish along with water inside the container ball, while Kovarik's invention does not have this capability.

Utter et. al. in U.S. Pat. App. Pub. No. 20020168229, describe an artificial reef with a large number of flexible balls, linked by a cable and a flotation device, but the present invention is very different from this because the container ball in the present invention is designed to close when desired. Utter's invention also does not include the ability to control conditions inside the container ball by means of a faraway program running on a device such as a cellular phone, and indeed Utter's invention could not include such a capability, because cellular phones in 2002 mostly did not have the ability to run such programs.

Rucker, et. al., in U.S. Pat. No. 9,789,388, describe a toy apparatus including a claw for grabbing other toys, but this is different from our present invention, which is designed to capture living creatures alive and unharmed. This is different from Rucker's invention, because the parts of our invention are designed to avoid touching a living creature, when moving it, while in Rucker's invention, the claw must grab the living creature in order to move it.

Wireless Charging

Apple watches, introduced in 2014, have inductive charging capability. So do various devices using the "Qi" standard.

In inductive charging, power is transferred, using electromagnetic induction between two devices that are not physically connected. Embodiments of the present invention allow for charging ports on the container ball (6), container connection device (5), and handle, and potentially other locations, to receive power from nearby wireless stations, and use this power to charge any batteries located in the container ball, container connection device, or handle, or elsewhere in the apparatus. For example, each of the charging ports can contain an induction coil that absorbs power from a magnetic field created by a second induction coil in a wireless charging station.

The mechanics of "Resonant inductive coupling", which increases the range of wireless transmission, are also known in the prior art. The charging ports (20) can use resonant inductive coupling to receive electrical charge from charging stations over a longer distance.

For example, a wireless charging port in the handle can be connected directly to a battery in the handle, and also connected to the main wire group, and then indirectly connected, via the main wire group, with batteries located in the container connection device and container ball, which feed power to processors located in the container connection device and container ball, respectively.

Some embodiments of the apparatus use "USB type C" charging ports as the charging ports (20). "USB type C" charging is common in devices such as cellular phones and many other devices that are powered through USB ports. However, any part of the apparatus that uses an open USB type C charging port should not be immersed in water, because this might damage the charging port. Therefore, embodiments of the apparatus that use an open "USB type C" charging port will have limited utility.

Other embodiments of the apparatus will use the same type of charging port as an "Iphone" does, at the time of this writing, a USB type "B" charging port, or another one of the charging ports known in the prior art.

In some embodiments, the charging port will be covered by a cover which will keep water out, and which can be opened or closed. This protects the charging port from water damage. Versions of the invention using USB type "C" or type "B" charging ports, for example, might have this feature.

A combination of different types of charging ports, such as USB type "C" charging ports in some components and a USB type "B" charging port in one or more other components, with all charging ports connected to batteries in the apparatus, is also possible.

SUMMARY OF THE INVENTION

The invention comprises a group of related apparatus and computer programs that operate in tandem with the apparatus. The most basic embodiment of the apparatus includes a handle (1), which the user can grip with one or two hands. The handle in the first embodiment also includes electronic components, such as the cord control and a container control which tells the container ball when to snap shut, and when to open. Some embodiments of the apparatus, such as the first embodiment, will also include a reel control so that the user can wind the reel, without having to do so by hand. The handle can include controls for other components in embodiments which include other components that require controls. For example, the handle can include a light control, in embodiments with a light in or near the container ball (6). These controls do not need to be electronic in nature, but preferably should be.

The long rod (2) protrudes out of the handle, and wire holding rings (8) are attached to the long rod in the first embodiment. Other embodiments might not have wire holding rings attached to the long rod. The main wire group (3) is a group of insulated electrical wires. In most embodiments, these wires will be separately insulated to prevent signals from being accidentally transferred between them, and then the combined group of wires will be bound by another set of insulation so that the electrical wires together form one cord, which is the main wire group, and is bound together by the second set of insulation. The main wire group extends out of the handle, along the long rod, and in the first embodiment, the main wire group is threaded through the wire holding rings. The main wire group then extends beyond the end of the long rod, so that the user can hold the apparatus by the handle, allowing the portion of the main wire group beyond the end of the long rod to be pulled down by gravity.

The handle (1) in the first embodiment will also include a reel, and a reel control. Part of the main wire group will generally be wound around the reel. The user can wind the reel to increase or reduce the portion of the main wire group that extends beyond the end of the long rod. Essentially, the user can use the reel control to wind the reel, and wind more of the length of the main wire group around the reel. The user can also use the reel control to wind the reel in the opposite direction, allowing more of the main wire group to extend outwards.

The reel control, container control, and cord control and other controls can each also include multiple buttons, dials, or other types of components known in the prior art to have satisfactory characteristics to serve as controls or parts of controls.

One example comprises an apparatus with a button for "close", and another button for "open" on the container control, and a button for "clockwise" and another button for "counterclockwise" on the reel control, and a button for "close", and another button for "open" on the cord control. The buttons for the container control, in this example, would be connected by wires to a processor which controls the electromagnets, the buttons for the reel control would be connected by wires to the reel, and the buttons for the cord control would be connected by wires to a processor that controls the linking mechanism (probably the same processor that controls the electromagnets). This processor can be in the handle or elsewhere.

The long rod (2) and the handle (1) should preferably be composed of plastic, or another substance which does not conduct electricity and does not allow water to penetrate to the electric and electronic components of the invention.

The end of the main wire group in the first embodiment includes a container connection device (5), which connects both halves of the container ball (6), and also connects to the main wire group. In most embodiments, the container connection device (5) will also include components that allow the two halves of the container ball to either move together and close, or to separate and only be connected on one end.

The container connection device also includes at least one connection for the main wire group, which will allow the main wire group to hold up the container connection device and container ball. In some embodiments, the container connection device will include a small electronic component (a processor (13)) that provides an electronic connection from both of the two halves of the container ball to the main wire group, and which directly connects to the main wire group. In some embodiments, the container connection device contains a mechanical component, which, upon receiving appropriate commands from the handle or elsewhere, can help snap the two halves of the container ball together on demand, or move them apart.

The Container ball (6) is hollow, and is split into two halves in most embodiments. These two halves can come together to form a hollow sphere, and trap a creature, such as a fish, inside, without harming the fish. These two halves are normally split apart, and both connected on one end, allowing creatures to move into the gap between the two halves. The halves are both also connected to the container connection device (5) on this end, in the first embodiment.

In the first embodiment, the two halves of the container ball (6) each contain electromagnets, which are only activated, allowing them to exert magnetic force, when the user commands them to be activated via the container control. When the user uses the container control to command the electromagnets to be activated, the container control communicates with a processor located in the handle, in the first embodiment, and this processor then communicates by sending impulses over the main wire group to a second processor in the container connection device. This second processor activates the electromagnets in the container ball. The electromagnets in each half of the container ball are located close to the edge of that half, so that when the two halves come together, the electromagnets are closest together. The electromagnets will be positioned, in most embodiments, so that a row of electromagnets is located in one half of the container ball, while a row of electromagnets at approximately the same positions will be located in the other half of the container ball. For example, both halves of the container ball may have electromagnets spaced every fifteen degrees, or every ten degrees, etc. Both halves of the container ball could also have continuous electromagnetic rings that act as the electromagnets.

The edge of each half of the container ball borders on the gap, over which the container ball opens. In most embodiments, the electromagnets will be positioned so that the pole of each electromagnet, closest to the edge of the half of the container ball containing that electromagnet, will be oppositely charged from the pole closest to the edge of the opposite half of the container ball of an electromagnet positioned at approximately the same position as the first electromagnet, but in the other half of the container ball. This will allow oppositely charged poles of electromagnets in the two halves of the container ball to be close together when the container ball is closed.

When the electromagnets are activated, they exert magnetic force on each other, creating force on the two halves of the container ball, which causes the two halves of the container ball to snap together, trapping the animal inside.

Some embodiments of the apparatus can include both the electromagnets in the container balls and the mechanical component, within the container connection device. The mechanical component will also help snap the two halves of the container ball together when desired. The linking mechanism (18) is one example of such a mechanical component.

All components of the apparatus should ideally have a waterproof surface, especially the container ball (6). All parts of the apparatus should also be electrically insulated in a way that prevents electricity from flowing from the apparatus into the water.

The figures will show main wire groups, long rods, external reels, handles, and wire holding rings of a certain size relative to the other components of the apparatus, but in reality the main wire group, long rod, external reel, handle, and wire holding rings can each be any size relative to the other components of the apparatus, provided that each component of the apparatus is strong enough to fulfill its required tasks, and to support the components that it is supposed to support.

A simpler embodiment can be created, without a processor in the handle, in which the container control directly triggers an electromagnetic impulse that is transmitted through the main wire group to a processor in the container connection device, or the container ball, where this processor then turns off, or turns on, the electromagnets. In this embodiment, the cord control will communicate directly with the container connection device or container control. The reel control will also directly control the reel, so that a user who presses the reel control will cause the reel to wind clockwise, if desired by the user, or counterclockwise, if desired by the user.

Alternatively, the container control can directly control the electromagnets without the aid of any intervening processors, provided that the container control connects to the main wire group, and the main wire group directly connects to the electromagnets. Then, the user can use the container control to directly send an impulse to the electromagnets, to turn them "on" (where their poles attract the opposite poles of other magnets) or "off" (where their poles do not attract the opposite poles of other magnets). The cord control can also be directly connected to the main wire group, with the main wire group directly connected to the linking mechanism (18), so that the user can manipulate the cord control to send a message directly to the linking mechanism (18).

A version of the apparatus with a hand-driven reel, and with the container control directly controlling the electromagnets, and with the cord control directly controlling the linking mechanism, is possible.

A version of the apparatus with a hand-driven reel, and with the container control directly controlling the electromagnets, and without a linking mechanism, is also possible.

Some Important Information about the Electromagnets

The electromagnets are designed for their magnetic power to be increased when they are being powered with electricity (Turned on). The electromagnets should preferably have negligible magnetic power when they are turned off. The electromagnets are also embedded within the wall of the container ball, in the first embodiment. Between the edge of each half of the container ball, and the electromagnets themselves, there should also be a thin layer, which will be part of the substance of that half of the container ball. This ensures each of the electromagnets is surrounded by the substance of the wall of the container ball, and prevents the electromagnets from directly contacting water outside. It is recommended that the electromagnets, and indeed all components that are through which electricity moves, in every embodiment of the invention, be insulated, to protect them from direct contact with water.

Term Numbers

Handle (1). Long rod (2). Main wire group (3). External reel (4). Container connection device (5) Container ball (6). Control panel (7). Wire holding rings (8). Light (9). Detector (10). Faraway Program (11). Parameter influencer (12). Battery (13). Solar cell (14). Food compartment (15). Receiver (16). Transmitter (17). Linking mechanism (18). Processor (19). Charging port (20). Container ball latch (21).

The detectors each detect the value of one or more measured parameters inside the container ball. The parameter influencers each influence the value of one or more measured parameters inside the container ball, for example, a temperature control can cause the temperature inside the container ball to rise until it reaches a desired level.

A receiver receives wireless transmissions, and a transmitter makes wireless transmissions.

Variations of the physical apparatus can include the handle(s) (1), long rod(s) (2), main wire group(s) (3), external reel(s) (4), container connection device(s) (5), container ball(s) (6), control panel(s) (7), wire holding rings (8), light(s) (9), detectors (10), parameter influencers (12), batteries (13), solar cells (14), food compartments (15), receivers (16), transmitters (17), linking mechanism(s) (18), and processors (19). Some versions of the apparatus might include processors programmed with the faraway program (11).

The Handle

In the first embodiment of the invention, the handle contains an internal reel, on which is wound the main wire group. This internal reel is necessary in this embodiment so that the user can extend or retract the main wire group when needed. The internal reel should generally be controlled via a reel control, which can be comprised of buttons, in the handle, or may take another form. In the first embodiment, the user can use these controls to tell the internal reel to wind in either direction and retract or extend the main wire group, thus increasing or decreasing the portion of the main wire group that is extended away from the reel.

The handle will also usually contain a power source for the handle, and this power source may be connected to other parts of the device. This power source may be a battery, or may be solar panels, on the outside of the handle, connected to a battery, or may be a connection port for an electrical cord, or another power source. The handle may also contain a battery and one or more other power sources, such as solar panels or a charging port, that preferably recharge the battery. Wireless charging of the battery in the handle, via a charging port capable of wireless charging, is possible.

In some embodiments, the battery and/or other power sources will connect to the internal reel, the controls, the main wire group, and any other components that require electrical power to operate.

Alternatively, the other power sources will connect to the battery, which will connect to the internal reel, the controls, the main wire group, and any other components that require electrical power to operate.

In other embodiments, the other power sources will connect to the internal reel, the controls, the main wire group, and any other components that require electrical power to operate, and the battery will separately connect to the internal reel, the controls, the main wire group, and any other components that require electrical power to operate.

In some embodiments, the internal reel will be controlled manually by a hand lever which is attached to the outside of the handle, or the internal reel can be switched between manual and electronic control.

Some embodiments of the handle will include an external reel (instead of an internal reel), on which the main wire group will be wound. In some embodiments, the user can hand-wind this external reel, the same way that a reel is wound on normal fishing rods. In other embodiments, the external reel can be controlled by an electronic reel control, in the same manner that an internal reel is controlled by an electronic reel control in other embodiments.

In one version of the first embodiment, the controls in the handle, including the reel control, will be connected to a processor in the handle, and the processor will control a small motor that turns the internal reel either clockwise or counterclockwise, as desired by the user. The main wire group will be wound on the internal reel. The processor and buttons will also be connected to a battery, and the battery will be connected with a charging port.

The drawings will largely show handles of a certain shape, but the handle can be of a different shape. The drawings will also show control panels of a certain shape, but control panels can be of a different shape, and each control panel can have more or less than four buttons, or other controls. In addition, the handle can have screens, digital gauges, charging ports, or other features in some embodiments. The control panel can also have screens, digital gauges, charging ports, or other features in some embodiments that include the control panel.

The Controls in the Handle

The handle may include a reel control, cord control, container control(s), and possibly other controls, depending on the embodiment of the invention being used. For example, in some other embodiments, there may be a Light control, Alert light control, Temperature control, controls for the parameter influencers (12), food compartment control, and external reel control. The measured parameter controls can include, but are not limited to, controls for temperature, Ph, fluoridation, oxygen, and salinity, and nitrate and nitrite levels.

In the first embodiment, which includes the reel control, cord control, and container control(s), these controls are all buttons that each operatively connect to a processor in the handle. The connection may be made via any means known in the prior art, including wires between the reel, cord, and container controls and the processor in the handle. The processor is also connected to a small motor which controls the reel, and connects to the main wire group, through which the processor sends electrical impulses to the container ball. When a user presses the reel control in the first embodiment, the reel control sends an impulse to the processor, which causes the reel to spin clockwise or counterclockwise, increasing or decreasing the part of the main wire group wound around the reel, and increasing or decreasing the length of the part of the main wire group that extends beyond the handle. When the user presses the cord control, in the first embodiment, the cord control sends a message to the processor, which sends an impulse via the main wire group to the linking component. This message causes the linking component (18) in the container connection device to push the two halves of the container ball together. When the user presses the container control, in the first embodiment, the container control will send an impulse to the processor, which in turn sends power via the main wire group to the container connection device, where this power is distributed to the electromagnets, causing the container ball to close. The processor can also send an impulse via the main wire group to the container connection device, causing the electromagnets to lose power, so that the container ball can open.

In some versions of the main wire group, the processor in the handle will send commands, in the form of impulses, via the main wire group, to another processor in the container connection device or the container ball (or processors in both components). The processors in the container connection device or the container ball will then send these commands to the components within the container connection device or container ball that are supposed to fulfill these commands. For example, the processor in the handle may send an impulse to a processor in the container connection device, saying that the electromagnets should be activated to close the container ball. The processor in the container connection device will then activate the electromagnets, closing the container ball.

In theory, the reel control could connect directly to the reel, and/or the container control could connect directly to a wire within the main wire group, which in turn would connect the container control directly to the electromagnets, and the cord control could connect directly to a wire within the main wire group, which would connect the cord control to a mechanism (The linking mechanism) within the container connection device that will mechanically open and close the container ball when desired. This will fulfill the functions of the first embodiment, but is not preferred.

Alternatively, the container control and cord control could be directly connected, without an intervening processor, to wires within the main wire group, which, in turn, will be directly connected to a processor elsewhere, such as a processor within the container connection device or container ball. This processor would then tell the relevant components (usually the electromagnets) to open or close the container ball in the way desired by the user, in the manner described in this patent application. The inventor believes that more complex embodiments, that use a processor in the handle, will be desired by most consumers.

The container control, and the cord control, can be designed to open and close the container ball quickly, or to open and close it at a speed controlled by the user. For example, the container control and cord control may be dials, that the user turns as he or she wishes to allocate more power to the tasks these dials control. The processor that controls the power flowing to the electromagnets can also increase the amount of power flowing to the electromagnets gradually, if the container control is designed with the ability for the user to gradually increase or decrease the amount of power being allocated to the electromagnets (For example, if the container control is a dial).

The controls are part of the control panel, in the first embodiment.

The handle, can also include an alarm, operatively connected to the processor in the handle so that this processor can activate the alarm. In some embodiments, the processor in the handle is programmed with a feature that causes the alarm to make noise when an event happens: For example, when the value of one of the measured parameters exceeds the tolerance limits, or alternatively the optimum range, for a measured parameter for the type of creature currently trapped within the container ball, or when one of these measured parameters exceeds a certain absolute point, as measured by the detectors.

The processor in the handle, after receiving input from the detectors (10) would determine when the conditions for the alarm to make noise have been met.

In another embodiment, when the user triggers a control for a component located in the container ball or container connection device, the processor in the handle will send a wireless impulse to another processor, in the container connection device and/or the container ball, and this processor will cause the component that the triggered control controls to act. The second processor should be closer than the first to the component controlled by the triggered control. For example, the processor in the handle can send a wireless impulse to a receiver in the container connection device, which is connected to a processor in the container connection device that will control the electromagnets directly and be able to send power to the electromagnets to cause them to close when desired.

In some versions of this embodiment, the processor in the handle will be connected to a receiver and a transmitter, and processors in the container connection device and container ball will also be connected to receivers and transmitters. The processor in the container ball will also be connected to detectors and measured parameter influencers, located in the container ball. The processor in the handle will send commands wirelessly, using the transmitter to which it is connected, to the processors in the container connection device and container ball. These commands will include commands from the controls, telling each of the measured parameter influencers to change the measured parameters it influences, such as telling the temperature influencer to raise or lower the temperature in the container ball. The processors in the container connection device and container ball will use the transmitters to which they are connected, to send information to each other, and to the processor in the handle. This information will include the values of the measured parameters, that the detectors are detecting. Each processor will be connected to a receiver, so each processor will receive wireless signals broadcast by the other processors.

Multiple processors, in different areas of the apparatus, can communicate with each other by every other method known in the prior art.

Wireless Charging of the Handle

The handle, in some embodiments, can have a charging port, which will be operatively connected to the battery in the handle, by a wire internal to the handle, or by other means. The charging port will be able to feed power to the battery in the handle, to recharge the battery.

The charging port (20) can be a plug-in port, a USB type C port, another type of USB port, or can be another one of the types of charging ports known in the prior art.

The charging port can also be a wireless charging port, by which electrical power is received into the charging port via inductive charging.

Alternatively in another embodiment, the charging port in the handle can be operatively connected to multiple batteries, in the handle and other locations. These connections may be via the main wire group, especially with batteries located outside the handle, or may be via a more direct connection, especially with batteries located inside the handle. This way, electric power received through the charging port can charge all the batteries to which the charging port is connected, including the battery in the handle and other batteries.

The charging port can also be operatively connected, by the main wire group or by other means, to batteries located outside the handle.

The compartment containing the battery, within the handle, can also opened and closed, with the battery itself being removable, in some embodiments, so that the battery can be easily replaced if needed.

The detectors, linking mechanism, and parameter influencers, and other components that use electricity, can theoretically be directly connected to the charging port in the handle and/or any other charging ports in the apparatus, so that power flows directly from the charging port(s) to the components that use electricity.

Programming of the Processors in Certain Embodiments

In some embodiments where detectors feed information about the measured parameters to the processor, in the handle, this processor, will need to be programmed with a version of the faraway program. Specifically, the processor will be programmed with an input module, a comparison module, a creature database, and an output module.

The input module will receive information about the values of the measured parameters from the detectors. The comparison module will access the creature database, and will compare the received values of the measured parameters to the optimum range and tolerance range for the specific type of creature inside the container ball. The comparison module will be programmed to keep the values of the measured parameters inside either the optimum range or the tolerance range for the type of creature within the container ball. The output module will send impulses to the measured parameter influencers, to cause each measured parameter influencer to change the value of the measured parameter it influences, and move the value of that measured parameter back within the optimum or tolerance range for that creature.

The Main Wire Group

The main wire group is an electrically insulated cord, containing a group of one or more wires. The main wire group, in most embodiments, starts in the handle, moves out of the handle, and continues along the long rod (2), and then continues beyond the end of the long rod (2), and connects to the container connection device (5). The main wire group, in most embodiments, transmits electrical impulses, commands, and power, from the handle to the container ball, container connection device, and also to a light inside the container ball, in those embodiments which possess such a light.

In most embodiments the main wire group shall be configured to receive and transmit commands, in the form of electrical impulses, from each electronic component inside the handle which commands a component in the container ball or container connection device, and also from the light control that commands the light in the eleventh embodiment. The main wire group will transmit each command to the component that is supposed to execute this command. For example, in the first embodiment, the main wire group can transmit the command to close the container ball from the processor to the container connection device, and the container connection device can then transmit power to the electromagnets, causing them to become attracted to each other, which will close the container ball.

In embodiments where information and/or power is supposed to be transmitted back from the container ball, or container connection device, to the handle, along the main wire group, the main wire group will have the ability to transmit this information and/or power, as well.

The main wire group should have the ability, in each embodiment, to transmit power and/or information from any of the components, connected to the main wire group, where this power and/or information is created, to any component, also connected to the main wire group, where the power and/or information is supposed to be received.

The main wire group can be configured in any of the ways known in the prior art.

For example, the main wire group can be configured with a separate wire extending from each control, to the component that this control is supposed to direct; E.G., the main wire group can include a wire extending from a light control on the handle directly to a light. The wires extending out of the various controls will each be insulated and will be brought together in the handle, and will emanate out of the handle together in the same insulated cord, which will be the main wire group. Each wire will then communicate from one control to one component.

The main wire group can also be configured to begin at a processor (13) in the handle, and to comprise multiple wires, which emanate out of the handle together in one insulated cord, and end at different components. One or more wires begins at the processor in the handle and ends at the light, one or more wires begins at the processor in the handle and ends at each of the detectors, and one or more wires begins at the processor and ends at the electromagnets, and other wires begin at the processor in the handle and extend to any one of the parameter influencers that is present, or to another component that is part of the container connection device, container ball, or branches out of the container connection device, or container ball. Each wire can therefore communicate with one component. The component wires of the main wire group will therefore begin at the processor in the handle, and each component wire will end at one component. In this configuration, the controls in the handle will each have a connection to the processor in the handle, to send commands to this processor, so that the commands can then be sent along the main wire group.

In theory, in this configuration and other configurations, components outside the handle could also have a connection to the processor in the handle, to send commands to this processor, which would then be transmitted along the main wire group.

The main wire group can also extend from the processor in the handle to a processor in the container connection device (or elsewhere in the apparatus). The processor in the container connection device will be connected with components that are part of the container connection device and container ball, and will be programmed to send each message received from the processor in the handle to the appropriate component, which is supposed to execute that message. For example, the processor in the container connection device can have a direct connection to the light in the seventh embodiment, and when the user uses the light control in the handle to turn the light "on", an impulse will travel from the light control to the processor in the handle, then the processor in the handle will send an impulse along the main wire group to the processor in the container connection device, which will then send an impulse to the light to turn "on". In this configuration, the controls in the handle will each have a connection to the processor in the handle, to send commands to this processor.

The main wire group can also extend from the processor in the handle to a processor in the container ball. The processor in the container ball will have a direct connection to certain components such as the parameter influencers. When the user uses the temperature control in the handle to change the temperature inside the container ball, an impulse will travel from the temperature control to the processor in the handle, then the processor in the handle will send an impulse along the main wire group to the processor in the container connection device, which will then send an impulse to the temperature influencer to change the temperature. In this configuration, the controls in the handle will each have a connection to the processor in the handle, to send commands to this processor.

The apparatus can also utilize more than two processors, for example, a processor in the handle, with direct connections to some components such as the controls, a processor in the container connection device, with direct connections to other components such as a light, and a third processor in the container ball, with direct connections to still other components such as a temperature control. In this configuration the main wire group can connect to all three processors and transmit commands between them, and send power to the processors in the container connection device and container ball if necessary. All three processors will be programmed to determine which component each command is intended for, and which processor that component most directly connects to, so that commands intended for components with direct connections to the processor in the container connection device will be sent, by that processor, to those components, and commands intended for components with direct connections to the processor in the container ball will be sent, by that processor, to those components.

Alternatively, the main wire group can be designed with other configurations known in the art.

In some embodiments, the main wire group will comprise one insulated wire.

In other embodiments, the main wire group will comprise one insulated wire that starts at the processor in the handle, but, which, when it reaches the container connection device, has a branch that connects to each component that is supposed to receive commands, such as separate branches heading to the detectors and the linking mechanism.

In other embodiments, the main wire group will comprise an insulated wire that does not start at the processor in the handle, but connects to that processor.

In some embodiments of the invention, such as those using detectors, information may need to be transmitted from detectors in the container connection device or container ball to the handle, so that the information can be displayed on digital gauges. For example, information about the Ph or temperature inside the container ball may need to be directly or indirectly (via a processor in the container ball or container connection device) transmitted from the detectors that measure Ph and temperature to the main wire group. The main wire group will then convey this information directly to the digital gauges in the handle, or to a processor in the handle, which connects with and transmits this information to, these digital gauges. The information gained by the detectors will then be transmitted from the detectors to the main wire group, and ultimately to the digital gauges where the information will be displayed. This can be done using the wire configurations listed in this application or known in the prior art.

The types of detectors listed in this patent application are not the only possible types of detectors. Other types of detectors are possible.

A configuration with processors in the container connection device and the container ball, where both processors are connected to components that transmit information or receive commands, and where the configuration also includes a processor in the handle, which is connected to controls and digital gauges, is also possible. The processors in the container connection device and container ball will each transmit information, from the components to which that processor is connected. The two processors will transmit information along the main wire group to the processor in the handle, which will send this information to the digital gauges, where the information will be displayed. The processor in the handle will connect to controls, and will transmit commands from these controls to the processors in the container connection device and container ball via the main wire group. The processors in the container connection device and container ball will be programmed to determine which command applies to which component, and the processor connected to the component to which each command applies will transmit the commands intended for each component to that component.

A configuration of the apparatus where there is no processor in the handle, but the controls and other components in the handle are connected, via the main wire group, to a processor elsewhere (such as the container connection device) is also possible. In one such configuration, an insulated wire would extend from each component in the handle, including the controls in the handle and these wires would come together to form the main wire group, which would connect to the processor in the container connection device, and allow the controls in the handle to send commands to that processor.

It is important that the main wire group be covered heavily with insulation, because the main wire group is intended to connect directly or indirectly to the container ball, which may be used in the water. Some types of plastic are sufficiently strong to serve as insulation for the main wire, and other materials may also serve for this purpose.

The Container Ball

In the first embodiment, the container ball includes electromagnets, which can be activated by the user. The user will activate the electromagnets, using a container control in the handle, and commands will travel over the wires in the main wire group to the container connection device. The electromagnets will then be activated, causing the two halves of the container ball to snap together.

The electromagnets, by themselves, are sufficiently powerful, when activated, to cause the two halves of the container ball to snap together, but the electromagnets are also helped by a mechanical component, within the container connection device, in some embodiments. This mechanical component can also cause the two halves of the container ball to snap together. The linking mechanism (18) is one example of such a mechanical component. A linking mechanism can utilize a slider-crank mechanism, gear drive, ratchet mechanism, cam mechanism, or Geneva wheel, among other methods, and can use one of the methods known in the prior art.

Other methods of causing the two halves of the container ball to snap together, on command, are also possible, and are also part of the present invention.

It is important to note that, in every embodiment, designs may be placed on the container ball, and the other parts of the apparatus, changing the visual appearance of these parts of the apparatus. For example, the container ball may be painted to look like a "pokeball" from the Pokemon franchise.

Some components, such as the detectors, and parameter influencers, can be connected directly to a processor in the container ball in some embodiments, and a processor in the container connection device in other embodiments.

The Container Connection Device

In the first embodiment, the container connection device will be pulled below the main wire group, by gravity, while the apparatus is in use. The main wire group will have one connection to the container connection device, and the two halves of the container ball (6) will be connected to, and will open below, the container connection device. In other embodiments, the two halves of the container ball (6) will be connected to, and will open to the side of the container connection device. In some of these embodiments, the main wire group will be connected to the container connection device at multiple points, so that the container connection device, and container ball, will not hang directly below the main wire group, but will hang at an angle to the main wire group, as shown in some of the drawings.

The Wire Holding Rings

The wire holding rings are mounted on the long rod (2), in the first embodiment. The main wire group is threaded through the wire holding rings in some embodiments. This is likely to make the main wire group easier to use.

The Control Panel

The control panel is present in certain embodiments of the invention. The control panel is a panel on the handle that contains controls (which may buttons or configured a different way), that control the reel, the main wire group, and the container ball, and possibly other components. For example, in the first embodiment of the invention, the control panel contains a button (container control) that the user can press to activate the electromagnets in the container ball, a button that the user can press to wind the reel, extending the main wire group, another button that the user can press to retract the main wire group (these two buttons comprising the reel control), and a button (cord control) that the user can use to activate the mechanical component within the container connector device, pushing the two halves of the container ball together.

Embodiments of the invention will function without a control panel, as long as these embodiments include another method of controlling the reel, and of controlling the components that cause the two halves of the container ball to snap together. For example, an embodiment of the invention could use controls that are buttons, mounted on the handle, to control these components, without these controls being part of a specific control panel.

Other controls can be located on the handle, in embodiments besides the first embodiment. All of these controls can be located on the control panel, if there is a control panel, and if there is not a control panel, these controls can be located on the handle. For example, if an embodiment includes parameter influencers (12), controls for the parameter influencers (12), may be located on the handle. These controls will enable a user to decide, for example, that the user wants to alter the conditions inside the container ball. If an embodiment includes a food compartment (15), a control for the food compartment can be located on the handle. If an embodiment includes a light, a control turning the light on or off, or specifying a power level for the light, can be located on the handle.

These controls can be dials, or buttons, or parts of a touch-sensitive screen(s). These controls may also take one of the other forms known in the prior art. For example, a control for the food compartment can be a button which the user presses whenever he or she wants the food compartment to open. The handle and control panel may be protected by a waterproof membrane, or have an outer layer that is otherwise waterproof, to protect them from water.

All digital gauges and all controls, and all touchscreens should be protected by a waterproof outer layer, regardless of whether the rest of the handle is so protected. The handle can function, but will be more vulnerable, if the digital gauges, controls, and touchscreens are not protected by a waterproof outer layer.

The digital gauges and controls can theoretically be located in various parts of the invention, with some controls and/or digital gauges located on the handle, and some controls and/or digital gauges located on other parts of the apparatus, as long as A. Every digital gauge is able to receive information, either directly or indirectly, from the detector that detects the measured parameter that the digital gauge measures, and B. Every control is able to communicate with the item(s) it is supposed to control, for example, every control for a measured parameter influencer can communicate with the measured parameter influencer for that measured parameter.

The controls can operate, by being connected with the processor (13) located in the handle. When the user manipulates one of the controls, that control will communicate with the processor, and the processor will be programmed to use the main wire group to communicate, either directly or indirectly, with the part of the apparatus controlled by the manipulated control, and to command that part of the apparatus to execute the desired task. For example, if the container ball contains a food compartment, the user desires to open the food compartment, and the food compartment control is a button, the user can press the button, and the food compartment control will send a message to the processor (13) located in the handle. This processor will then send a message, via the main wire group, to the processor in the container connection device. This processor will then relay the message to the processor in the container ball. The processor in the container ball will then open the food compartment.

In addition, the handle can contain gauges, including analog or digital gauges that are in direct or indirect communication with the detectors. Digital gauges are more likely to be used. Each of these digital gauges may be in communication with one detector, and will display the current value of the parameter that this detector measures. These digital gauges can be simple displays. For example, the digital gauge in communication with the thermometer (the detector measuring temperature) will display the temperature measured by the thermometer.

These digital gauges can also be part of the control panel.

Alternatively, the detectors can send information about the values of the measured parameters to a processor, which can send this information directly to the digital gauges, which will display this information. The detectors can also send this information to a processor that sends the information to one or more other processors, that send the information to be displayed on the digital gauges. These processors can communicate wirelessly, using transmitters and receivers, or communicate by using transmissions along the main wire group for all or part of their communication.

Additional Embodiments

The Second Embodiment

In the second embodiment, the container connection device is positioned so that both halves of the container ball are held by the container connection device at a 90-degree angle relative to the main wire group, while the apparatus is in use. Gravity causes the container connection device to fall directly below the main wire group, while the apparatus is in use. The main wire group will also be pulled straight down by gravity.

In some variations of the second embodiment, the main wire group is connected to the container connection device at multiple points. First, the main wire group will be connected to the container connection device at one point, and then the main wire group will extend further on to a second point within the container connection device. This will cause the second connection point to be pulled by gravity to a point below the first connection point. This helps to keep the container ball at a 90-degree angle, relative to the main wire group, when the container ball is lowered into a body of water.

The Third Embodiment

The third embodiment includes a small, waterproof light, placed between the two halves of the container ball, and also a control for the light, which turns the light on and off, on the handle. This embodiment also includes that the main wire group feeds power from the power source(s) in the handle to the light. When the light is on, some small creatures will be attracted to the light, and will come closer to investigate it, so that, when the container ball is open, these creatures will come between the halves of the container ball and be caught.

The Fourth Embodiment

The fourth embodiment includes a small, waterproof light, which is not placed between the two halves of the container ball, but is placed close to the container ball. The light may be attached to a separate cord which extends from the container connection device, or to a separate cord which extends from either half of the container ball. A wire to power the light will be part of this cord, and the cord will be insulated. The light will be positioned near to the container ball when the apparatus is in use, and will help attract creatures to the container ball.

The Fifth Embodiment

The fifth embodiment includes one or more small holes in the top of one of the halves of the container ball (6). This hole should ideally be in a location where the hole is also near the top of the container ball when both halves of the container ball are closed together. This helps exchange of air inside and outside of the ball, when the user has caught a creature that breathes air. This also helps to equalize water pressure inside and outside of the container ball, when the container ball is closed or closing, which may be useful in some circumstances when the container ball is being used in water. Some versions of the fifth embodiment include a cap for the hole, so that it can be closed when desired by the user. The cap can also be waterproof, and can make the small hole waterproof when it is capped.

The Sixth Embodiment

The sixth embodiment has a place for bait to be placed inside the container ball, between the two halves of the container ball, so that the creature the user is trying to catch will be drawn to the bait, while the container ball is open. Then, the user will cause the container ball to shut, trapping the creature unharmed. The bait should not be placed on a hook or on anything else that is harmful to the creature. Instead, the bait can be attached to a small blunt rod or another item that will not harm the creature when it takes the bait. There is no need for a hook in this apparatus, because the purpose of placing bait on a hook is to catch the quarry using the hook, and here the quarry is caught, preferably unharmed, using the container ball (6). Theoretically, a hook could be used, but the inventor does not recommend it.

The Seventh Embodiment

The seventh embodiment will utilize both bait, and a small waterproof light, which are placed between the two halves of the container ball. The light can be attached to a cord similar to the cord in the third embodiment, or can be part of the container connection device. Then, when the user is trying to use the container ball to catch a creature, the user's chances of success will be higher.

The Eighth Embodiment

In the embodiment, the long rod is hollow and the main wire group extends from the reel through a tunnel in the long rod, and is encased in this tunnel in the long rod, through the length of the long rod. This tunnel is wider than the main wire group, and is wide enough to allow the main wire group to move through the tunnel to be extended and retracted as needed. The main wire group comes out of the end of the long rod, and extends beyond the length of the long rod. This embodiment is designed so that the user can use the internal or external reel (depending on which is being used inside this particular version of the apparatus) to vary the extended length of the main wire group.

This embodiment will not need wire holding rings (8), because the main wire group is encased in the long rod.

The Ninth Embodiment

The container ball in the ninth embodiment is either mostly or completely made of transparent material, so that the user can see inside it, and easily see if he or she has caught a creature successfully, when using the container ball. The user can also see the creature inside, after it has been caught, and can monitor the health of the creature more easily.

The Tenth Embodiment

The tenth embodiment includes a transparent container ball, transparent long rod, and a transparent handle. The tenth embodiment can also utilize other transparent components, such as a transparent main wire group, and transparent wire holding rings. The main wire group can be made transparent by using a transparent insulation material, and either making the wires in the main wire group out of a transparent material, or arranging the wires so that they are thin relative to the diameter of the main wire group itself, and do not significantly obstruct the viewer's vision through the main wire group.

The Eleventh Embodiment

The eleventh embodiment includes an external reel (External to the handle) for the main wire group. The main wire group is wound along the external reel, and the user can extend or retract the main wire group as desired. The external reel can be controlled by an electronic control in the handle, or controlled by hand, as in traditional fishing rods, or controlled by an electronic control with the ability to switch to hand control, or vice versa.

This particular feature, the external reel, can be combined with any of the other embodiments of the invention discussed herein.

The Twelfth Embodiment

The twelfth embodiment includes a small, insulated wire, which splits off from the main wire group close to the container ball. The small insulated wire has a light at its end. This light is outside the container ball. The light can be turned on and off, via a control in the handle. The light may attract creatures to come close to the container ball.

The Thirteenth Embodiment

In the thirteenth embodiment, the controls on the handle are not part of a specific control panel, but are simply placed on the handle and send their inputs, via connections into the handle, to the relevant processor or other components. For example, some controls may be on the side of the handle, and others on the top of the handle, with a wire leading from each control to a processor inside the handle.

The Fourteenth Embodiment

Versions of the fourteenth embodiment use detectors and/or measured parameter influencers that are part of the container ball itself, instead of being part of the container connection device. Other versions of the fourteenth embodiment involve a "faraway program", that can monitor information received from the detectors, and send commands to the measured parameter influencers. A version of the fourteenth embodiment could involve both measured parameter influencers that are part of the container ball itself, and a faraway program.

Monitoring the Measured Parameters from a Distance the Transmitters and Receivers In the fourteenth embodiment, transmitters and receivers can theoretically be located in other places within the apparatus besides the container connection device or the handle, with similar efficacy, as long as each transmitter is capable of receiving information about the values of the one or more measured parameters inside the container ball, and each receiver is capable of transmitting instructions to one or more measured parameter influencers. In essence, the detectors that measure the values of the measured parameters inside the container ball must be able to directly or indirectly send information about the values of these measured parameters to each transmitter.

For example, if the detectors are connected directly to the main wire group and send the above information to a transmitter located in the long rod, this is effective. If a receiver is located in the long rod, and connects directly to the parameter influencers via the main wire group, this will also be effective.

The Faraway Program

The faraway program (11) is a downloadable program that can be used on a user's computer, tablet, or cellular phone or other computing device in the manner of an "app". Computers, tablets, cellular phones, and other computing devices are hereby referred to as "PCs" for short.

The faraway program can be designed to communicate with only the receivers and transmitters in the specific individual container connection device and handle in a specific individual apparatus of the present invention. For example, the user can be required to enter the serial number of his or her apparatus to activate the faraway program after downloading it. Each transmitter in any apparatus can also be programmed to only emit communications that identify the serial number of that apparatus, or other characteristics unique to that apparatus. The invention can also use the methods known in the prior art to ensure that each individual apparatus obeys only the commands of that apparatus's user, coming from that user's PC.

The faraway program downloaded on a specific PC can also be programmed to only transmit communications that include an identification of a unique characteristic (such as a serial number) of the individual apparatus that the user desires to communicate with, or only transmit along a certain frequency which is received by that PC.

The faraway program can include, in the user interface, controls for temperature, oxygen level, salinity level, nitrate and nitrate levels, chlorine level, and fluorine level. The user interface can also include a reel control, a cord control, and a container control. The faraway program can also include, in the user interface, information about the current level of each of the measured parameters that is being measured by a detector. The user interface may also include information about whether the motion sensor is detecting any movement near the motion sensor.

In certain versions of the fourteenth embodiment, the user interface can also include the ability to program the future actions of the faraway program, a.k.a. to program it so that "If temperature reaches a certain level, activate temperature control and raise temperature".

A version of the faraway program, could potentially also include a user interface which includes program components that perform the same functions as all of the controls that are placed on the handle in other embodiments. The faraway program would communicate wirelessly with a processor in the handle, or elsewhere in the apparatus, using the PC's wireless communication capabilities. The faraway program would transmit commands from the parts of the user interface that function as the cord control, container control and reel control to this processor, and the processor would transmit the commands to the components meant through execute these commands, using one of the methods discussed herein.

The commands that the user inputs into the user interface, which are to be executed in the future, can be sent to the comparison module, and each such command can be executed when the conditions precedent for that command have happened. The commands that the user inputs into the user interface, to be executed immediately, can be sent directly to the sending module to be sent to the apparatus, or, alternatively, can be sent to both the comparison module and the sending module, so that the comparison module has a record of the commands that the user has made via the faraway program.

The faraway program uses the transmission and reception capabilities of the PC to receive data being broadcast by the transmitters in the container connection device and the handle. The faraway program can then display this data in the user interface. This data will include information about the temperature and other measured parameters inside the container ball. The user can then determine whether the conditions inside the container ball are hospitable to any creature being contained inside the container ball, and can take corrective action if conditions stop being hospitable.

The faraway program can also use the transmission capabilities of the PC to send commands to the receivers in the handle and container connection device. Commands received by the receiver in the handle will be transmitted via the main wire group to the container connection device, where they will be executed. Each command received by the receiver in the container connection device will be sent to the appropriate component to execute that command. The commands can be directed to, tell the container ball to open or close. The commands can also direct for one of the measured parameters to be altered, for example, the commands can direct for the temperature control to be turned on, raising or lowering the temperature. The commands can also direct for the food container to be opened, releasing food into the container ball.

The receiving receiver(s) will transmit the command to the processor in the container connection device, which can then cause the relevant components within the container connection device and/or container ball to act and fulfill the user's commands. For example, the temperature control can be programmed to start raising the temperature to a specific temperature level, which the user has indicated.

The creature database of the faraway program may also be programmed with specific limits for different measured parameters, for different species, such as specific upper and lower limits on the temperature tolerance of a goldfish, and the upper and lower levels for the optimal temperature range for a goldfish. For every measured parameter, the creature database can be programmed with the range for that measured parameter in which the creature can live (The tolerance range) and the smaller range, the optimal range for that parameter, which is the part of the tolerance range that is optimal for that species.

Other examples of tolerance and optimal ranges include the tolerance and optimal Ph ranges for a specific species, for the water within the container ball, the tolerance and optimal salinity ranges for a specific species, for the water within the container ball, the tolerance and optimal nitrate and nitrate ranges for a specific species, for the water within the container ball, the tolerance and optimal chlorine concentration ranges for a specific species, for the water within the container ball, the tolerance and optimal oxygen concentration ranges for a specific species, for the water within the container ball, and the tolerance and optimal fluorine concentration ranges for a specific species, for the water within the container ball. Then, when the conditions inside the container ball are outside the tolerance or optimal ranges for one of the measured parameters, the faraway program will be aware of this, because it is continually receiving information about the values of the measured parameters inside the container ball, from the transmitters in the container connection device and the handle. The faraway program can sound an alarm, so that the user is aware that he or she must do something, to save the creature inside the container ball. Some versions of the faraway program will allow the user to select whether the alarm will sound when the value of one of the measured parameters is outside the optimum range for that measured parameter, or whether it is outside the tolerance range for that measured parameter.

In some embodiments, the user can also use the user interface to program the faraway program to cause the container ball to snap shut automatically whenever the motion detector detects movement inside the container ball.

In some versions of these embodiments, the detectors will transmit information about the measured parameters that they each measure to a processor in the container connection device, and this processor will transmit this information to the transmitter within the container connection device, and, via the wires in the main wire group, to the transmitter in the handle. The transmitters within the container connection device and the handle will broadcast information about the measured parameters, and whether the container connection ball is open or closed, and this broadcast can be received on the user's PC.

An embodiment with only a transmitter and receiver in the container connection device is possible, but this is not advisable because, if the container connection device is immersed in water, the water may interfere with the signals going to and from the transmitter and receiver.

A version of the faraway program can theoretically be stored on a processor in the container connection device, or a processor in the handle, or another location within the invention. This version of the faraway program will be able to communicate with the detectors and measured parameter influencers, and execute the tasks of the faraway program listed herein.

The Structure of an Embodiment of the Faraway Program

One embodiment of the faraway program will have, at a minimum, the following modules: A receiving module, which will receive information broadcast by the transmitters in communication with the detectors, a creature database, which includes information about the tolerance ranges and/or optimal ranges of the measured parameters required by each of numerous species, and can also include information about the proper intervals between feeding for each species, and a comparison module, which compares the values of the measured parameters being broadcast by the detectors to the tolerance ranges for the measured parameters for the selected species, a member(s) of which is inside the container ball. This embodiment of the faraway program will also include a user interface and a sending module.

The user interface, at a minimum, will display the present values of the measured parameters, being received from the detectors, on the user's PC, and will allow the user to select a species for which tolerance ranges for measured parameters and/or recommended feeding intervals are recorded in the creature database. The user interface may also allow the user to communicate with the measured parameter influencers and command them to change the value of specific measured parameters, for example, by commanding the temperature control to warm up water in the container ball if the water drops below the temperature tolerance range for the creature inside the container ball.

The user interface, in this embodiment, will also include the ability to give commands to open and close the container ball, and will also include the ability to give a command to open and close the food container. Any such commands will be sent from the user interface to the sending module, and then to the receiver(s).

This embodiment of the faraway program will also include a sending module, which in this embodiment will use the broadcast capabilities of the PC to send commands from the user interface to the receivers connected to any processors in the measured parameter influencers, the handle, container control device, and container ball.

In this embodiment, when any of the receivers in the handle, container control device, container ball, or elsewhere in the apparatus receives a command from the faraway program, that receiver passes the command to a processor connected to that receiver (Usually the processor within the same component as the receiver). The processor passes the command, along the main wire group, to every processor connected to the main wire group, and to the transmitter in the container connection device, which will be in close proximity to any receiver in the container ball. This transmitter then transmits the command to any receiver in the container ball.

The processor in the container connection device, or the container ball, or another part of the invention (whichever processor directly connects to the component which is supposed to execute the command, whether that component is a magnet, linking mechanism, food compartment, measured parameter influencers, or another component), will then transmit the command to the component that is required to execute the command. For example, if the command is for the temperature inside the container ball to be raised, the processor that controls the temperature control will command the temperature control to raise the temperature.

The creature database will be in communication with the user interface, and the user interface will display a list of the creatures for which tolerance ranges for the measured parameters are recorded in the creature database.

The user interface will allow the user to select the type of species presently inside the container ball, perhaps from a list of species for which the database contains information about tolerance ranges for the measured parameters. The user interface will then query the creature database, which will send information about the optimal ranges, tolerance ranges, length between feeding times, and possibly other information to the comparison module. The creature database may send this information to the user interface, to be displayed, as well.

The optimal range for each measured parameter, for different types of creatures, can be programmed into the creature database, along with, and in addition to, the tolerance ranges for these types of creatures. For example, a certain type of fish may need water in the range of 24-32 degrees C. (the tolerance range), but may prefer water in the range of 28-31 degrees C. (the optimal range). If this information is programmed into the creature database, and one of the measured parameters moves out of the optimal range, the comparison module can send an alert to the user interface.

The comparison module can also be programmed to "automatically" control some or all of the measured parameters inside the container ball, in the following way: The comparison module would be programmed to send a command to the sending module directly, whenever the comparison module determines that the actual value of a measured parameter is outside the tolerance range or optimal range for the creature inside the container ball.

The command would tell one or more of the measured parameter influencers to alter the measured parameters they control, until these measured parameters are back within the optimal range(s) for the creature inside the container ball. The sending module would then broadcast this command, and the command would be picked up by the receivers in the container ball, and/or container connection device, and/or handle.

The faraway program can also theoretically receive "updates" which include information about the tolerance ranges and optimal ranges of additional creatures, or new information about the tolerance ranges and optimal ranges of creatures that are already listed in the creature database, such as their tolerance ranges and optimal ranges for additional measured parameters.

The creature database can be programmed to connect to a central website and download such updates with the permission of the user, in the manner that many "apps" receive updates from the "App Store".

The comparison module would operate the following way in this embodiment: The comparison module would receive, from the receiver module, the information being broadcast about the conditions inside the container ball. The comparison module would also receive, from the creature database, information about the optimal range and tolerance ranges, for the measured parameters, for the creature inside the container ball. The comparison module would then compare these values. If the actual value of one of the measured parameters exceeds the optimal or tolerance range for that measured parameter, for that species, the comparison module can send an alert to the user interface, which will then inform the user of the alert in one of the methods known in the prior art. The user can then take appropriate action, including commanding the measured parameter influencers to change some of the measured parameters.

The comparison module can also be designed to include an internal timer. The timer can determine when is the appropriate time to feed the creature in the container ball, based on the information about feeding times the comparison module has received from the creature database. The comparison module will then send the alert to the user interface at the appropriate time.

The comparison module can also be programmed via the user interface to undertake actions, either at specific times, or a specified amount of time in the future, for example, to "raise temperature inside container ball in 3 hours."

Some Other Versions of the Faraway Program

In another version of the faraway program, the user may use the user interface to program the comparison module to send alerts to the user at certain times, such as "in 2 hours" or "at 6 PM". The comparison module may be able to utilize the timekeeping capabilities of the PC to know when to send alerts to the user.

Alerts may be auditory alarms, may be visual, or a combination of these, and/or of other attention-getting actions by the PC.

An embodiment of the faraway program could be designed where the comparison module commands the parameter influencers, the food compartment, and can open or close the container ball, and where the comparison module does not send information concerning these actions, or warnings, to the user interface, but the inventor believes this will not be desired as much.

In another version of the faraway program, the creature database will be stored remotely, on a remote server. The modules of the faraway program stored on the PC will communicate with the creature database via the PC's remote capabilities, such as via cellular phone networks.

In another version of the faraway program, there is another module, the handle control module, which can control the reel and other components in the handle. The handle control module connects to the user interface and sending module, so that the user can utilize the user interface to command the components in the handle to act, for example, by commanding the reel to wind clockwise or counterclockwise. This command will be sent to the handle control module, and from there to sending module. It will be broadcast by the sending module, and when any of the receivers in the container ball, container connection device, or handle receives this command, the command will be sent, via the main wire group, to the processor in the handle, which will cause the reel to move in the desired direction.

Embodiments of the transmitters can simply communicate with whatever wireless network is available, and the wireless network will relay the message to the user's PC. The PC can also use the wireless network to communicate with receivers in the container ball, container connection device, and handle.

In another embodiment the user can enter the optimal and tolerance levels for the measured parameters that apply to some species into the creature database. This can be useful if the optimal or tolerance levels for a certain species are not already recorded in the creature database.

In still another embodiment, the user can change the optimal and tolerance levels for species in the creature database, however this ability will probably not be used often.

In still another embodiment, there are no pre-existing optimum and tolerance levels for any species in the creature database, and the user must enter the optimum and tolerance levels for each species into the creature database.

In principle, a large number of users of the faraway program could use their PCs to send the information that their PCs are receiving from the detectors belonging to those users, and also to send information about the creatures being held in those users' container balls, and the movement of those creatures, to a central server. The central server could then draw statistical conclusions, from this information about whether the optimal and/or tolerance ranges for the creatures in those users' container balls is correct, or, if the optimal and/or tolerance ranges for a certain species or sub-species is not well known, the central server could draw conclusions about the correct optimal and tolerance levels for that species or sub-species.

An Embodiment of the Faraway Program in Action

An example is a user capturing a goldfish in the container ball and wanting to keep the goldfish alive for 30 minutes, feed the goldfish, and release the goldfish.

The user first uses the user interface to send a command to the sending module, to close the two halves of the container ball. The sending module will broadcast this information to the receivers and they will send this information to the processor controlling the container ball. The container ball will then close, trapping the goldfish.

The user will use the user interface to state that a goldfish is inside the container bowl. The user interface will inform the comparison module that the user wishes to monitor conditions inside the container ball and the user interface will also communicate with the creature database to find the values of the measured parameters which are optimal and which are tolerable for goldfish. The creature database will send these values to the user interface and to the comparison module. The comparison module will also receive information about the actual conditions inside the container ball, which will be broadcast by the transmitters in the container ball, container connection device, and handle. The information about the actual conditions inside the container ball will be received by the receiving module and sent to the comparison module and user interface.

The user interface will display the optimal and tolerance ranges for each of the measured parameters, for goldfish, after it receives these values from the creature database.

The user will also use the user interface to program, into the comparison module, the fact that he wants to feed and then release the goldfish after 30 minutes. The comparison module monitors the values of the measured parameters received from the transmitters.

If the value of one of the measured parameters is outside the optimal level for that measured parameter, and one of the measured parameter influencers, controls the value of that measured parameter within the container ball, the comparison module will send a warning to the user interface and command the measured parameter influencer that controls that measured parameter to alter the value of the measured parameter. For example, if the container ball is getting too cold, the comparison module will detect this, and send a message, via the transmission module, to cause the temperature control to increase the temperature.

If the value of that measured parameter is outside the optimal range and there is no measured parameter influencer that addresses that measured parameter, the comparison module will simply send a warning to the user interface.

After 30 minutes the timer within the comparison module will run out. Then, the comparison module will send a message via the transmission module, to the receivers, commanding that the food compartment be opened. The comparison module will send another message by the same route, either commanding that the linking mechanism open or commanding that the electromagnets power down, depending on whether the linking mechanism or electromagnets are providing the force closing the container ball. The container ball will then open, releasing the goldfish.

Detectors Inside the Container Ball

The container ball can contain detectors, designed to monitor conditions inside the container ball. Examples of these detectors include a temperature detector (thermometer), a Ph detector, an oxygen detector, and a motion detector, a nitrite detector, a nitrate detector, and a salinity detector. Embodiments of the invention that include one or more, but not all, of these detectors are also possible, as are embodiments of the invention that include more detectors. The same sensor can serve more than one of these functions, for example, the same sensor can detect PH and salinity. These detectors will be attached to the interior of one or both halves of the container ball, and draw power from wires that are within the wall of the container ball, or the detectors can be charged via inductive (wireless) charging.

Alternatively, in some embodiments of the invention, these instruments can be attached to the container connection device, and can read the temperature and other conditions inside the container connection ball when it is attached to the container connection device. These embodiments will include small holes in the top of both halves of the container ball, which are directly below the container connection device, and which these instruments will reach through, to monitor conditions inside the container ball. The small holes will pressed against the container connection device, and water from the outside will not be able to get in through the small holes, when the container ball is closed and attached to the container connection device.

In many embodiments where the detectors are attached to either the wall of the container ball, or the container connection device, these detectors will also be able to send data to another processor within the container connection device or container ball. This processor will then analyze the data provided by the detectors, and make conclusions, about the levels of the measured parameters measured by the detectors, such as conclusions about any of the temperature level, oxygen level, salinity level, Ph level, and nitrite and nitrate level, and chlorine level that are being monitored by any of the detectors. The ability of a processor to determine the temperature level, oxygen level, salinity level, Ph level, chlorine levels, and nitrite and nitrate levels of a body of water, after the processor is given relevant information by sensors, is known in the prior art.

Some examples of the temperature detector (thermometer), a Ph detector, an oxygen detector, and a motion sensor, and a salinity detector are electrodes resembling Honeywell's IQ SensorNet sensors.

Embodiments of the invention can also include a temperature control mechanism that can increase or decrease the temperature of the water within the container ball. Embodiments can also include a Ph control that contains a small amount of a solution that can be released into the container ball to raise the Ph inside the container ball, and another solution that can be released into the container ball to lower the Ph inside the container ball. Embodiments can also include a salinity control that contains a small amount of a solution that can be released into the container ball to raise the salinity inside the container ball, and another solution that can be released into the container ball to lower the salinity inside the container ball. Embodiments can also include an oxygen control that contains a small amount of a solution that can be released into the container ball to raise the dissolved oxygen level inside the container ball, and another solution that can be released into the container ball to lower the dissolved oxygen inside the container ball. The oxygen level might be lowered by the solution binding to the dissolved oxygen, for example. The oxygen control might include a small air diffuser, or a small aerator which pumps air in from outside and then pumps it out again. The oxygen level control can theoretically include a small pump that pumps more oxygen-rich water in from outside, and pumps an equal amount of the water inside the container connection ball outside, however this would only be useful when the container ball is immersed in water. Any air diffuser or pump could be powered by a battery in the container connection device or container ball, or a battery elsewhere that is connected to the oxygen control.

Some embodiments can also include a chlorine control, that releases a solution to dechlorinate the water in the container ball when needed.

The solar cells can provide power to the detectors, and the light placed between the pieces of the container ball, in embodiments which have this light, by the following method. The solar cells provide power, via wires, to a battery, which is located in the container connection device. This battery is also connected to the main wire group, and can be recharged via the main wire group.

A Variation of the Faraway Program that is Stored within the Apparatus

Another version of the invention will include the capacity within the handle (or possibly another component such as the long rod or wire holding rings) to sound an alarm if the value of the measured parameters within the container ball deviates from the optimal or tolerance range for the creature(s) inside.

In this version of the invention, one or more of the processors within the handle, container connection device, container ball, or another component, will store a version of the faraway program, including information about the optimal and tolerable levels for each measured parameter, for each of a multitude of species (The creature database). This version of the faraway program can also include a user interface, which can be displayed on a screen, such as a touch-screen, on the handle. This version of the faraway program can also include a receiving module, which will receive information from the detectors, but does not need to use the reception capabilities of a PC (because it is not stored on a PC, but on a part of the same apparatus as the detectors), and a sending module, which will send commands from the user to the measured parameter influencers. These commands can be received via controls on the handle or another part of the device, where these controls are operatively connected to the processor storing the faraway program. These commands can also be received from the user interface, if this particular version of the apparatus has the ability to display the user interface.

The processor on which the faraway program is stored may also store a comparison module, which will be used in much the same way as a comparison module on the user's PC.

A processor in the container ball, container connection device, or handle, or another component, can store this faraway program, or multiple processors can store components of this faraway program, and can communicate with each other.

The processor(s) storing this faraway program will be operatively connected to the detectors, so that the detectors send information to those processor(s) about the measured parameters that they detect.

The detectors may be connected directly to a processor storing the faraway program if said processor is in the container ball or container connection device, or the detectors may be connected to the main wire group, which allows the detectors to send information to a processor, storing the faraway program, and located in another component. Alternatively, the detectors may be connected to a processor in the container ball or container connection device, where this processor is connected, via the main wire group or otherwise, to another processor, in the handle or another component, on which the creature database is stored.

For example, the temperature detector can be connected directly to a processor in the container connection device, which will be connected to the processor in the handle via the main wire group, and the processor in the handle will store the faraway program, and will be operatively connected to an alarm.

The processor(s) containing the information about the optimal and tolerance levels (the creature database) can be operatively connected to one or more alarms, which may be in the same component, or different components, from the processor(s). For example, the processor containing the creature database can be in the handle, while the alarm is in the long rod. A wire can be one method of making this connection. When the processor(s) detects that the optimal level or the tolerance level of one of the measured parameters has been breached, the processor can send a signal to the alarm, which will sound, alerting the user to the problem.

In theory, the user could use the user interface to place the processor storing the faraway program on an "automatic" mode, where this processor communicates with the measured parameter influencers and automatically causes each such measured parameter influencer to change the value of a measured parameter when this processor has received information that this measured parameter has left the optimal or tolerance ranges for the creature(s) inside the container ball. This is similar in concept to a faraway program running on the user's PC automatically controlling the measured parameter influencers.

The automatic mode could possibly be triggered in some embodiments by a user inputting a desire to trigger the automatic mode into the user interface, using a touch-screen on the handle or elsewhere on the invention. The touch-screen will communicate the user's desire to the processor containing the faraway program. The automatic mode could also be triggered in some embodiments, especially those without screens on the handle, by a user simply pressing a knob on the handle (a control). All methods of triggering the automatic mode within the prior art are explicitly part of the invention.

In another version of the invention, the processor containing the creature database will be capable of connecting to wireless networks and downloading "updates" concerning the same types of information that the app saved on a user's PC can download in other versions of this embodiment of the invention.

This version of the invention can include a screen (such as a touch-screen) on the handle. The user can select the type of creature that is caught in the container ball, using the screen, and possibly by selecting from a list displayed on the screen. The screen will be connected to the processor storing the creature database.

The detectors will then send information about the values of the measured parameters inside the container ball to the processor storing the creature database.

An example is where the detectors and measured parameter influencers are connected to a processor in the container connection device, while there is a touch-screen on the handle, which is connected to a second processor, in the handle, on which the faraway program is stored. The main wire group connects to the processors in the container connection device and the handle. The handle also includes digital gauges, connected to the processor in the handle.

The processor in the handle connects to an alarm, which is also in the handle.

The user can use the touch-screen on the handle to select the type of creature inside the container ball, and select automatic mode. The touch-screen communicates this to the processor storing the faraway program.

Each detector sends information about the values of the measured parameters that it is supposed to detect, to the processor in the container connection device, which sends this information along the main wire group to the processor in the handle. The processor in the handle will send information about the values of the measured parameters to the digital gauges, which will display these values.

If the value of one of the measured parameters moves outside the optimal range for the creature inside the container ball, the processor storing the faraway program sends a message over the main wire group to the processor in the container connection device. The message will command the measured parameter influencer that influences that measured parameter, to move that measured parameter back to the optimal range for the creature inside the container ball. The processor storing the faraway program will also send a command to the alarm in the handle, telling the alarm to make a noise. The processor storing the faraway program will continue commanding the alarm to make noise until the measured parameters are all back within the optimal range for the creature inside the container ball.

The Fifteenth Embodiment

The fifteenth embodiment will include one or more food compartments (15) which will be located in the container connection device or container ball. The food compartment(s) will, in most embodiments, have an exterior food slot, where the user can put food into the compartment, and an interior food slot, which opens into the container ball, allowing food for the creature(s) to enter into the container ball.

The exterior food slot will include a barrier, so that the exterior food slot can be closed when desired by the user.

In one example, with the food compartment located in the container connection device, the user will place food inside small exterior food slots in the container connection device. The interior food slot will also be small, and will be located in between the two halves of the container ball. The interior food slot will be a tube through which food can fall from the food compartment (15) into the container connection device. A processor in the container connection device connects to a small lid, which opens and closes on the command of this processor. When the lid is opened, the food inside the food compartment (15) should come out, and be dispersed into the container ball, through the interior food slot, if the container ball is closed.

In another example, the food compartment(s) will be part of the container ball. For example, there can be two food compartments, built into the wall of the container ball, with one food compartment on each side of the container ball, and the food compartments can each be operationally connected to a processor in the container connection device.

In other examples, the processor that commands the food compartment(s) will be part of the container ball.

In still other examples, the processor that commands the food compartment(s) can be located in another component besides the container ball or container connection device. For example, the processor that commands the food compartment(s) can be located in the handle. This processor can then send commands over the main wire group to a food compartment (15) in the container connection device, or the container ball.

Any power required for the food compartment(s) to be opened or closed can be provided by the batteries, at least one of which will be operatively connected to each of the food compartments.

For example, a processor can command a small latch in each of food compartments the that opens at the command of the user, releasing the food into the container ball.

Other methods by which the processor(s) can communicate with the food compartment(s) in the container connection device and/or container ball, and cause the lid to open or close, are known in the prior art, and all such methods are part of the present invention.

Other methods by which food can be put in the food compartment(s), or released into the container ball, are also known in the prior art, and are part of the present invention.

The user will be able to send commands to the processor in the container connection device via a food compartment control in the handle, or via the user interface of the faraway program.

This application mentions elsewhere that controls for additional components of the invention may be include in the faraway program.

The Sixteenth Embodiment

The sixteenth embodiment uses more extensive solar panels, which can cover the container ball, container connection device, long rod, handle, and other components. These solar panels are connected to the batteries, and feed power into the batteries. The batteries may include, among others, the batteries in the handle (in embodiments with a battery in the handle), the container ball (in embodiments with a battery in the container ball), and the container connection device (in embodiments with a battery in the container connection device).

In some versions of the invention, there will be batteries in the container ball, container connection device, and handle. The solar panels in each component will send power to the battery in that component, or the closest battery; a.k.a. the solar panels in the container ball will send power to the battery in the container ball, those in the container connection device will send power to the battery in the container connection device, and those in the handle will send power to the battery in the handle. Each solar panel will be operatively connected (usually by a wire) to the battery to which it is sending power.

In other versions of the invention, the solar panels in each component can also be designed to send power to a battery in another component, for example, solar panels in the container connection device can send power, via the main wire group, to a battery in the handle, while solar panels in the container ball can send power to a battery in the container connection device.

In some versions of the invention, there will be two or fewer batteries in the apparatus, and each of the solar panels will connect to one of these batteries, and send power to that battery. For example, the solar panels in the container ball and container connection device can send power to a battery located in the container connection device.

Solar Coating and Use of the Container Ball as a Temporary Habitat

In another version of the invention, the container ball, or other components of the invention, are coated with solar cells. For example, the two halves of the container ball can be coated with solar cells. These cells can be, but do not have to be, transparent so that the user can see inside the container ball. It would be preferable to use thin-film solar cells, for this purpose. The solar cells may also be coated with another transparent or non-transparent covering, to protect them.

The solar cells feeding power to a battery are not required to provide enough power to replace that battery's charge at the same rate the charge is being depleted by the components powered by that battery. The solar cells only need to provide power to partially compensate for the power being drained from the battery, and extend the battery's life. However, if the solar cells feeding a battery are able to replace that battery's charge at the same rate the charge is being depleted, this will be beneficial.

Parts of the Handle (1), and Long rod (2), Main wire group (3), External reel (4), Container connection device, Control panel (7), and Wire holding rings (8) can also be coated with thin-film solar cells.

These solar cells can provide power to other components of the apparatus. For example, the solar cells can send power back to the handle, and the battery within the handle, and recharge that battery. The solar cells can also provide power to components within the container connection device, and within the container ball. Some of these components will be discussed below.

Use of the Container Ball as a Permanent Habitat

In principle, some versions of the container ball can be used as permanent habitats for creatures, aquatic plants, or organisms such as algae, especially those versions of the container ball that contain small holes near the tops of the two halves of the container ball, through which air can be exchanged.

In these versions of the container ball, the user may also place food inside the exterior food slot, and then cause the interior food slot to open, allowing the food to reach inside the container ball.

The inventor strongly recommends that any one attempting to use the container ball as a permanent habitat should make sure that the container ball being used is large enough to serve as a permanent home for the creature(s) or other organisms placed inside it.

More Information about the Solar Cells Covering the Container Ball and Other Elements of the Invention in Some Embodiments Solar cells covering the container ball, the handle, the long rod, and other components of the apparatus may be operatively connected to the batteries, by wires or by any other method known in the prior art. Solar cells in any component of the apparatus may be operatively connected to the main wire group, and the main wire group can be connected to a single battery in the container ball, container connection device, handle, or other location, to which these solar cells will send power. The solar cells will then recharge this battery.

Solar cells covering any component in the apparatus can also be connected to a version of the main wire group that connects to, and allows these solar cells to supply power to, multiple batteries. For example, all the solar cells covering several components can be connected to a version of the main wire group that connects to, and sends power to, batteries in the container ball, container connection device, handle, and/or another location.

Solar cells in one component can be directly or indirectly connected to one battery, while solar cells in another component are directly or indirectly connected to a battery in a different component. For example, the solar cells covering the container ball can be connected to the battery in the container ball or container connection device, or to another battery, while the solar cells covering the handle are connected to a battery in the handle. The connections between each solar cell and the battery(s) that solar cell recharges may be achieved via the main wire group, or may be direct, especially for a solar cell that supplies a battery located in the same component of the apparatus.

For example, the container ball, handle, and long rod may all be covered by solar cells. In this example, the solar cells in the container ball will recharge a battery in the container ball, which powers the electronic components in the container ball. The solar cells in the handle will recharge a battery in the handle, which powers the electronic components in the handle. The solar cells in the long rod are connected to the main wire group, which is also connected to the battery in the handle, and the solar cells in the long rod send power to the battery in the handle via the main wire group.

In theory, the battery to which a specific solar cell is connected does not need to be the closest battery to that solar cell; For example, solar cells in the container ball may connect to a battery in the handle.

In theory, some solar cells covering one component may send power to one battery, while other solar cells covering the same component send power to a different battery.

The solar cells can also take several configurations. Some types of solar cells can be transparent. If transparent solar cells coat a transparent component, such as a transparent container ball, the user will be able to see through both the solar cells and the component. For example, a transparent container ball covered by transparent solar cells will allow the user to see any creature inside the container ball.

Thin-film solar cells have recently been developed, including solar cells which can be sprayed onto a surface, as compounds. The solar cells covering the container ball, container connection device, handle, or another component can be thin-film solar cells, including spray-on solar cells.

Amorphous thin-film solar cells can be integrated to a flexible polymer module which has been attached to the container ball using an adhesive sheet between the solar modules' backsheet and the container ball.

Amorphous thin-film solar cells can be attached to other components using an adhesive sheet between the solar modules' backsheet and the body of the component. For example, they can cover parts of the handle by being attached to an adhesive sheet, which is attached to the body of the handle.

The solar panels coating the container ball or any other component can also use "scattered light" where the light-receiving surface is scattered with aluminum nanocylinders. This causes the light to take a longer path within the light-absorbing semiconductor area, so that more light is absorbed, and the solar panels produce more energy.

The solar panels coating the container ball or any other component can also be optimized for certain frequencies of light. In theory, the solar cells coating one component, such as the container ball, can also be optimized for a different frequency from the solar cells coating a different component, such as the handle.

The solar panels coating any component can also theoretically be prism sheets, with an outer layer of solar panels, optimized to absorb certain wavelengths, and an inner layer of solar panels, optimized to absorb different wavelengths, attached to the adhesive sheet which is attached to the body of the component. For example, there could be an outer layer of solar panels, optimized for one group of wavelengths, coating an adhesive sheet, which, in turn, coats an inner layer of solar panels, which coats another adhesive sheet, which coats the container connection device.

All of these improvements can potentially add to the efficiency of the solar cells, so that they recharge the battery(s) faster.

Wireless Charging of and Through the Container Connection Device

The container connection device, in some embodiments, can have a charging port, which will be operatively connected to the battery in the container connection device, by a wire or other means. The charging port will be able to feed power to the battery in the container connection device, to recharge the battery.

The charging port (20) can be a plug-in port, a USB type C port, another type of USB port, or can be another one of the types of charging ports known in the prior art.

The charging port can also be a wireless charging port, by which electrical power is received into the charging port via inductive charging. This will probably be best for the charging port in the container connection device, because it is expected that many embodiments of the container connection device will be immersed in water part of the time.

In other embodiments, the charging port in the container connection device can be operatively connected to multiple batteries, in the container connection device and other locations. These connections may be via the main wire group, especially with batteries located outside the container connection device, or may be via a more direct connection, especially with batteries located inside the container connection device. This way, electric power received through the charging port in the container connection device can charge all the batteries to which this charging port is connected, including the battery in the container connection device and other batteries.

The compartment containing the battery, within the container connection device, can also be opened and closed, with the battery itself being removable, in some embodiments, so that the battery can be easily replaced if needed.

The Seventeenth Embodiment

The seventeenth embodiment of the invention includes a container ball that can be detached from the container connection device. In this system, each container ball can be attached to, and detached from, the container connection device using any of the methods known in the prior art.

These methods include a group of latches (container ball latches, (21)) around the top of the container ball, which interlock with latches on the container connection device. The container ball latches can be attached to the container ball by flexible hinges. The hinges allow the container ball laches to be latched to other laches on the container connection device. The hinges can rotate, so the container ball will open and close, while keeping the container ball laches connected to the latches on the container connection device.

In some versions of this embodiment, the container ball laches (21) will fit into specialized grooves inside the container connection device, and inside the grooves will be additional nodules that the container ball latches will "catch" on, locking the container ball to the container connection device. The container ball latches may have two sections, with the second section being connected to the first by a flexible hinge, wherein this flexible hinge can be "locked" and prevented from rotating when necessary. Methods of making the hinges lock are known in the prior art.

Alternatively, a version of the container ball latches where each latch has one section, connected to the container ball by a hinge which does not lock, are possible.

Versions of the container ball latches where each latch has two sections, connected to each other by hinges which do not lock, and also connected to the container ball by a hinge which does not lock, are possible.

Most versions of the seventeenth embodiment that use latches will use at least two latches, spaced around the top of the container ball. If there are two latches, they will be spaced 180 degrees apart from each other, if there are three, 120 degrees, etc.

The container ball may also be attached to the container connection device via "snap-fits", where the snap-fits on top of the container ball snap onto the parts of the bottom of the container connection device. The container connection ball also may be connected to the container connection device via a threaded portion on top of the container ball, which can be threaded into a threaded portion of the bottom of the container connection device, placing the receivers and transmitters in the container ball and container connection device in close enough proximity that information can be interchanged wirelessly between the transmitter in the container ball and receiver in the container connection device, and between the receiver in the container ball and transmitter in the container connection device even when the container ball and container connection device are submerged in water.

The container ball may also theoretically be attached to the container connection device by adhesives, and pulled off of the container connection device when desired.

Friction rings on the top of the container ball and/or the bottom of the container connection device may also theoretically be used to attach the container ball to the container connection device.

Magnets on the top of the container ball and bottom of the container connection device may also theoretically be used to attach the container ball to the container connection device.

Combination locks between the container connection device and container ball, key fits between the container connection device and container ball, hub joints between the container connection device and container ball, keys between the container connection device and container ball, metal hooks between the container connection device and container ball, and designing the container ball and container connection device so that they interlock with each other, can also be used to attach the container ball to the container connection device.

A combination of methods of attachment can also be used, along with any other method or combination of methods known in the prior art.

Any method of attachment which is used, between the container ball and container connection device, where the container ball is detachable, should allow for information to be interchanged between the transmitter in the container ball and receiver in the container connection device, and between the receiver in the container ball and transmitter in the container connection device. This reduces the chances that the apparatus will become unable to perform all its functions.

The container ball may also be attached to the container connection device by a locking mechanism, but this can be unlocked, and the container ball removed.

The container ball may also include the detectors and parameter influencers, a motor control, a processor to control these 3 types of items, and a battery that powers the detectors, parameter influencers, motor control, and processor. In one version of the seventeenth embodiment, the container connection device includes a transmitter and receiver placed either at, or very close to, the parts of the container connection device that directly connect to the container ball. The container ball also includes a receiver and a transmitter very close to the parts of the container ball that connect directly to the container connection device. The proximity of the receiver and transmitter in the container connection device to the receiver and transmitter in the container ball helps to ensure that commands are transmitted between the container connection device and container ball, and information is transmitted from the container ball to the container connection device, even when the container ball is underwater.

For example, the transmitter and receiver of the container connection device can be near the bottom of the container connection device with only a thin, waterproof, layer between the transmitter and receiver, and the outside. The transmitter and receiver in the container ball will be near the top of the container ball, with a small, waterproof layer between the outside and this transmitter and receiver. Therefore, when the container ball latches are engaged, the transmitter and receiver in the container ball will be held in a location where they are in close physical proximity, to the transmitter and receiver in the container connection device (In some versions, less than 0.5 cm). This ensures that wireless transmission and reception can still happen between the container ball and container connection device, even when there is no direct physical connection capable of transmitting information between the container ball and container connection device. This is especially important when the container ball and container connection device are submerged.

The user can theoretically detach the container ball, closed, from the rest of the apparatus, with a creature inside, by undoing the container ball latches or other components which are holding to container ball to the rest of the apparatus.

The Eighteenth Embodiment

The eighteenth embodiment will include an alert light on the handle or on the long rod, or another part of the invention. This alert light, if located on the long rod, can be connected to a small wire that splits off from the main wire group (which runs either through or on top of the long rod). The eighteenth embodiment will also include a motion sensor (one type of detector) inside the container ball, and at least one processor, preferably in the container ball or container connection device, and the motion sensor will be operatively connected to the processor. The motion sensor will be able to detect whether there is motion close to the sensor, which means effectively that the motion sensor will be able to detect motion inside the container ball when the container ball is closed, and will detect movement close to the motion sensor in all cases. If the motion sensor detects movement close to the motion sensor, this is a strong indication that a creature is nearby. If the motion sensor is situated between the two halves of the container ball, the fact that it has detected motion is a strong indication that a creature is in between the two halves of the container ball.

The motion sensor will send information to the processor in the container ball or container connection device, about whether motion has been detected close to the motion sensor. The processor will be connected to the main wire group. The processor will also be programmed to activate the light if motion is detected inside the container ball. In most embodiments, the processor will send an impulse along the main wire group, and the impulse will reach the light. The light will then activate.

In theory, the alert light could be located on the handle, on the outside of the handle where the user can see it. An alert light located on the handle could be connected to the main wire group by a small wire that branches off the main wire group. Another configuration will include a processor in the handle, wherein the main wire group connects to the processor in the handle, and this processor is connected to the alert light. When the motion sensor detects motion near the motion sensor, the processor in the container ball or container connection device will send this information, most likely via the main wire group, to the processor in the handle. This processor in the handle will then activate the warning light.

In all configurations, the processor to which the motion sensor sends information (most likely the processor in the container connection device or container ball) and/or any processor directly connected to the alert light (such as the processor in the handle) will be able to monitor whether the motion sensor is continuing to detect motion. Any of these processors may be programmed to deactivate the alert light if the motion sensor has not detected motion for a certain period of time.

Another version of the invention, where the container ball is divided into more than two sections, when open, is also possible. The container ball can potentially be divided into three sections, or four sections, or more. These sections can be designed to open apart from each other, allowing a creature inside. Then the sections will all be pushed together, on command of the user. The sections will be pulled close together using the same principle as the sections of a container ball that has two sections. In one version, electromagnets can be near the tip, and on the edges, of each of the sections. Each of the electromagnets will have a pole that faces towards an oppositely charged pole on one of the electromagnets in the adjacent section. Then, when both the electromagnets are turned "on", they will create attraction to each other, and force the two sections together. All of the sections will be forced together because the electromagnets in every section will be attracted to the electromagnets in nearby sections.

The inventor feels that another method of pushing the sections closer together will also be effective. For example, a linking mechanism can be designed, using the same principles as a linking mechanism related to a version of the container ball that has two sections. One type of linking mechanism will include small rods that emanate out of the container connection device. A small rod presses against each of the sections of the container ball. When the user uses the cord control to close the container ball, each of the small rods will push one of the sections of the container ball inward. This will force each of the sections to move closer to the other sections when desired by the user. The container ball will be closed, trapping the creature inside.

Wireless Charging of the Container Ball

The container ball, in some embodiments, can have a charging port, which will be operatively connected to a battery in the container ball, by a wire or other means. The charging port will be able to feed power to the battery in the container ball, to recharge the battery.

The charging port (20) can be a plug-in port, a USB type C port, another type of USB port, or can be another one of the types of charging ports known in the prior art.

The charging port can also be a wireless charging port, by which electrical power is received into the charging port via inductive charging. This will probably be best for the charging port in the container ball, because it is expected that many embodiments of the container ball will be immersed in water part of the time.

In other embodiments, the charging port in the container ball can be operatively connected to multiple batteries, in the container ball and other locations. These connections may be via the main wire group, especially with batteries located outside the container ball, or may be via a more direct connection, especially with batteries located inside the container ball. This way, electric power received through the charging port in the container ball can charge all the batteries to which this charging port is connected, including the battery in the container ball and other batteries. This configuration would probably be most useful in embodiments that do not have a detachable container ball, for safety reasons.

The compartment containing the battery, within the container ball, can also opened and closed, with the battery itself being removable, in some embodiments, so that the battery can be easily replaced if needed.

In principle, direct connections could be made between charging ports in the container ball, container connection device, and any other charging ports in the apparatus, and the components which use electrical energy, instead of having the charging ports connect to batteries.

Direct connections could also be made between solar cells in the container ball, container connection device, and other parts of the apparatus, and the components which use electrical energy, instead of having the solar cells connect to the batteries.

Some Variations in Size of the Components

The components can vary in size, length, and thickness, as long as each component can perform its required functions. For example, a version of the container ball with thinner walls than those displayed in the drawings, or a version of the container ball which is wider than those displayed in the drawings, can be built, and will be useful in some circumstances, such as for catching larger creatures. A version of the apparatus that includes a thicker long rod, than that displayed in the drawings, is also possible. Versions of the apparatus that have a much longer main wire group than that displayed in the drawings can also be built. Other versions of the apparatus with varying sizes, length, and thickness, can be built, such as, for example, a version of the apparatus with a larger but thinner container ball, and also a longer main wire group. In theory, larger container balls could be used to catch larger creatures.

In most embodiments with a detachable container ball, the user could theoretically separate the container ball from the container connection device, with the detectors and other electronic components in the container ball functioning on battery power. The user could then place the container ball, by itself, with a living creature(s) inside it, and with the transmitter and receiver in the container ball communicating with an embodiment of the faraway program running on a PC. The user could also theoretically wear this container ball. For example, the user could wear it as part of a piece of jewelry, such as part of a necklace.

In principle, an embodiment of the invention could be built with a detachable container ball, but without a battery in the container ball. Such an embodiment would probably depend on wireless power transmission from the container connection device to the container ball, for safety reasons.

Use of Versions of the Invention as a Toy

Another version of the invention, can be used as a toy, in the following manner: The apparatus and container ball can be used to "catch" toy fish or other small toys. A user, such as a child, can place the toy fish into a bowl of water, or another location. The user can then use the apparatus to lower the container ball into the bowl, and then, when one of the toy fish is between the two halves of the container ball, the user can activate the container ball using either the handle, or a version of the faraway program running on a PC, snapping the container ball shut.

Children can also place some versions of the container ball directly into a bowl of water and use it to "catch" other small toys, by using an app on a PC to trigger the container ball to "catch" a small toy when the toy is between the halves of the container ball. In theory, users can make a game with a score based on the number of each type of toy fish, or other toys, "caught" by each user.

Versions of the container ball, either by itself or as part of the container connection device, can also be used to catch other items, by closing the container ball on these items, as part of a game. Users can learn about magnetic forces, from observing the action of the electromagnets, and learn about other physical forces by observing the action of the linking mechanism.

Versions of the invention, using solar panels, can also teach users about the efficacy of solar panels, and versions of the invention that use a creature database can also teach users about the need to keep proper conditions for animals in captivity, or plants owned by humans.

Users can employ the invention to create other games as well.

Other embodiments of the invention are also possible, containing combinations of the above characteristics from different embodiments, and such embodiments will fall within the scope of the claimed invention. For example, an embodiment containing the bait, inside the container ball, which is characteristic of the sixth embodiment, and also involving a transparent container ball, which is characteristic of the eight embodiment, is also possible. All embodiments of the invention will function with either a transparent container ball, or transparent container ball, long rod, and handle, or other transparent parts.

An example of an embodiment combining characteristics of more than one of the embodiments discussed above is an embodiment where the container ball is detachable, where the container ball is transparent and covered with transparent thin-film solar cells that feed power to the container ball's battery, and where the container ball contains detectors, parameter influencers, a processor, a transmitter, electromagnets, and a receiver. The container ball also includes container ball latches (21), which are connected to the container ball by flexible hinges, and which can latch into the container connection device and connect the container ball to the container connection device. The container ball also includes a linking mechanism near its top, which is controlled by the processor in the container ball.

The detectors, parameter influencers, processor, transmitter, and receiver, and electromagnets will be powered by the battery in the container ball. The detectors will feed information about the parameters they detect, inside the container ball, to the processor in the container ball, which will then send this information to the transmitter in the container ball, which will broadcast this information.

The transmitter in the container ball will be physically close to the receiver in the container connection device when the container ball is locked with the container connection device.

The receiver in the container connection device will broadcast the information received from the processor in the container ball, and the receiver in the container connection device will also transmit this information to the processor in the container connection device, which will transmit the information over the main wire group to the processor in the handle. The processor in the handle will also transmit this information to a transmitter in the handle, which will also broadcast this information.

The user will have an embodiment of the faraway program running on a PC nearby. The PC will have wireless reception capabilities.

The PC, and the receiving module of the faraway program, will receive the information being broadcast by the transmitter in the container ball, and the transmitters in the container connection device and the handle. The receiving module will transmit this information to the comparison module. The comparison module of the faraway program will also contain information about the tolerance range for the measured parameters of many species.

The user will have previously used the user interface of the faraway program to select the species inside the container ball, and the comparison module will have retrieved the optimal and tolerance ranges, for the measured parameters, for the species inside the container ball, from the creature database.

The comparison module will continually compare the actual values of the measured parameters to the optimal and tolerance levels for the measured parameters. If the actual value of a measured parameter is outside the optimal range for that species, and there is a measured parameter influencer that affects that particular measured parameter, the comparison module will use the sending module to send a command for this measured parameter influencer to change the measured parameter, until this measured parameter is back within the optimal range for that species.

The comparison module will also, in every case where a measured parameter is outside of the optimal range, use the auditory capabilities of the PC to sound an alarm.

Any transmitters in the container ball, container connection device, and handle should preferably be able to transmit wirelessly, with enough strength for the transmission to be received and understood by a nearby PC.

This application refers to a "creature" being trapped in the container ball, but in theory, multiple creatures could be trapped within the container ball. For example, multiple small shrimp could be trapped within the container ball. It is understood that the term "a creature" within the container ball may refer to multiple organisms, or to one or more organisms that are not animals.

The discussion included in this patent is intended to serve as a basic description. The reader should be aware that the specific discussion may not explicitly describe all embodiments possible, and alternatives are implicit, or obvious to those skilled in the art. Also, this discussion may not fully explain the generic nature of the invention and may not explicitly show how each feature or element can actually represent equivalent elements. Again, these are implicitly included in this disclosure. Where the invention is described in device-oriented terminology, each element of the device implicitly performs a function. It should also be understood that a variety of changes may be made to the embodiments that have been described, without departing from the essence of the invention. Such changes are implicitly included in the description.

These changes still fall within the scope of this invention.

Furthermore, each of the various elements of the invention and claims may also be achieved in a variety of manners. This disclosure should be understood to encompass each such variation, whether it is a variation of an apparatus embodiment, a method embodiment, or a variation in any element of an embodiment. As the disclosure relates to elements of the invention, the words describing each element may be replaced by equivalent apparatus terms, even if only the function or result is the same. Such equivalent, broader, or even more generic terms should be considered to be encompassed in the description of each element or action. Such terms can be substituted, when desired, to make explicit the implicitly broad coverage to which this invention is entitled. It should be understood that all actions may be expressed as a means for taking the action in question, or may be expressed as an element for causing the action in question.

Similarly, each physical element disclosed should be understood to encompass a disclosure of the action which that physical element facilitates. Such changes and terms are to be understood to be explicitly included in the description.

The Processes

The process of using the invention described herein to catch small animals, especially fish and other aquatic animals, is explicitly part of the invention claimed herein. The process of using the invention to monitor the measured parameters inside the container ball, and to use information about the values of the measured parameters inside the container ball to keep living organisms inside the container ball alive and healthy is also explicitly part of the present invention. The process of facilitating monitoring of these measured parameters via wireless communication with an "app" running on a PC is also explicitly part of the present invention. The processes of using solar cells within the apparatus to provide power to the apparatus, or to facilitate any of the other processes listed herein are also part of the present invention. The process of using every embodiment of the invention described herein is also part of the present invention.

Figure 1A:
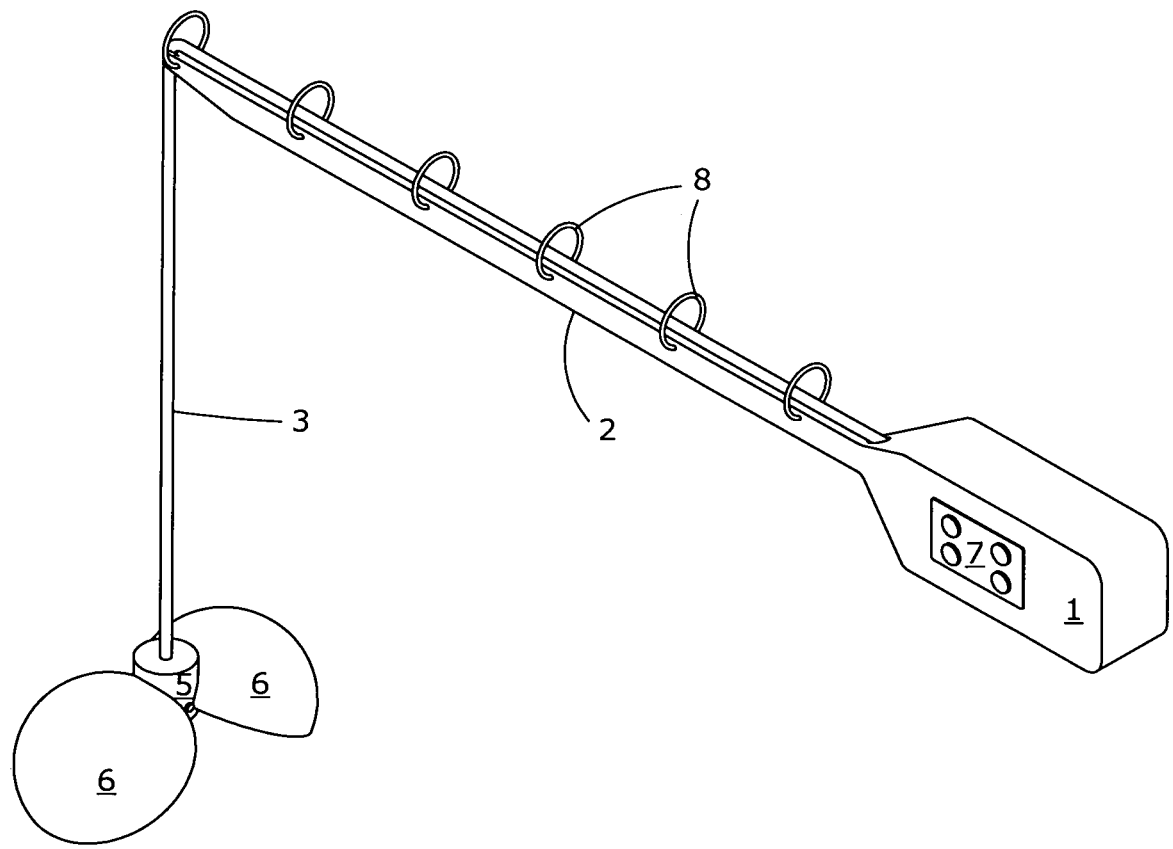
FIG. 1A shows a bird's-eye view of an example of the first embodiment of the apparatus, with a non-transparent container ball, which is open, and with a control panel visible.
Figure 1B:
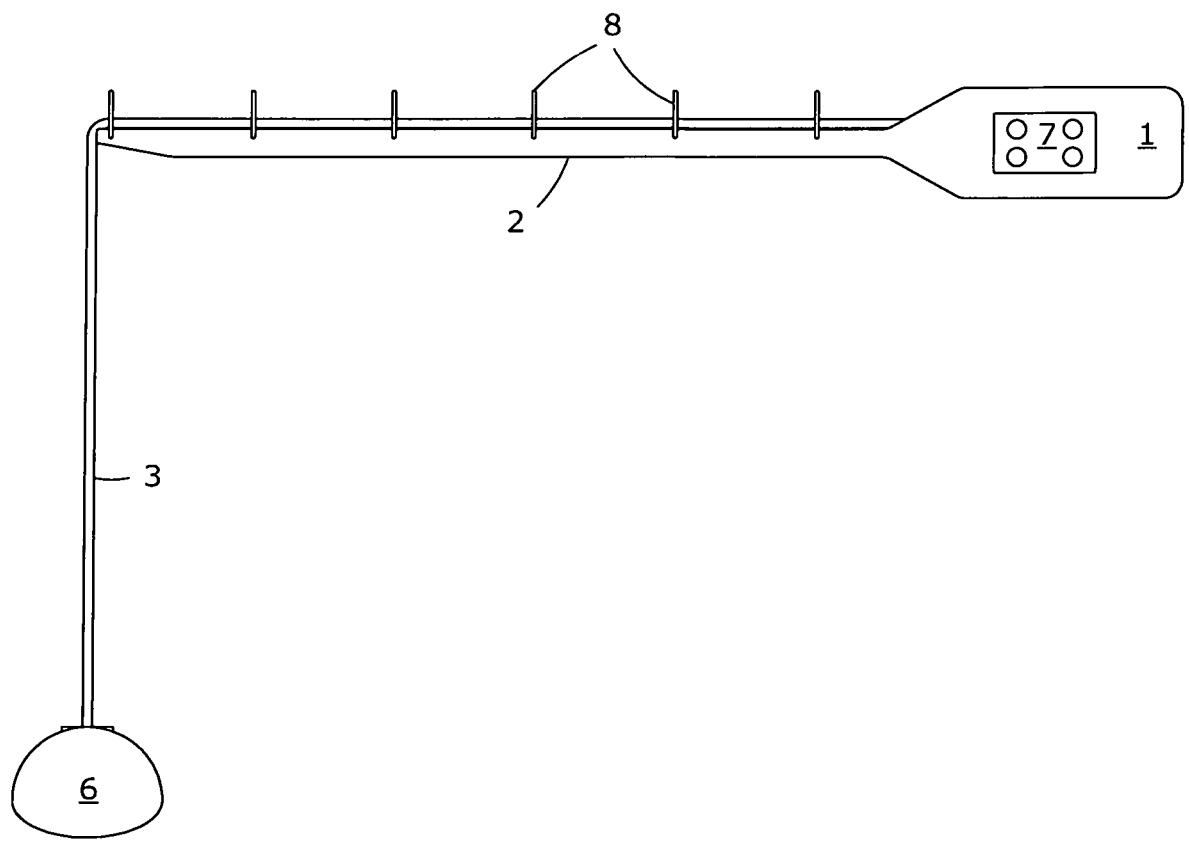
FIG. 1B shows a left view thereof, with a non-transparent container ball, which is open, and with a control panel visible.
Figure 1C:
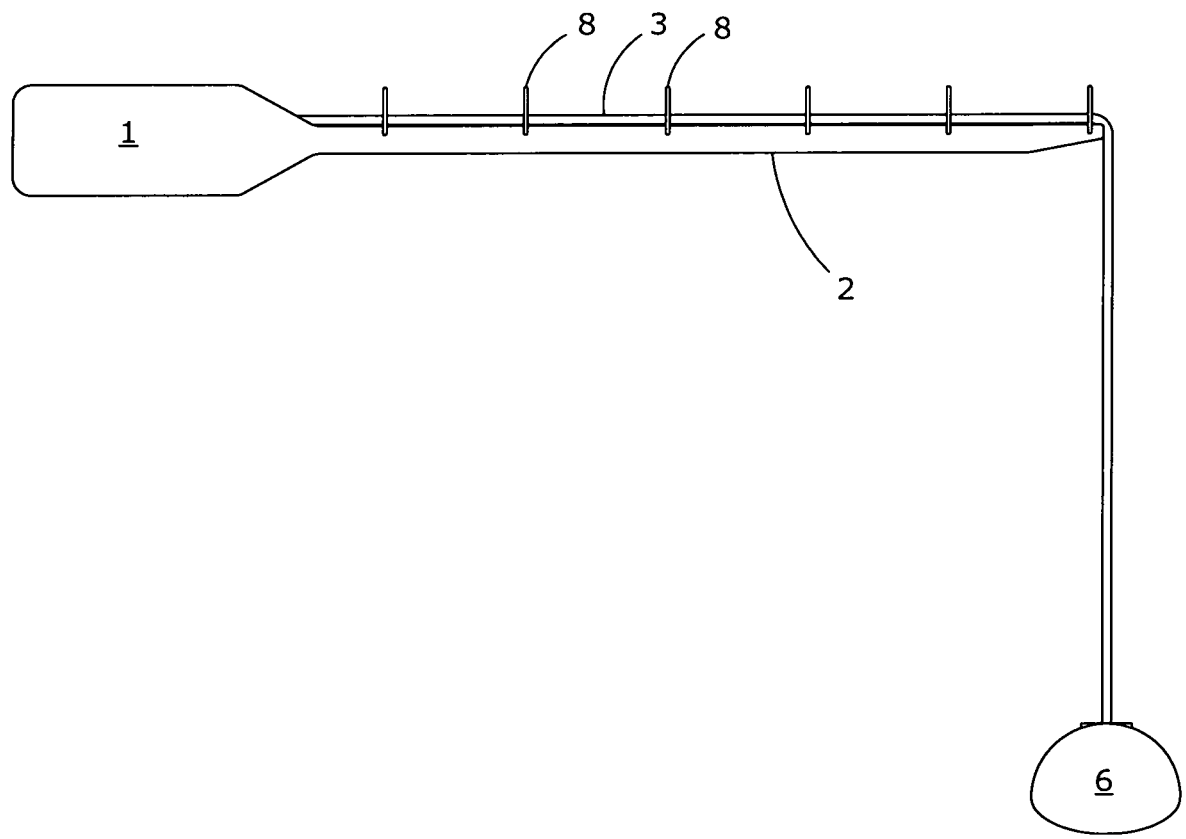
FIG. 1C shows a right view thereof, with a non-transparent container ball, which is open.
Figure 1D:
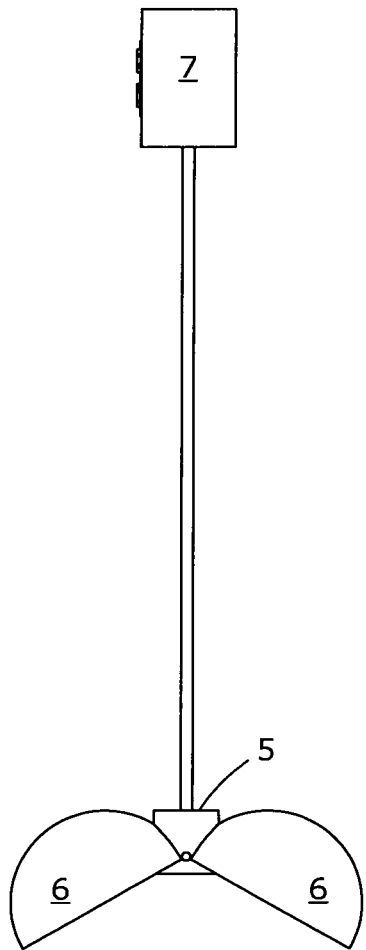
FIG. 1D shows a back view thereof.
Figure 1E:
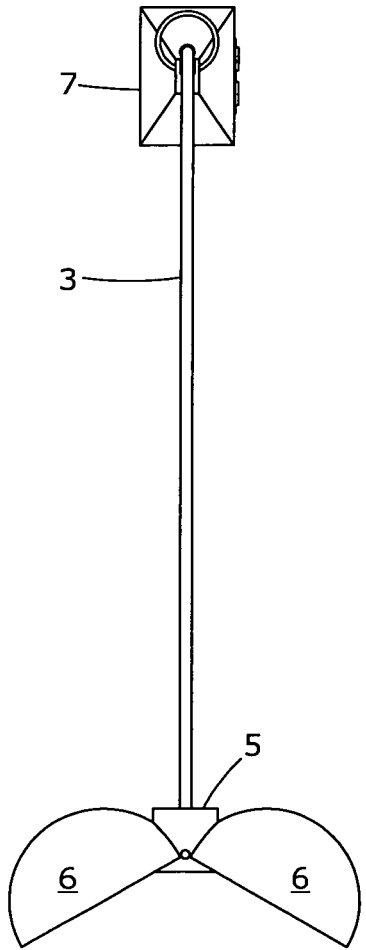
FIG. 1E shows a front view thereof.

In a version of the fourteenth embodiment, the container ball is transparent and open. There are some small holes in the top of both halves of the container ball, through which the detectors (10) and parameter influences (12) will fit when the container ball is closed. The detectors and parameter influences are connected to a transmitter and receiver inside the container connection device. This transmitter and receiver are connected to a processor (19), which, in turn, is connected to the main wire group, which also connects to another transmitter and receiver inside the handle.

The transmitter, receiver, a processor in the handle, and the main wire group all draw power from a battery (13) which is inside the handle. The main wire group transmits some power to the transmitter, processor, receiver, and linking mechanism inside the container connection device. The battery (13) receives some power from a solar cell (14), which is attached to the handle (1). The transmitters are transmitting information about the measured parameters inside the container ball to the faraway program, which is running on the PC (a cellular phone in this case), and the faraway program is sending a command to change the temperature to the receivers, inside the handle and container connection device.

In a version of the invention, there is with more than one container ball, that can be interchanged, and both connected with the container connection device. There are flexible hinges that connect the two container ball latches (21) to the container ball The container balls have two food containers (15) on its sides. The user can open them, to place food inside, and they can open upon the interior of the food container.

In a version of the invention, the magnets in the container ball are a different color from the rest of the container ball. This version of the apparatus also has charging ports (20) in the container ball, container connection device, and handle.

The electromagnets are present in the other versions of the container ball, but the electromagnets are the same color as the container ball and are not visible in the drawings. The detectors and parameter influences are in between two halves of the container ball, and connect to a processor in the container connection device, where a processor in the container ball is also connected to a transmitter and a receiver in the container ball.

An embodiment of the invention includes an alert light on the long rod and digital gauges, and controls, including measured parameter controls, on the handle. The digital gauges respond to information received via the main wire group from the detectors in the container ball. These detectors feed information to a processor in the container ball. This particular example of the apparatus includes a much longer main wire group than the other examples of the apparatus.

DETAILED DESCRIPTION OF THE DRAWINGS

In many of the figures below, the number of wire holding rings will vary. The inventor would like to clarify that the invention can use as many, or as few, wire holding rings as desired, except in embodiments where the main wire group is encased in the long rod. In such embodiments, wire holding rings would be unneeded. A variation of the invention is also possible, where the wire holding rings can be attached to, and detached from, the long rod, meaning that the number of wire holding rings can be varied to suit the tastes of the user.

FIG. 1A shows a version of the first embodiment of the apparatus, viewed from the left, with the container ball open. The viewer can see how the main wire group can be extended from the handle, to lower the container ball into water, or onto land. The main wire group goes through the wire holding rings. Wire holding rings are not required for the first embodiment, but it would most likely be to the user's advantage to employ wire holding rings. The main wire group is rolled on an internal reel, and extends out of a hole in the handle along the long rod. This version of the first embodiment includes a control panel on the handle.

FIGS. 1B-1E show the first embodiment of the apparatus from several other angles.

Figure 2A:
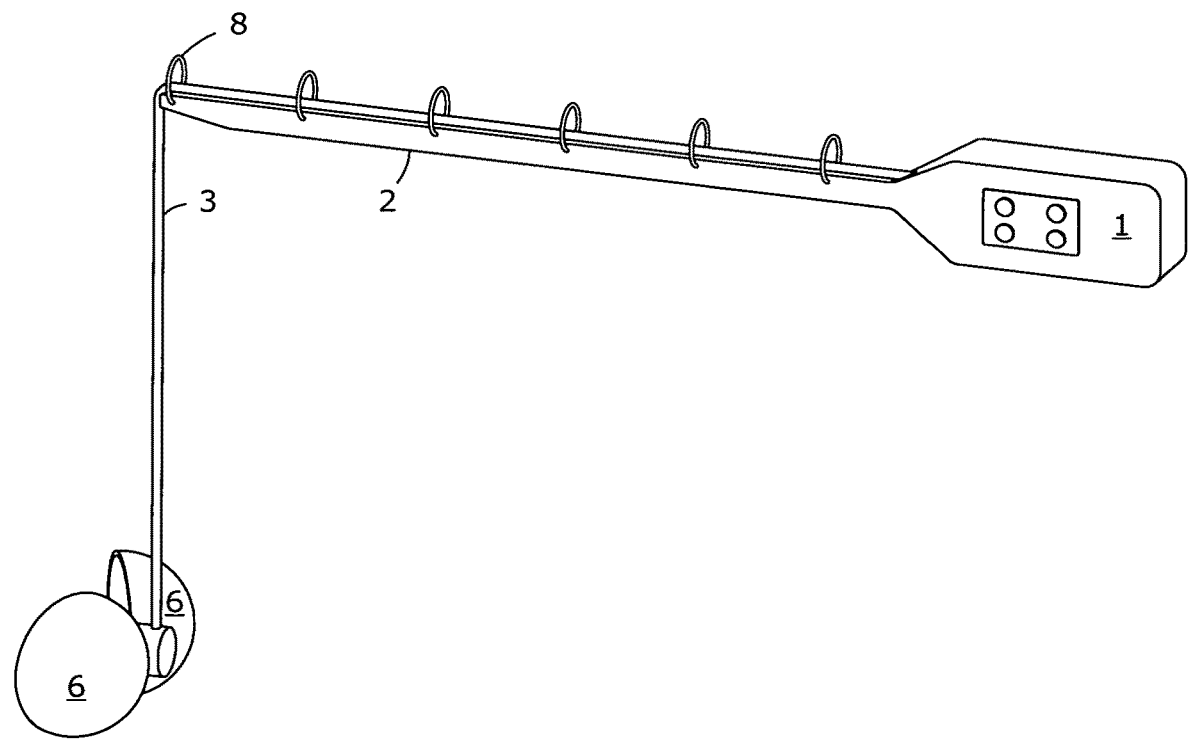
FIG. 2A shows a bird's-eye view of an example of the second embodiment of the apparatus, with a non-transparent container ball, which is open, and with a control panel visible.
Figure 2B:
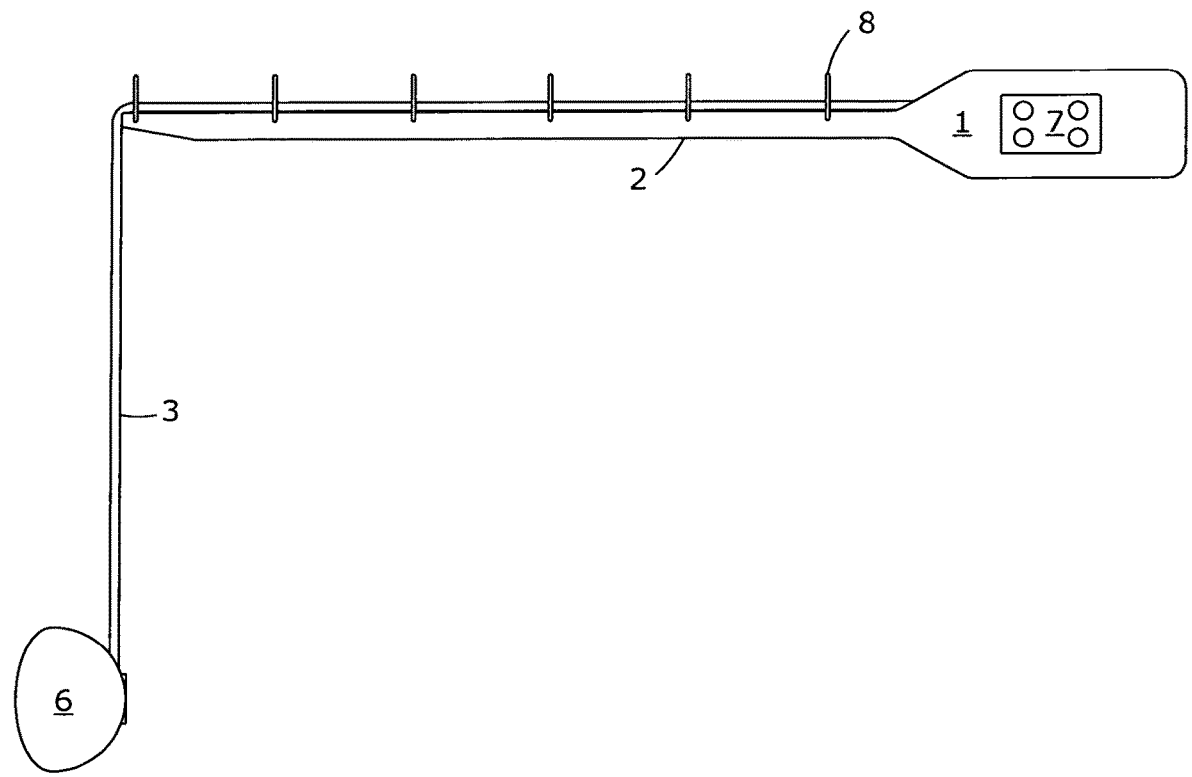
FIG. 2B shows a left view thereof, with a non-transparent container ball, which is open, and with a control panel visible.
Figure 2C:
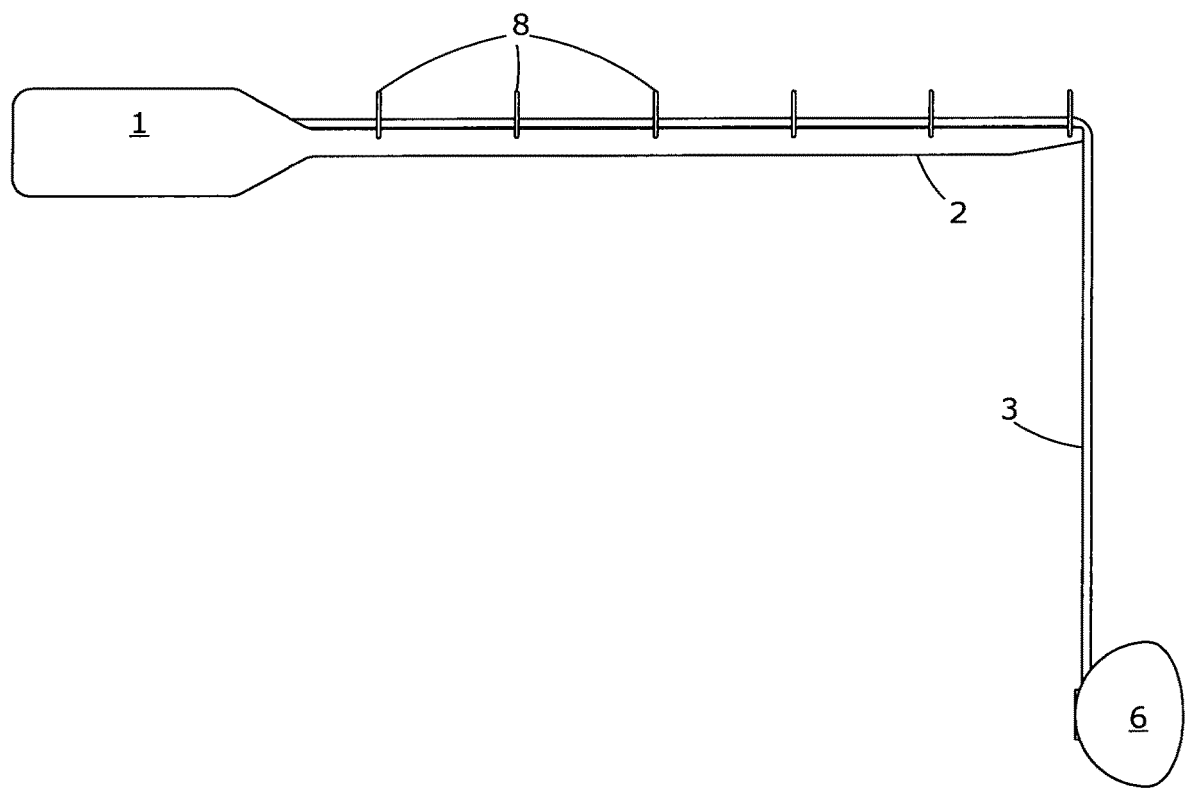
FIG. 2C shows a right view thereof, with a non-transparent container ball, which is open.
Figure 2D:
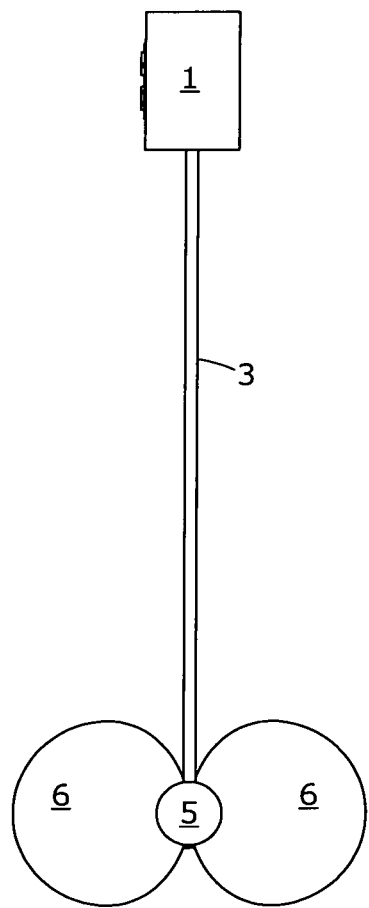
FIG. 2D shows a back view thereof.
Figure 2E:
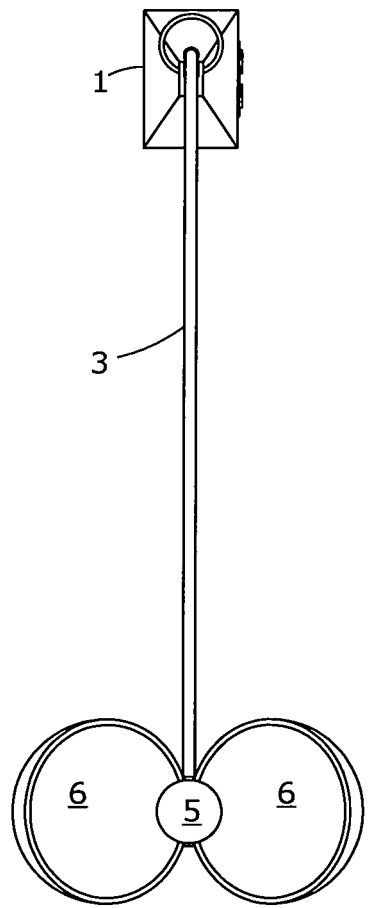
FIG. 2E shows a front view thereof.
Figure 3A:
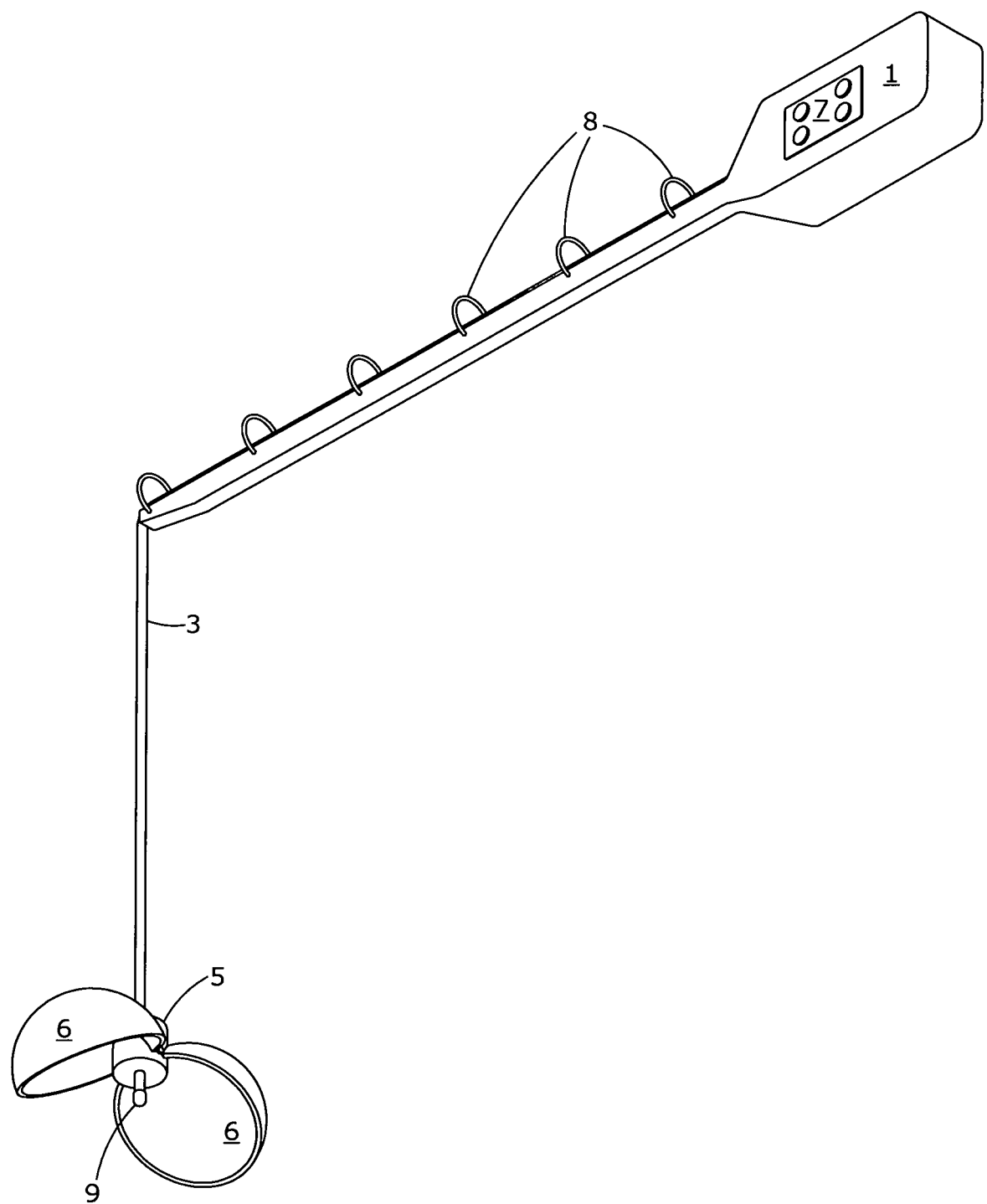
FIG. 3A shows a lower left view of an example of the third embodiment of the apparatus, with a non-transparent container ball, which is open, and with a control panel visible, and with a light in between the two halves of the container ball.
Figure 3B:
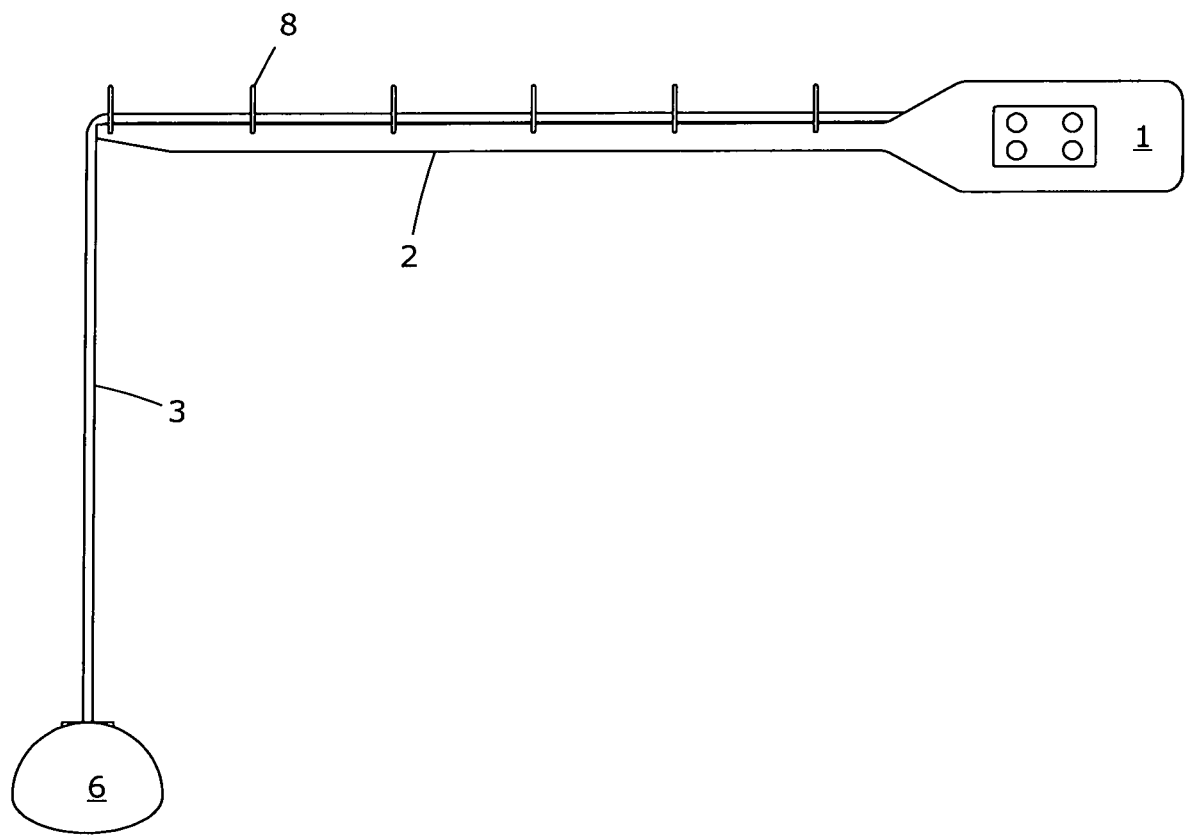
FIG. 3B shows a left view thereof, with a non-transparent container ball, which is open, and with a control panel visible, and with a light in between the two halves of the container ball.
Figure 3C:
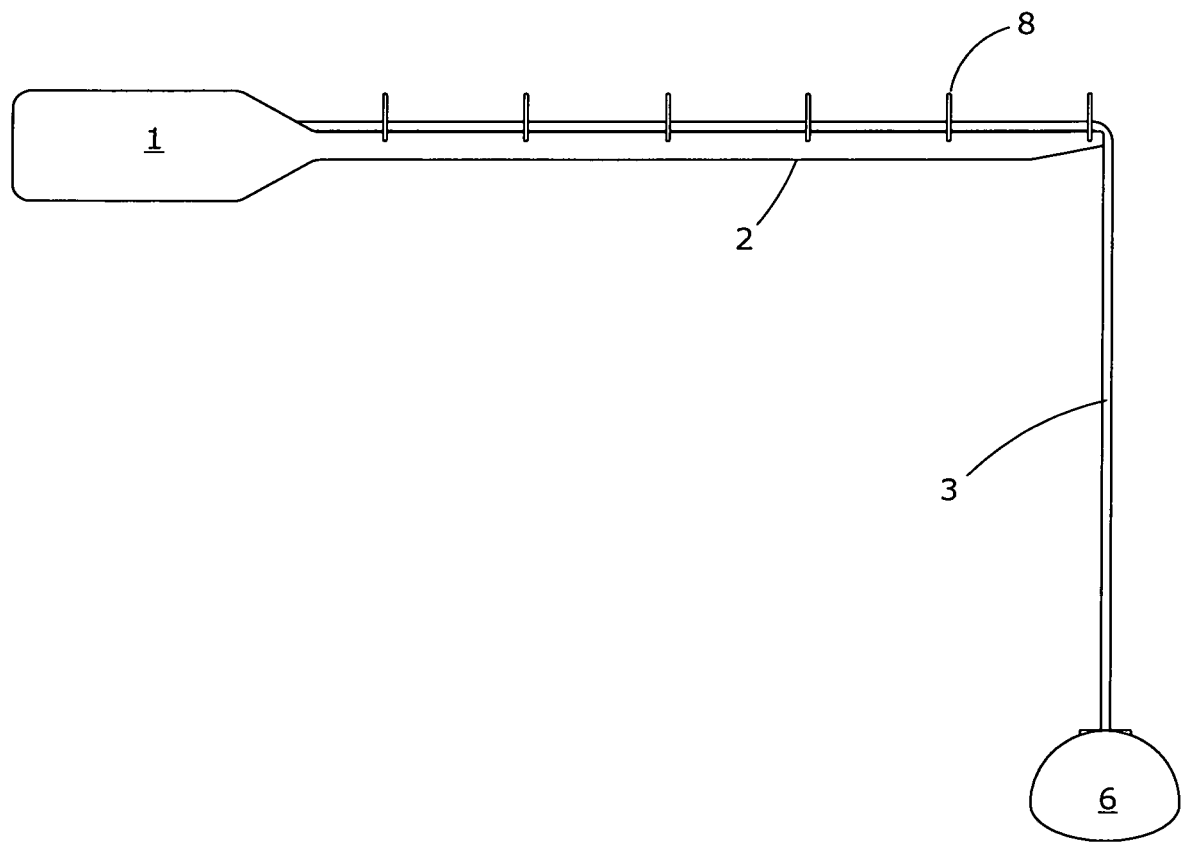
FIG. 3C shows a right view thereof, with a non-transparent container ball, which is open, and with a control panel visible, and with a light in between the two halves of the container ball.
Figure 3D:
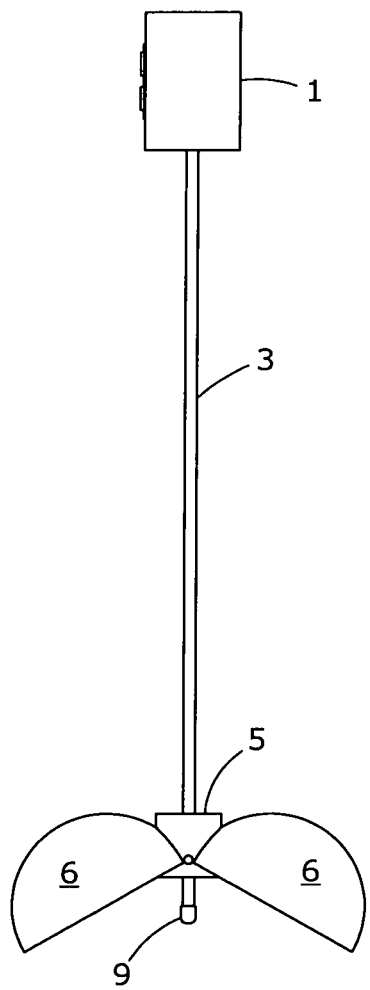
FIG. 3D shows a back view thereof.
Figure 3E:
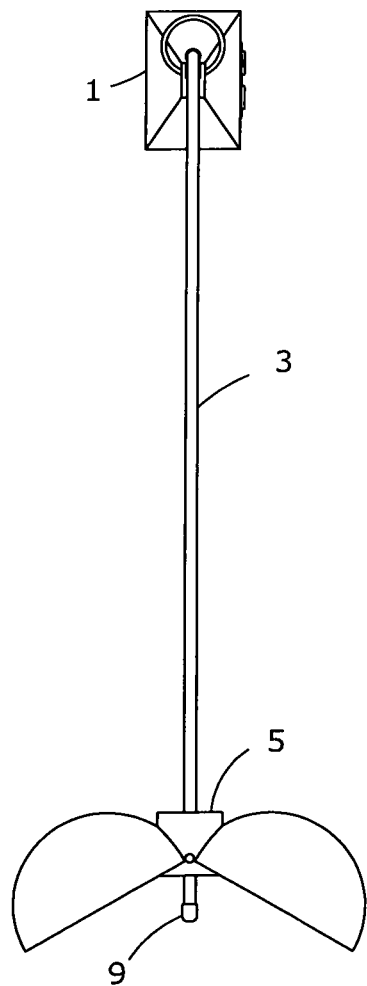
FIG. 3E shows a front view thereof.

FIG. 2A shows a version of the second embodiment of the apparatus viewed from the left, with the container ball open. This version of the second embodiment includes a control panel on the handle. The main wire group extends through the wire holding rings which are on top of the long rod. The viewer can see that this embodiment of the invention includes a container ball that has a different angle, relative to the main wire group, from the first embodiment.

FIGS. 2B-2E show the second embodiment of the apparatus from several other angles.

FIG. 3 shows a version of the third embodiment of the apparatus, viewed from the lower left, with the container ball open. This version of the third embodiment includes a control panel on the handle. A small light can be seen, inside the container ball. Small creatures may be attracted to the light and caught inside the container ball. In this particular version, the small light is connected to the container connection device, and draws power from a wire, inside the container connection device, that connects to the main wire group. The light can also be controlled, and turned on and off, independently of the container ball, via the control panel on the handle. A version of this embodiment that includes the ability to control the intensity of the small light, and make it dimmer or brighter, using a light control, is also part of the present invention. Such a light control will most likely be part of the control panel.

In other versions of the third embodiment, the light may be powered by a wire that splits off from the main wire group above the container ball, or a wire that connects to one or both parts of the container ball.

Figure 4A:
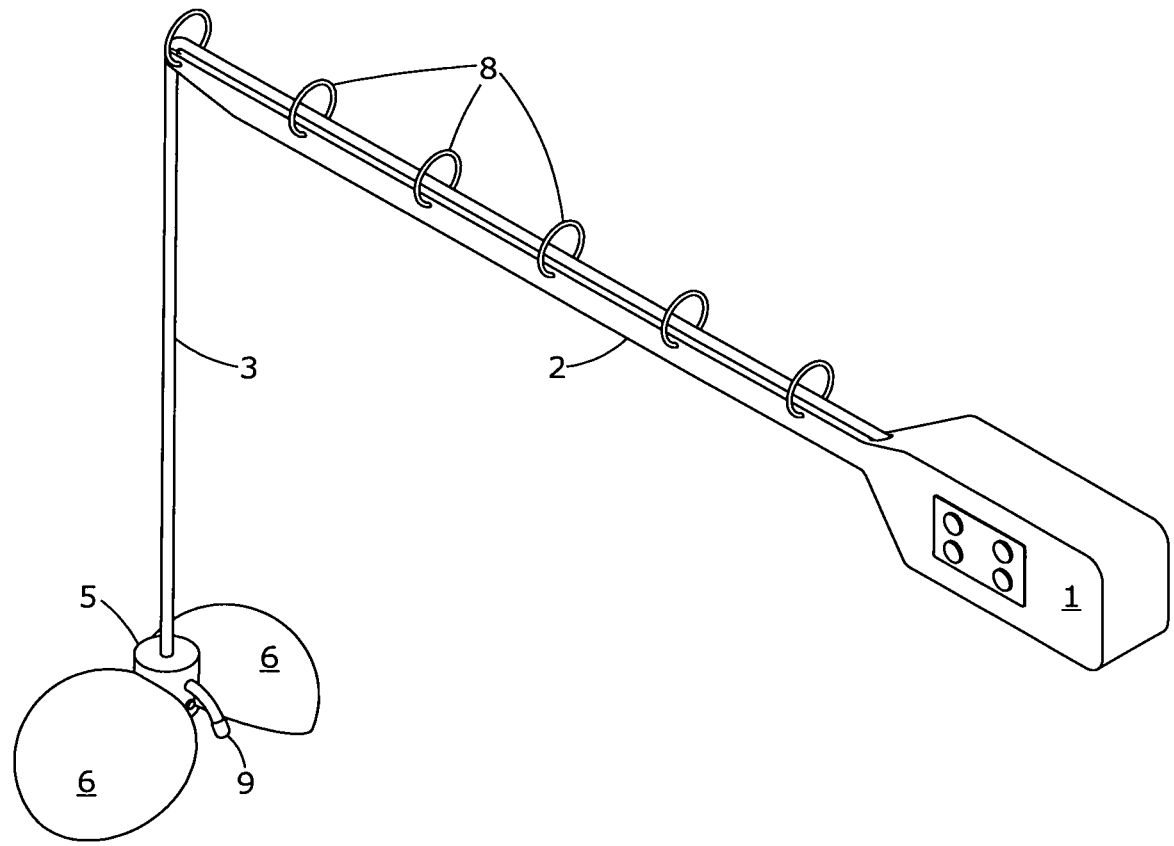
FIG. 4A shows a bird's-eye view of an example of the fourth embodiment of the apparatus, with a non-transparent container ball, which is open, and with a control panel visible, and with a light that is not in between the two halves of the container ball.
Figure 4B:
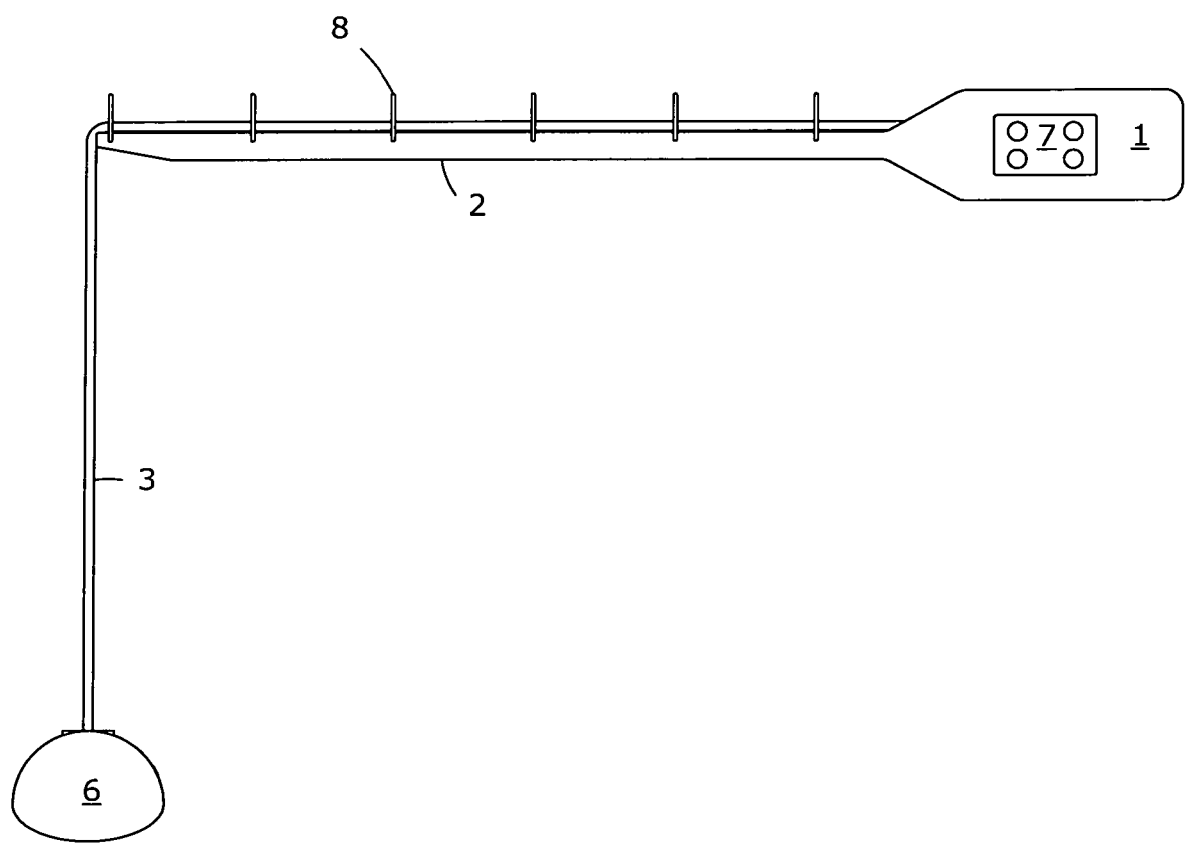
FIG. 4B shows a left view thereof, with a non-transparent container ball, which is open, and with a control panel visible, and with a light that is not in between the two halves of the container ball.
Figure 4C:
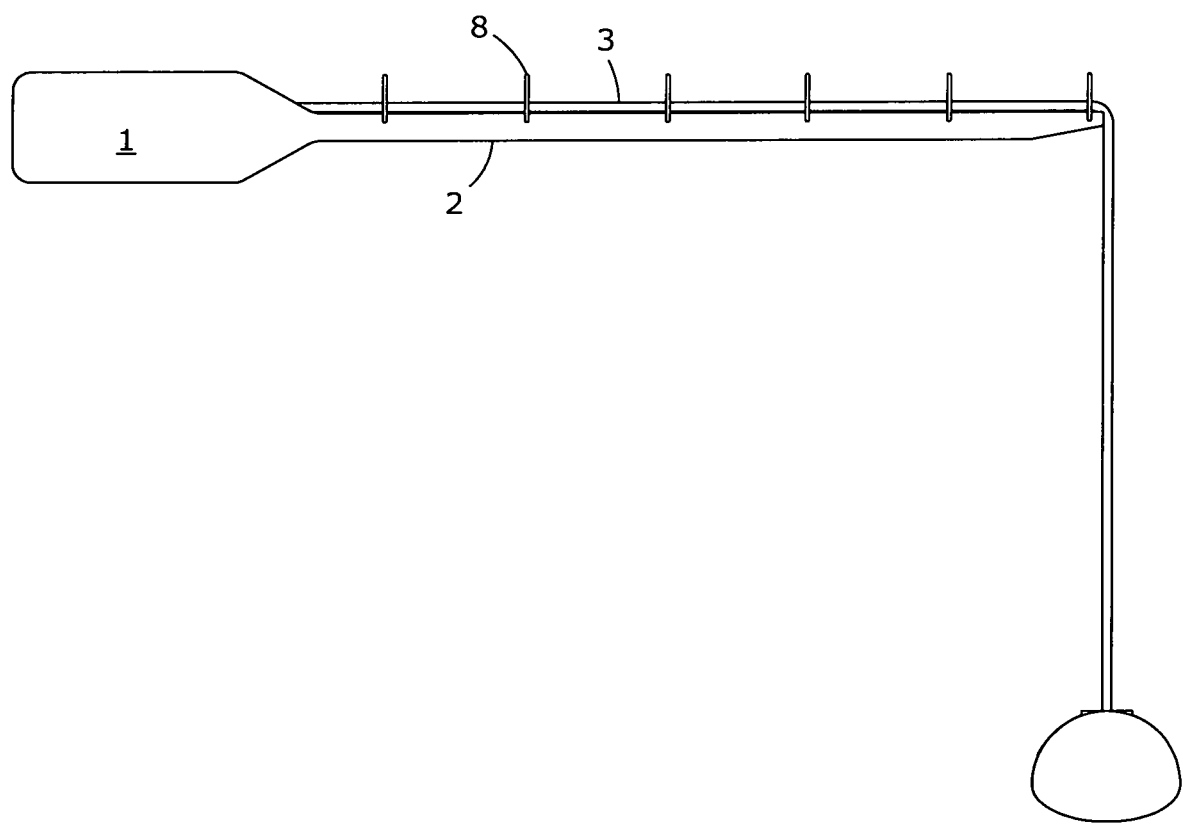
FIG. 4C shows a right view thereof, with a non-transparent container ball, which is open, and with a control panel visible, and with a light that is not in between the two halves of the container ball.
Figures 4D, 4E:
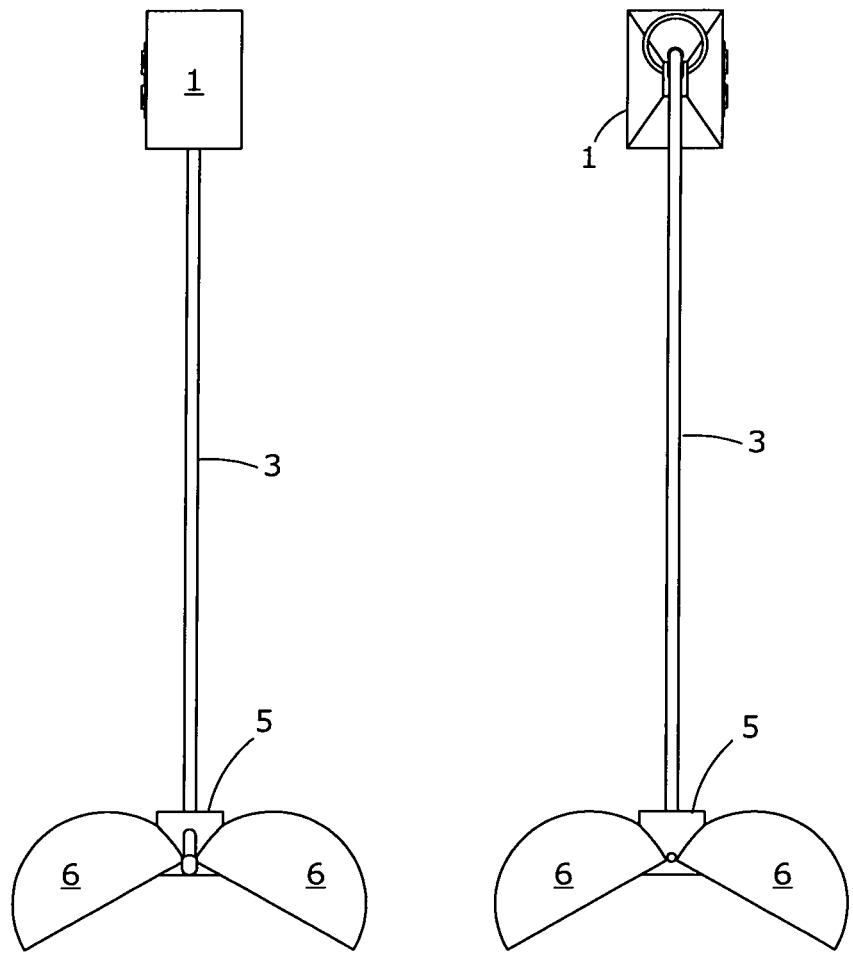
FIG. 4D shows a back view thereof.
FIG. 4E shows a front view thereof.

FIGS. 3B-3E show the third embodiment of the apparatus from several other angles. FIG. 4A shows a version of fourth embodiment of the apparatus, viewed from the left, with the container ball open. This version of the second embodiment includes a control panel on the handle. The control panel is designated by (7). (9) designates the light, and (6) designates both halves of the container ball. The light is powered by a wire that splits from the main wire group before the main wire group reaches the container connection device.

FIGS. 4B-4E show the fourth embodiment of the apparatus from several different angles.

Figure 5A:
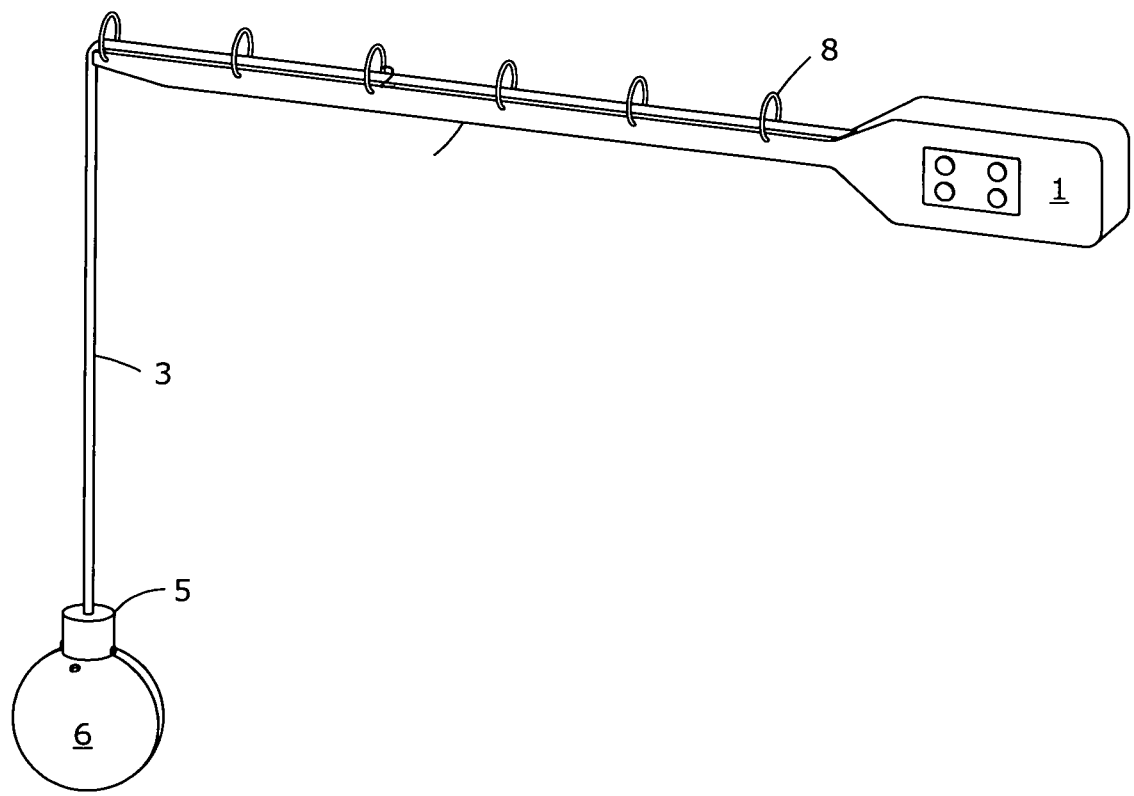
FIG. 5A shows a bird's-eye view of an example of the fifth embodiment of the apparatus, with a non-transparent container ball, which is closed, and with a control panel visible, and with a small hole in one of the two halves of the container ball.
Figure 5B:
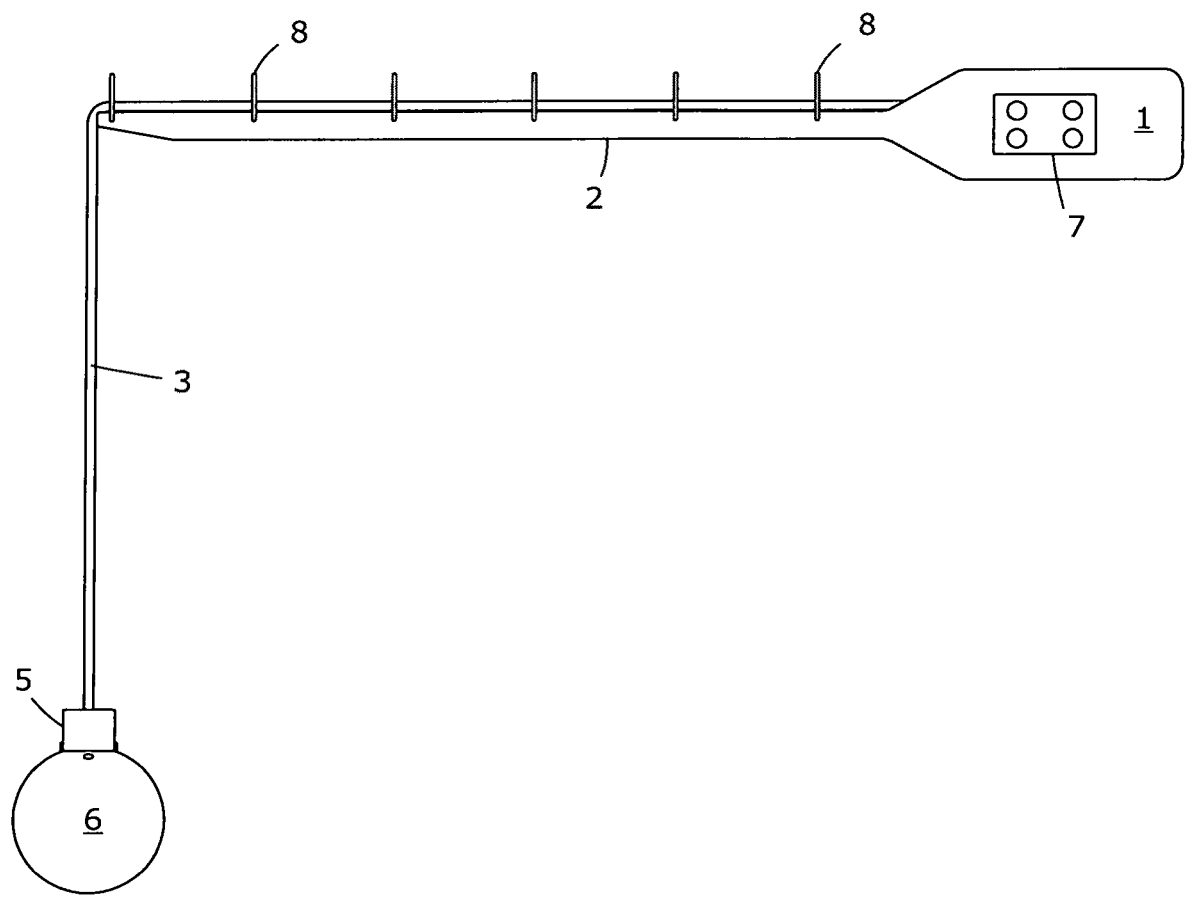
FIG. 5B shows a left view thereof, with a non-transparent container ball, which is closed, and with a control panel visible, and with a small hole in the top of one of the halves of the container ball.
Figure 5C:
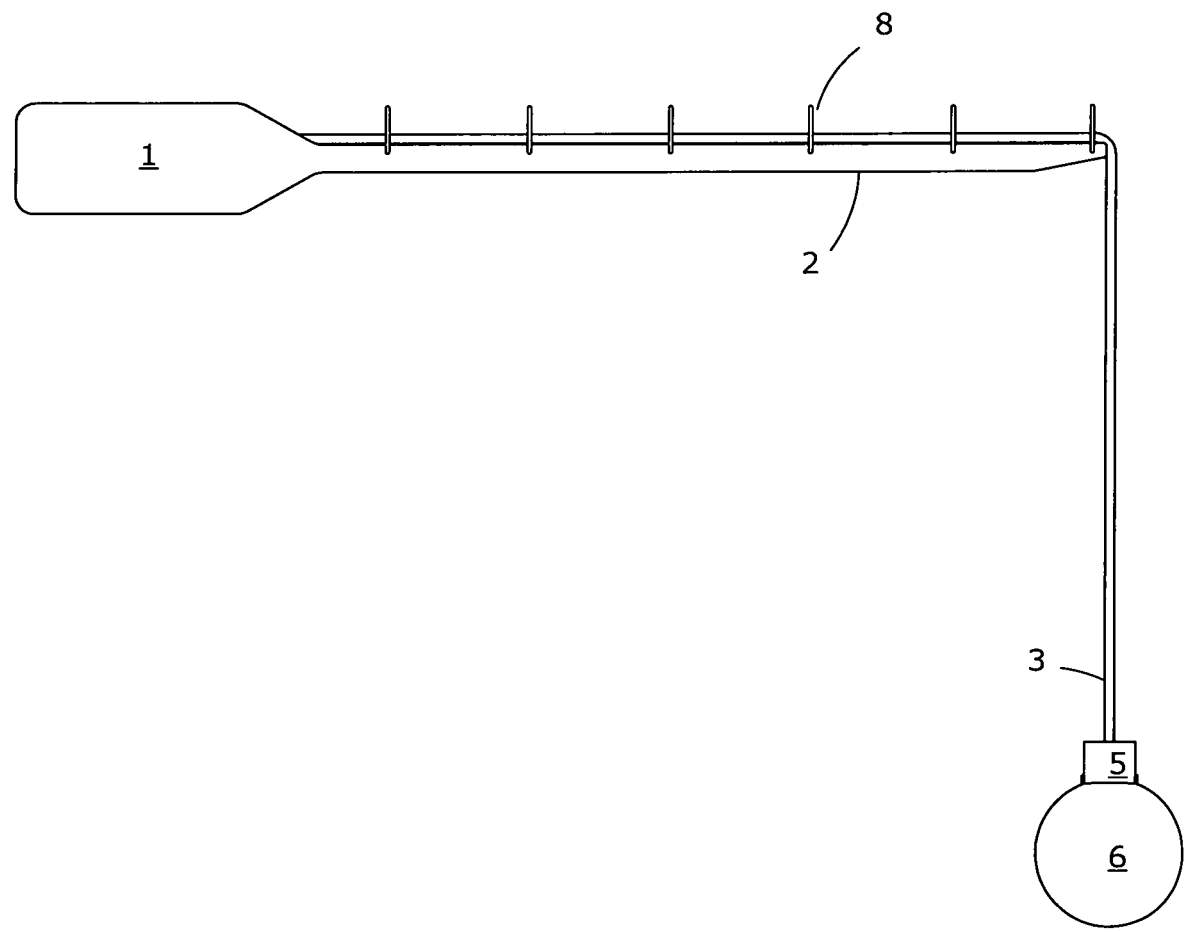
FIG. 5C shows a right view thereof, with a non-transparent container ball, which is closed, and with a control panel visible, and with a small hole in the top of one of the halves of the container ball.
Figure 5D:
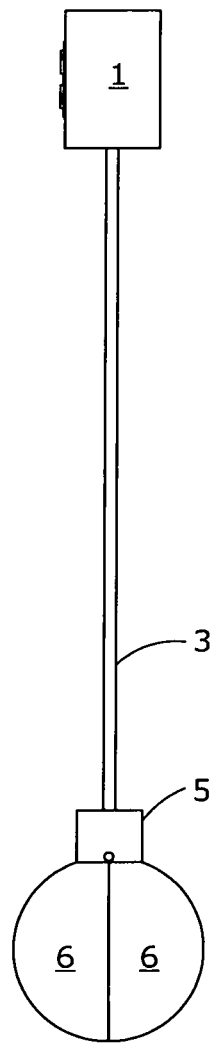
FIG. 5D shows a back view thereof.
Figure 5E:
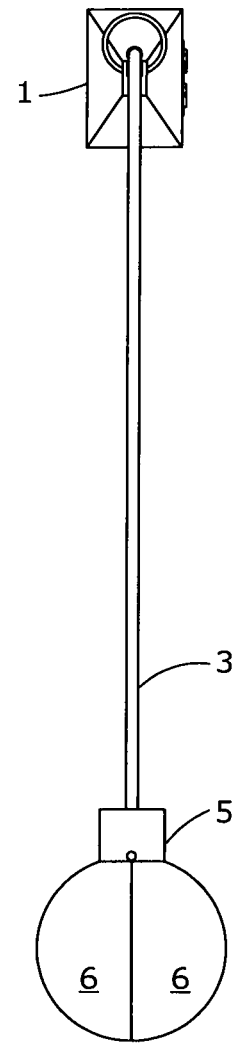
FIG. 5E shows a front view thereof.

FIG. 5A shows a version of the fifth embodiment of the apparatus, viewed from the left, with the container ball closed. A small opening can be seen on the top of one half of the container ball.

This version of the fifth embodiment includes a control panel on the handle. The main wire group extends over one of the wire holding rings, but through the others.

FIGS. 5B-5E show the fifth embodiment of the apparatus from different angles.

Figure 6A:
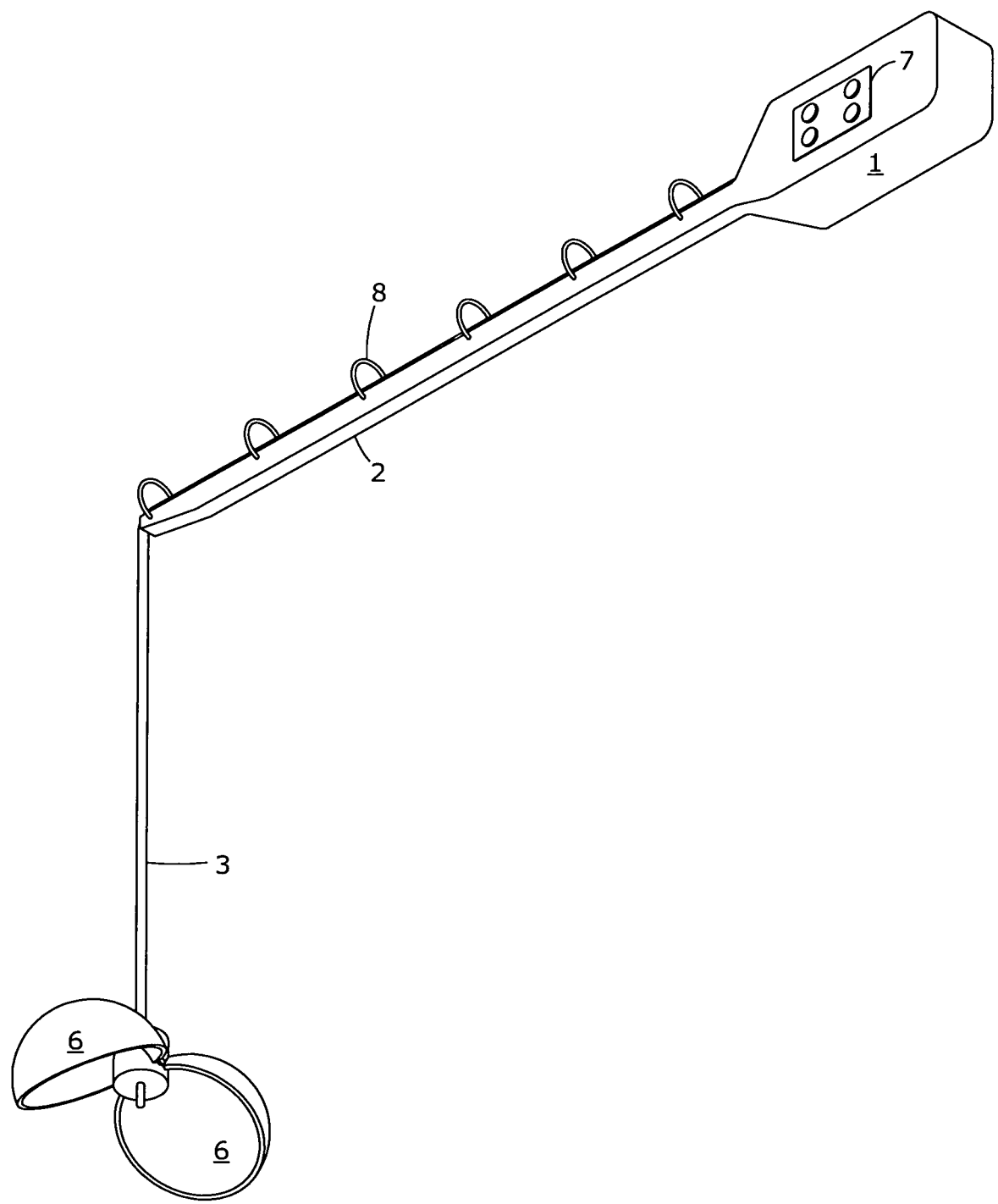
FIG. 6A shows a lower left view of an example of the sixth embodiment of the apparatus, with a non-transparent container ball, which is open, and with a control panel visible, and with a rod to which bait can be attached situated in between the two halves of the container ball.
Figure 6B:
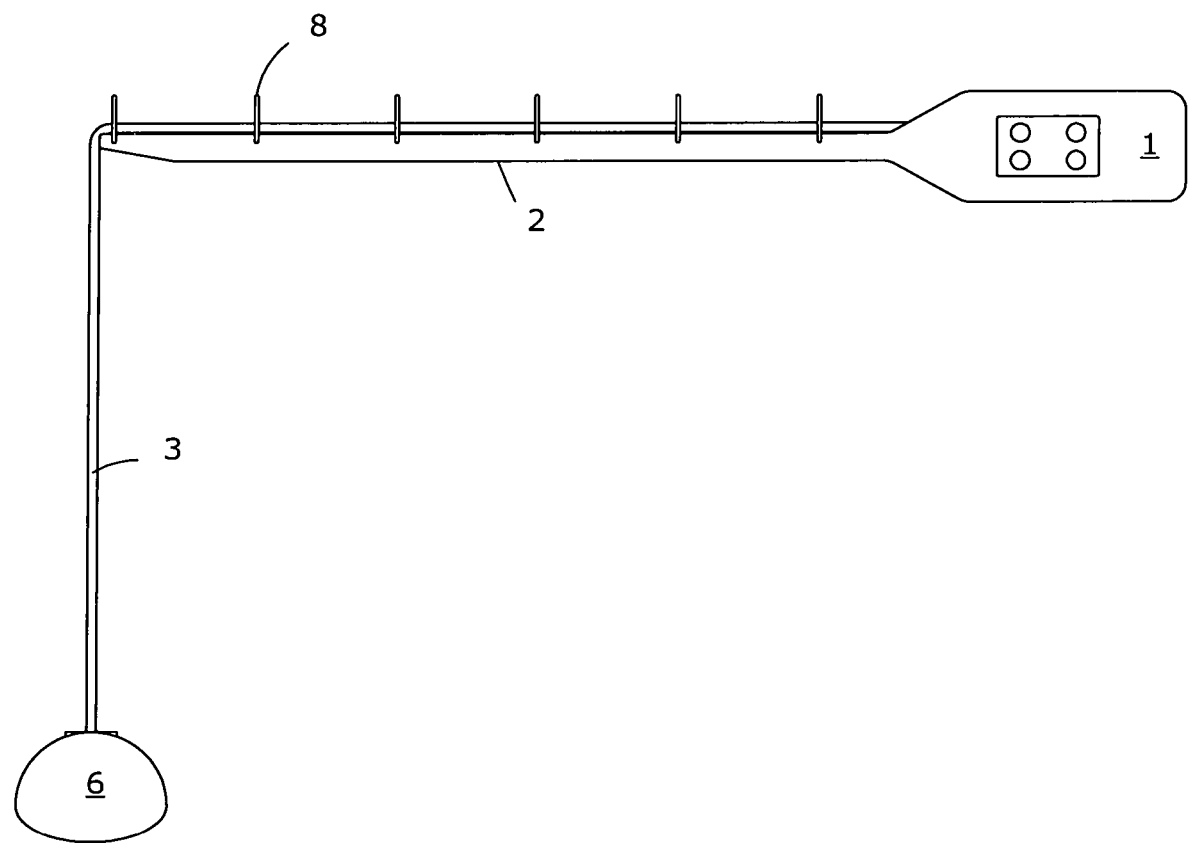
FIG. 6B shows a left view thereof, with a non-transparent container ball, which is open, and with a control panel visible, and with a rod to which bait can be attached situated in between the two halves of the container ball.
Figure 6C:
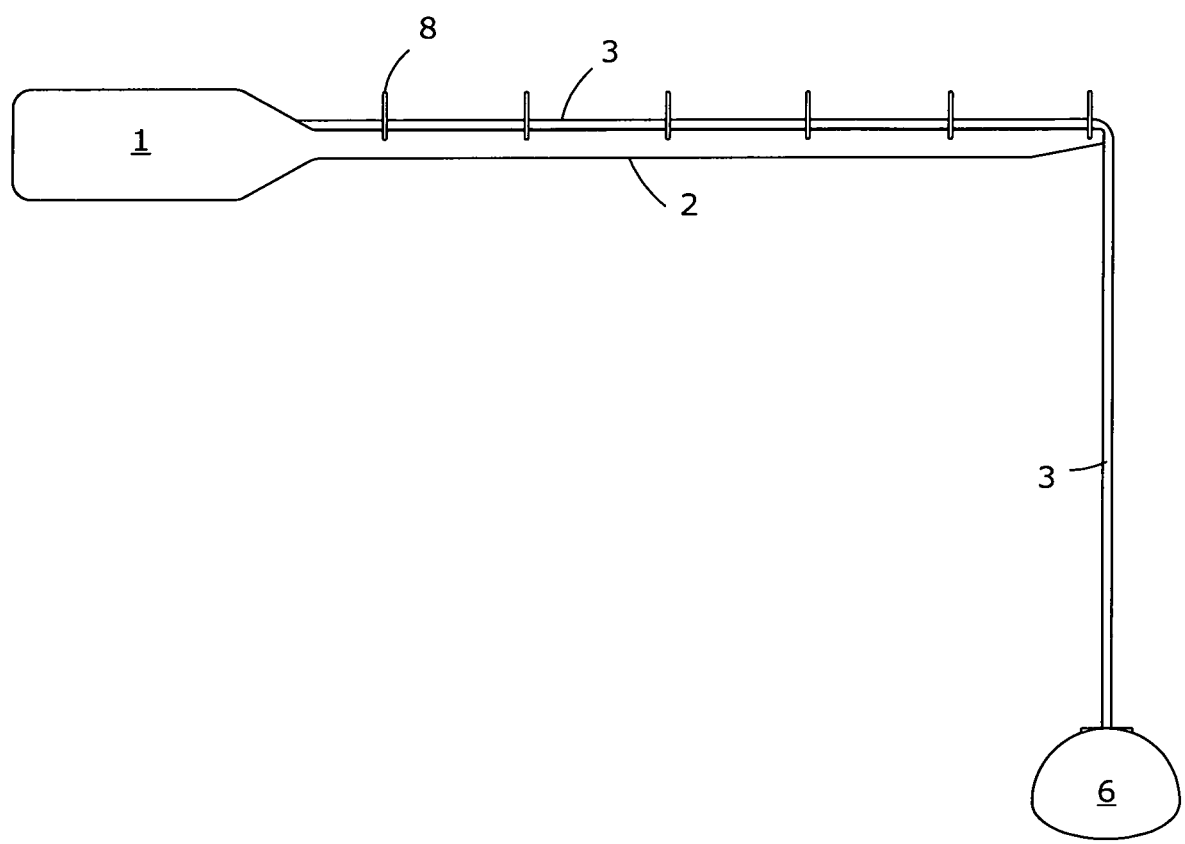
FIG. 6C shows a right view thereof, with a non-transparent container ball, which is open, and with a rod to which bait can be attached situated in between the two halves of the container ball.
Figures 6D, 6E:
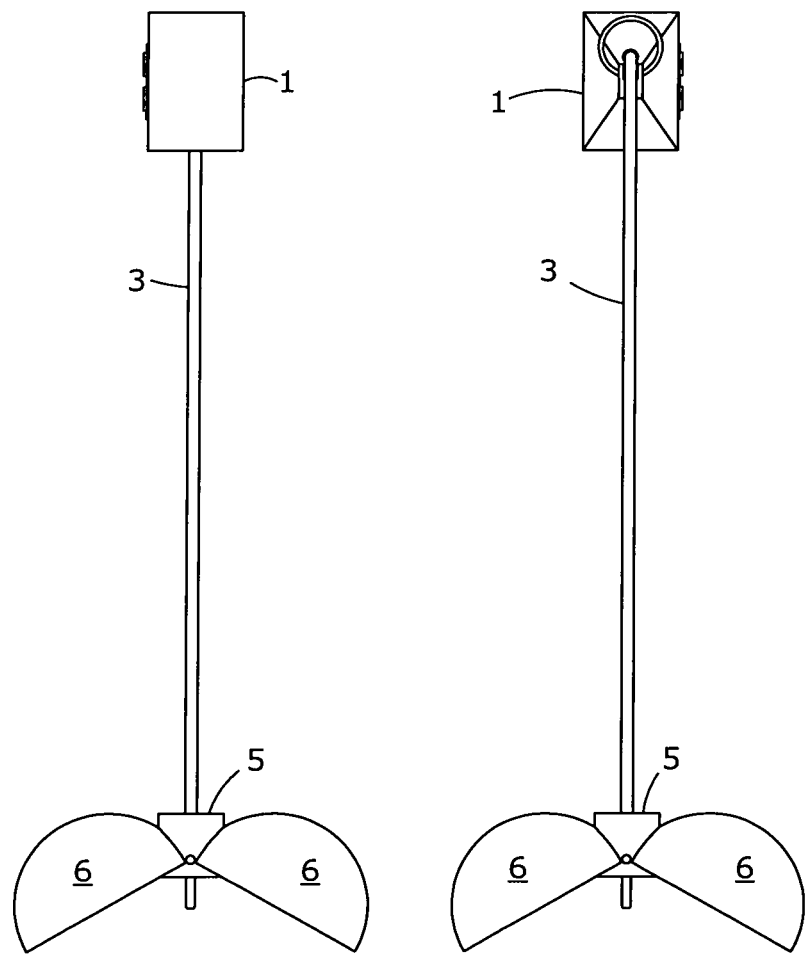
FIG. 6D shows a back view thereof.
FIG. 6E shows a front view thereof.

FIG. 6A shows a version of the sixth embodiment of the apparatus, viewed from the left, with the container ball open. The user can see the bait inside the container ball. If a creature eats the bait, the user will have an opportunity to catch the creature by causing the container ball to close.

FIGS. 6B-6E show the sixth embodiment of the invention from different angles.

Figure 7A:
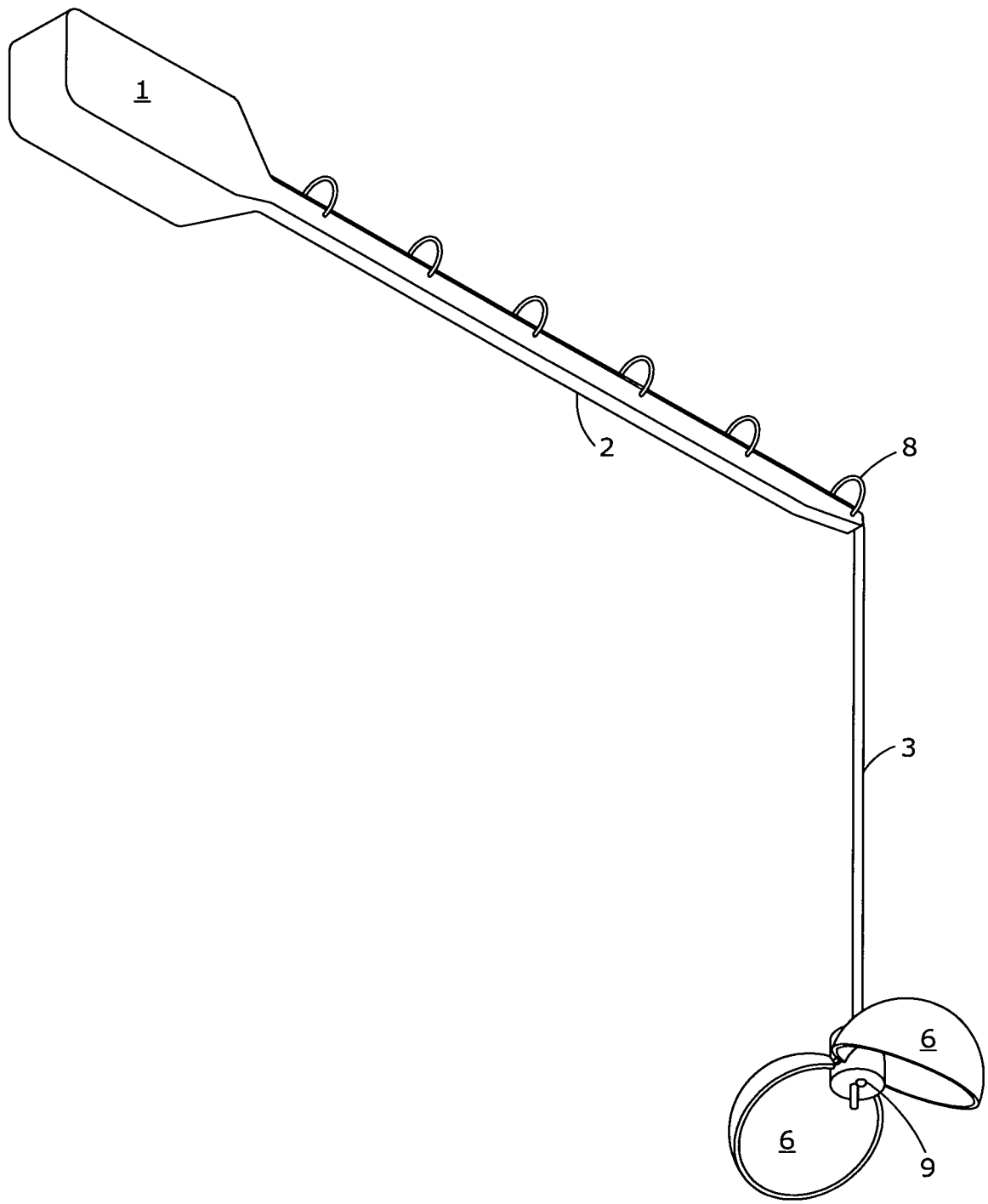
FIG. 7A shows a lower right view of an example of the seventh embodiment of the apparatus, with a non-transparent container ball, which is open, and with a rod for bait and a light in between the two halves of the container ball.
Figure 7B:
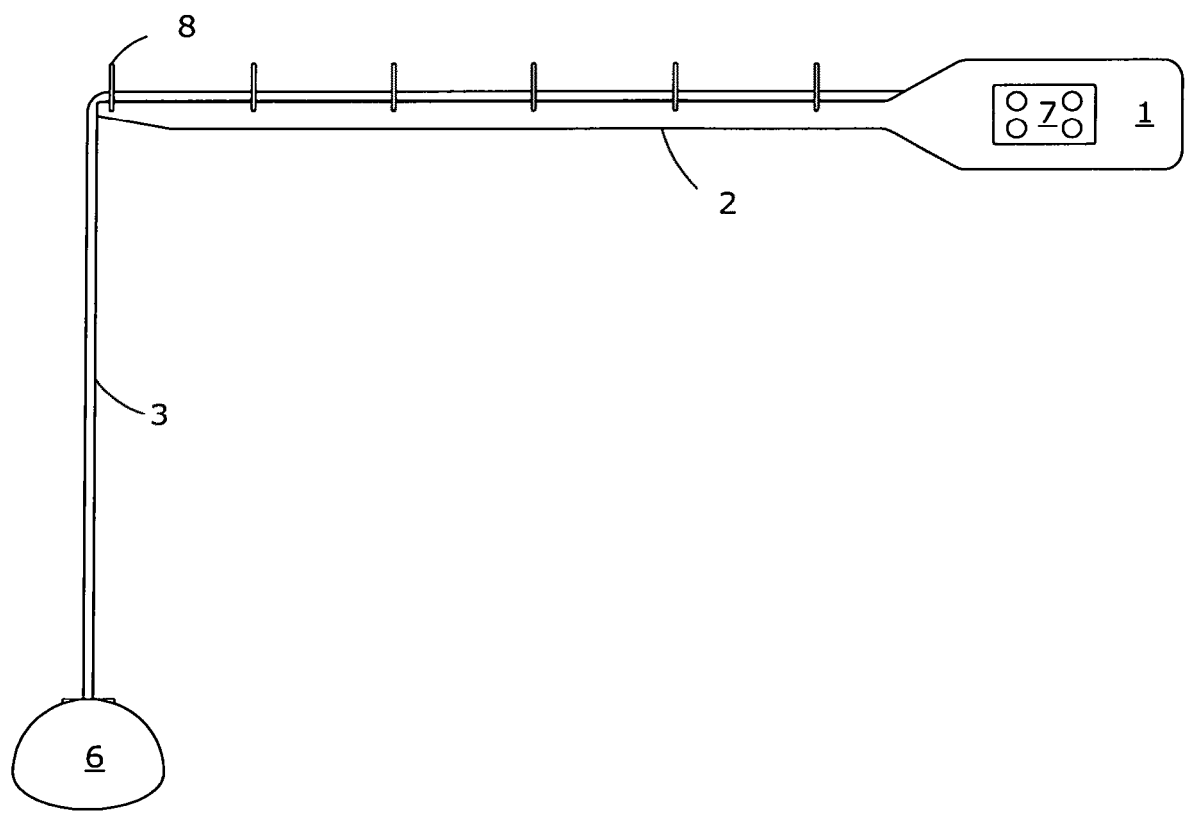
FIG. 7B shows a left view thereof, with a non-transparent container ball, which is open.
Figure 7C:
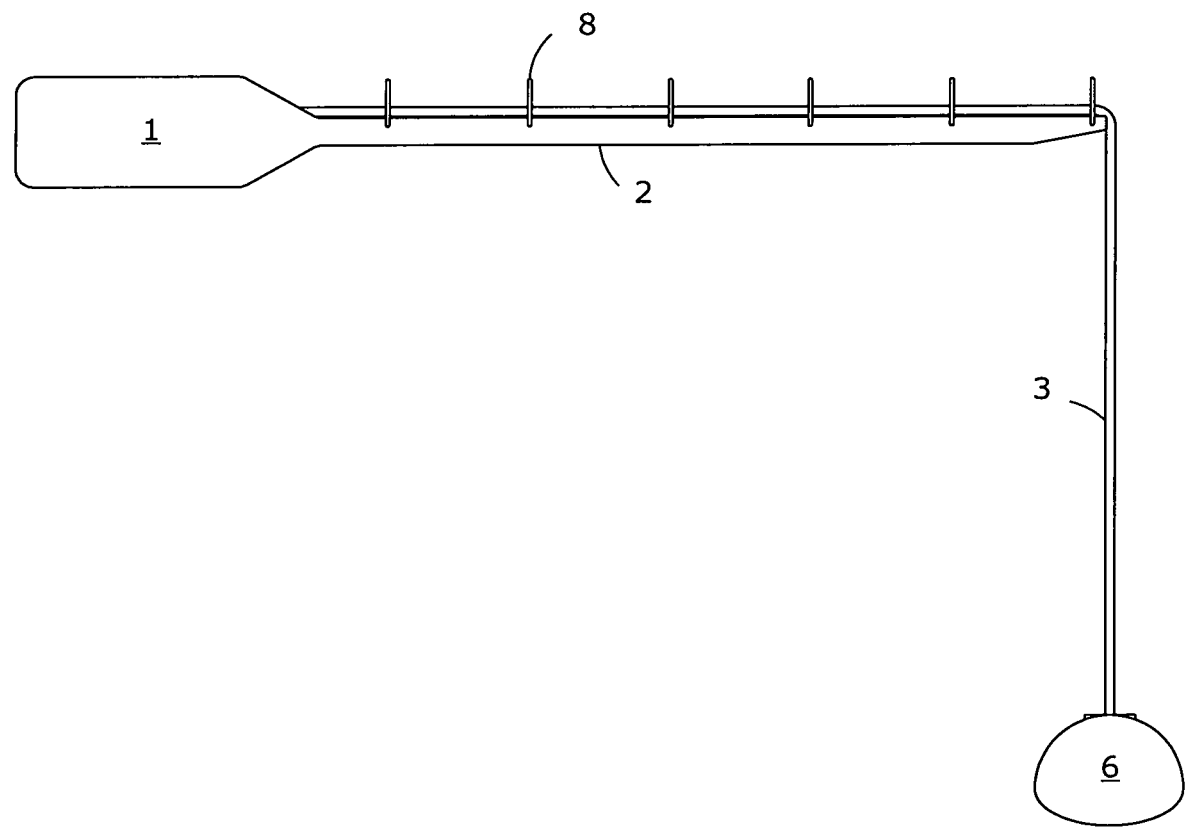
FIG. 7C shows a right view thereof, with a non-transparent container ball, which is open.
Figures 7D, 7E:
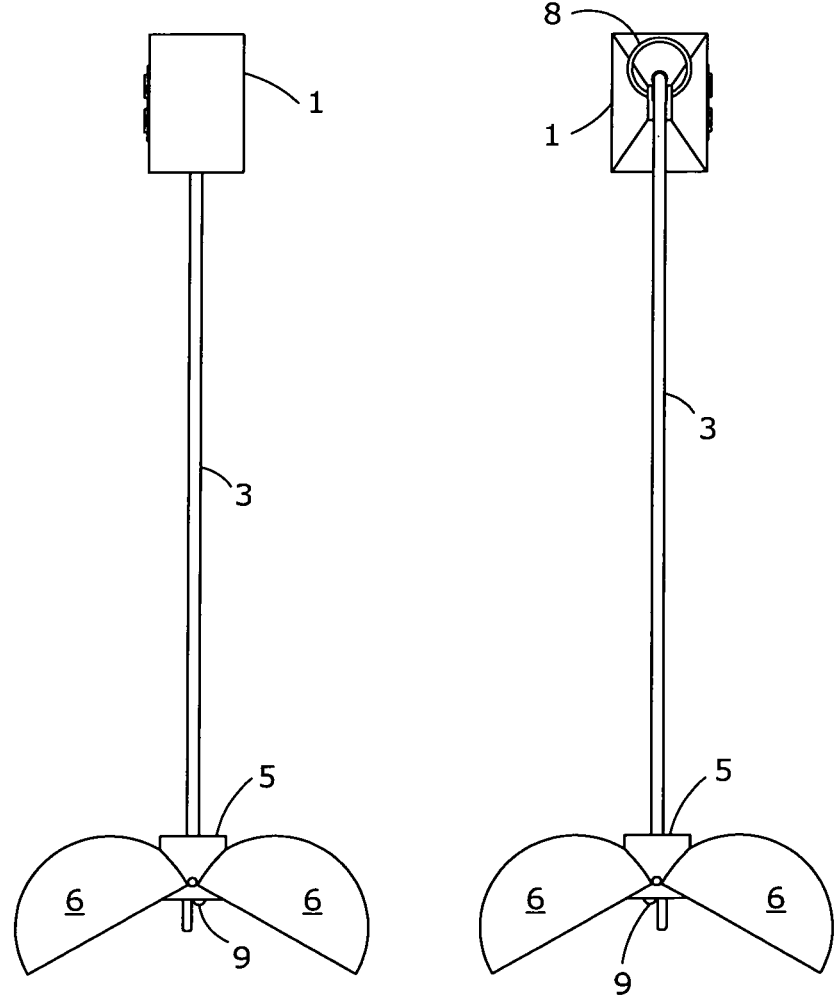
FIG. 7D shows a back view thereof.
FIG. 7E shows a front view thereof.

FIG. 7A shows a version of the seventh embodiment of the apparatus, viewed from the lower right, with the container ball open. Bait and a small light can be seen inside the container ball. (9) designates the small light and (6) designates the container ball. This particular version of the seventh embodiment does not have wire holding rings, but other versions of the seventh embodiment can have wire holding rings.

FIGS. 7B-7E show the seventh embodiment of the apparatus from different angles.

Figure 8A:
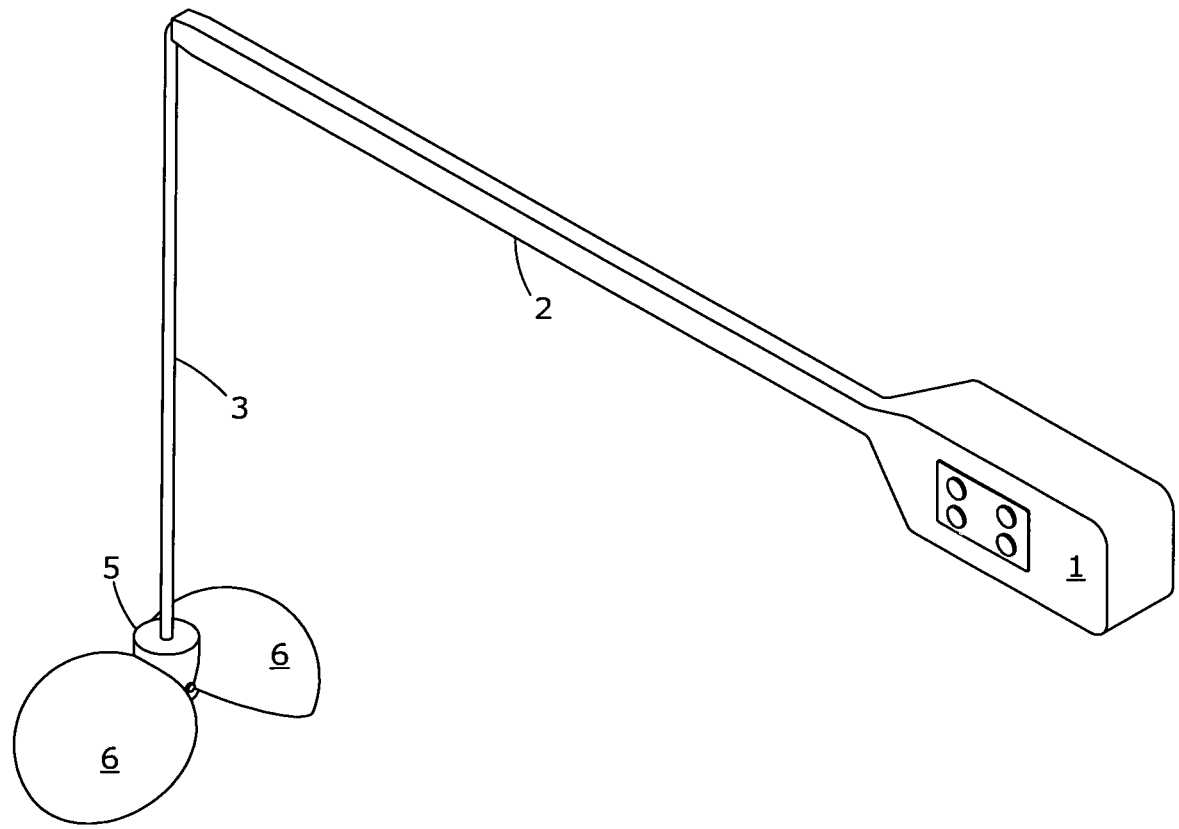
FIG. 8A shows a bird's-eye, cut-away view of an example of the eighth embodiment of the apparatus, with a non-transparent container ball, which is open, and with a control panel visible.
Figure 8B:
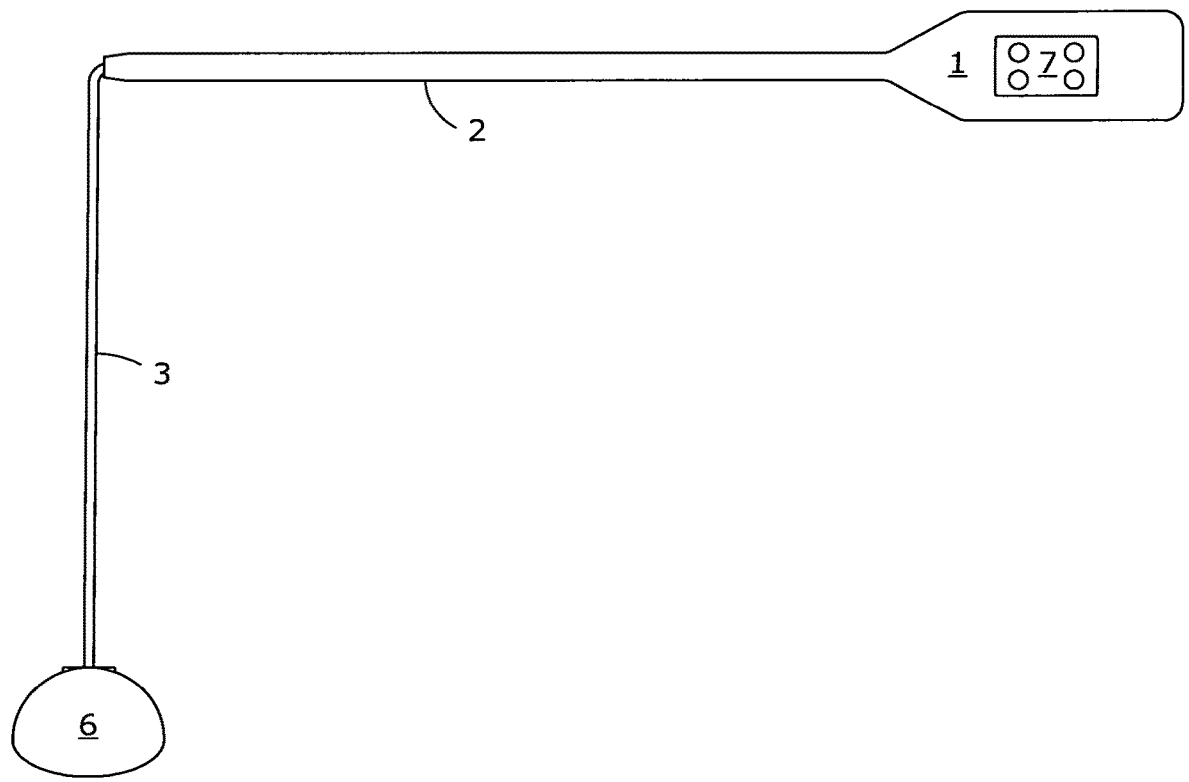
FIG. 8B shows a left view thereof, with a non-transparent container ball, which is open, and with a control panel visible.
Figure 8C:
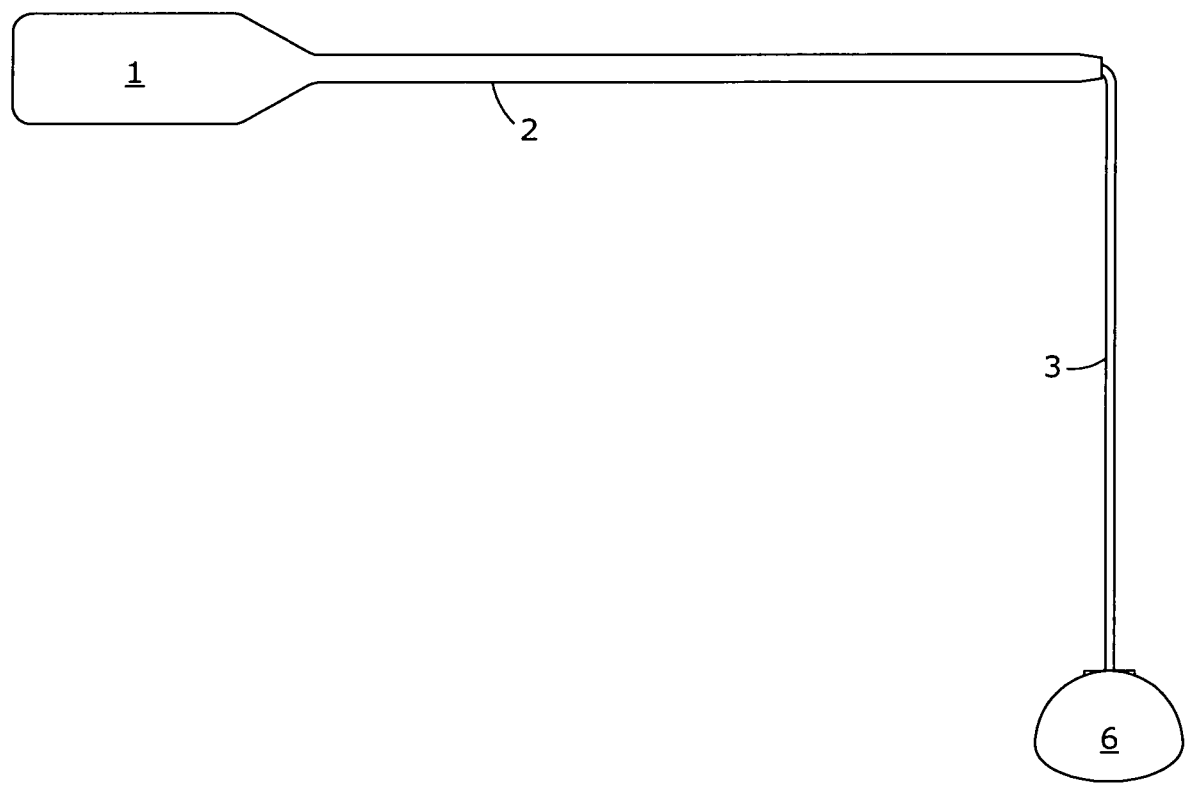
FIG. 8C shows a right view thereof, with a non-transparent container ball, which is open.
Figures 8D, 8E:
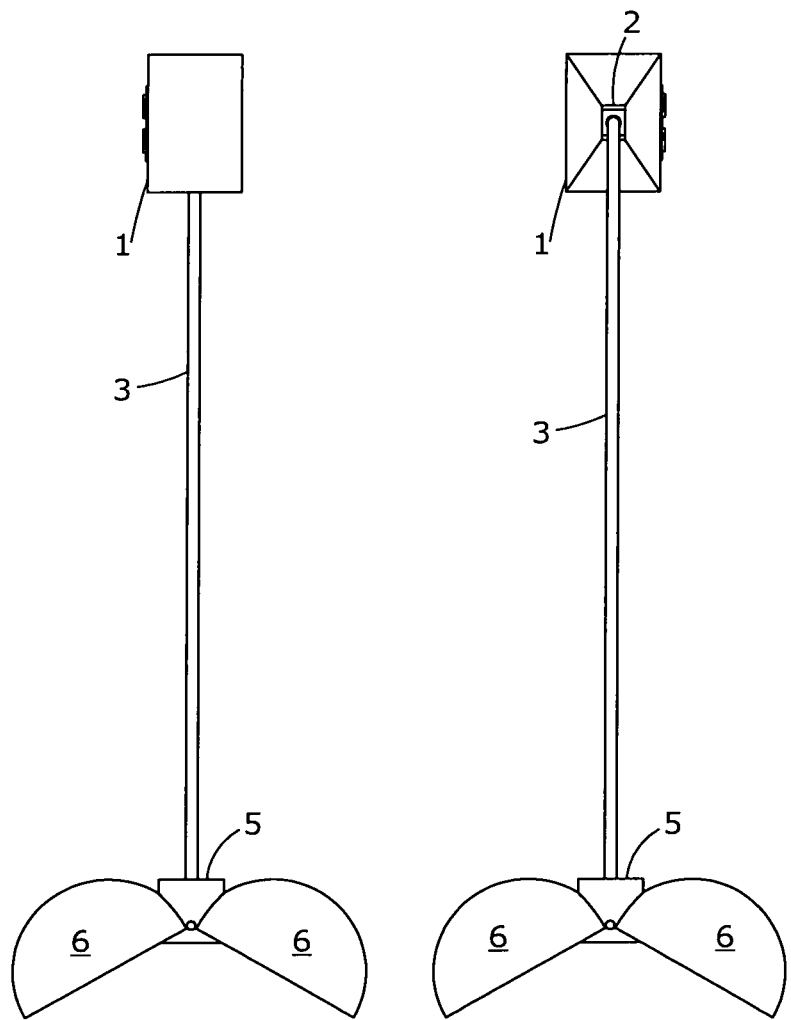
FIG. 8D shows a back view thereof.
FIG. 8E shows a front view thereof.

FIG. 8A shows a "cut-away" version of the eighth embodiment of the invention, viewed from the left, with the container ball open. The main wire group can be seen inside the long rod.

FIGS. 8B-8E show the same version of the apparatus, from several different angles.

Figure 9A:
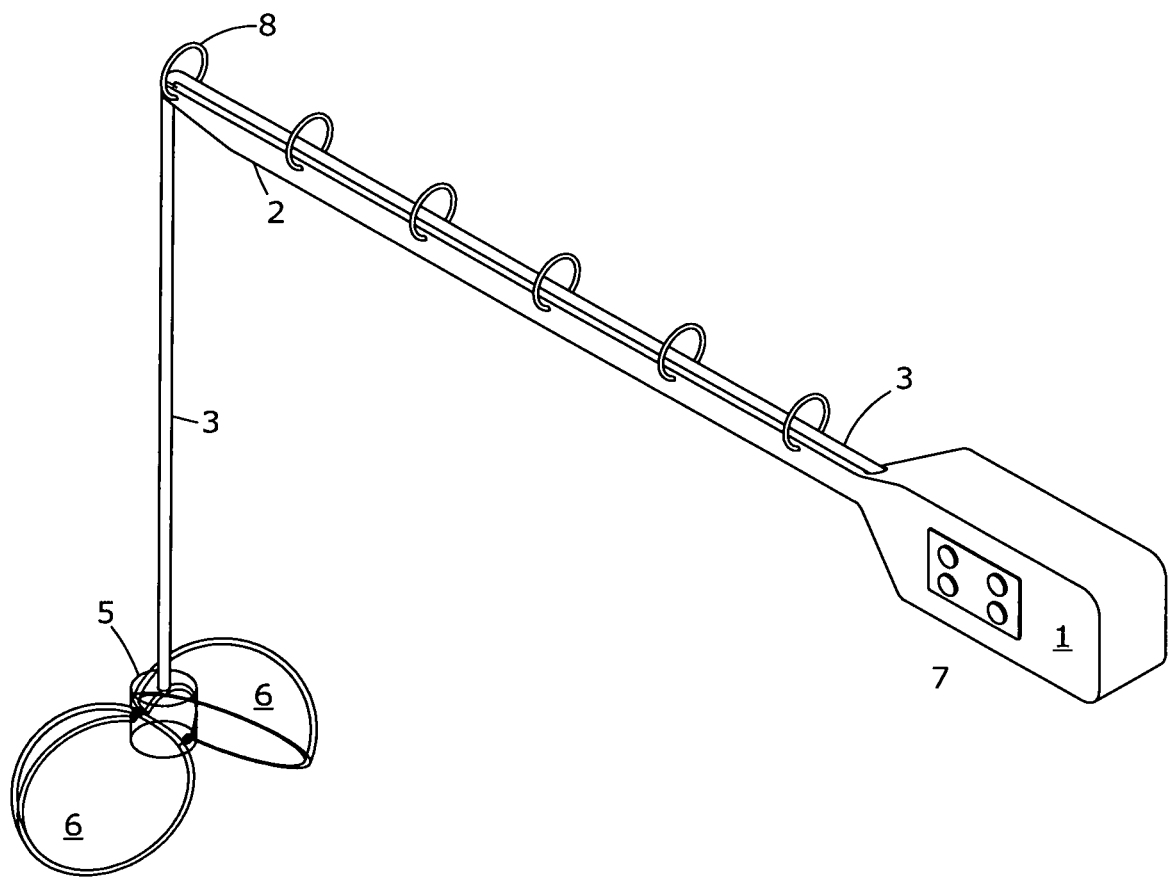
FIG. 9A shows a bird's-eye view of an example of the ninth embodiment of the apparatus, with a transparent container ball, which is open, and with a control panel visible.
Figure 9B:
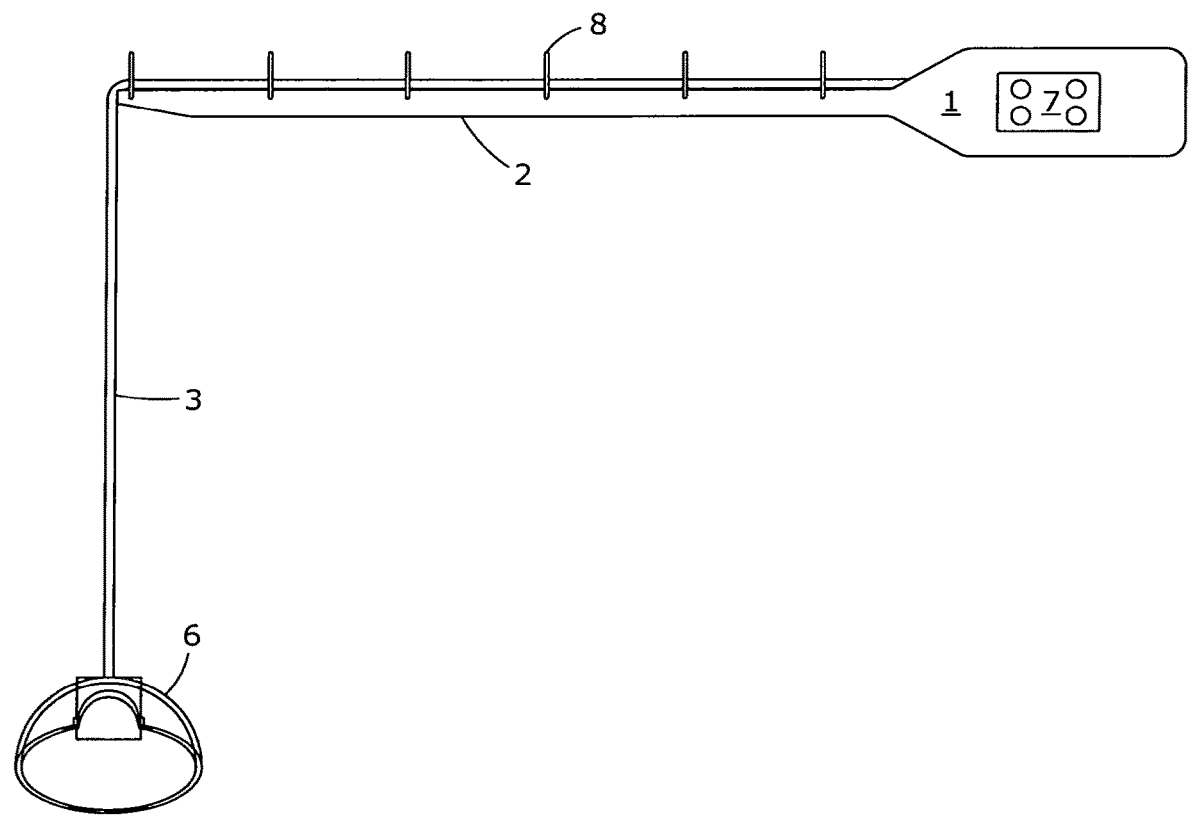
FIG. 9B shows a left view thereof, with a transparent container ball, which is open.
Figure 9C:
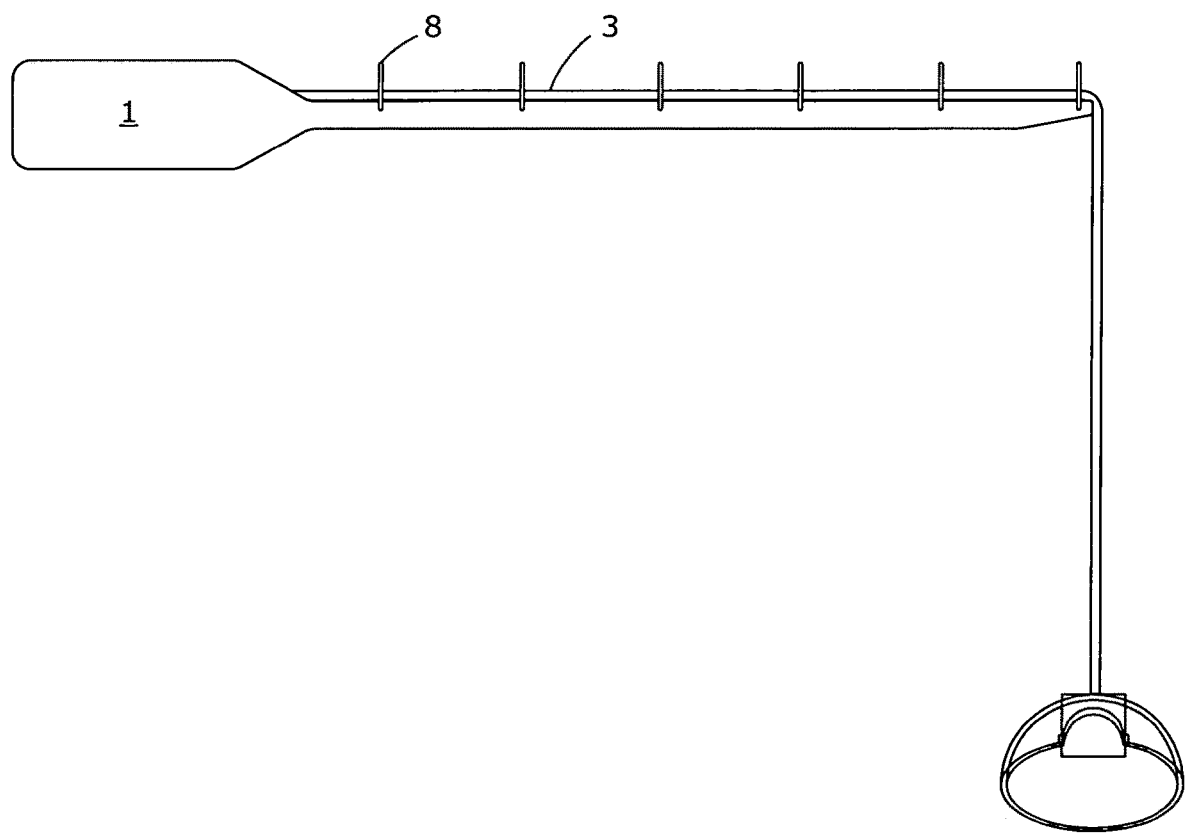
FIG. 9C shows a right view thereof, with a transparent container ball, which is open.
Figures 9D, 9E:
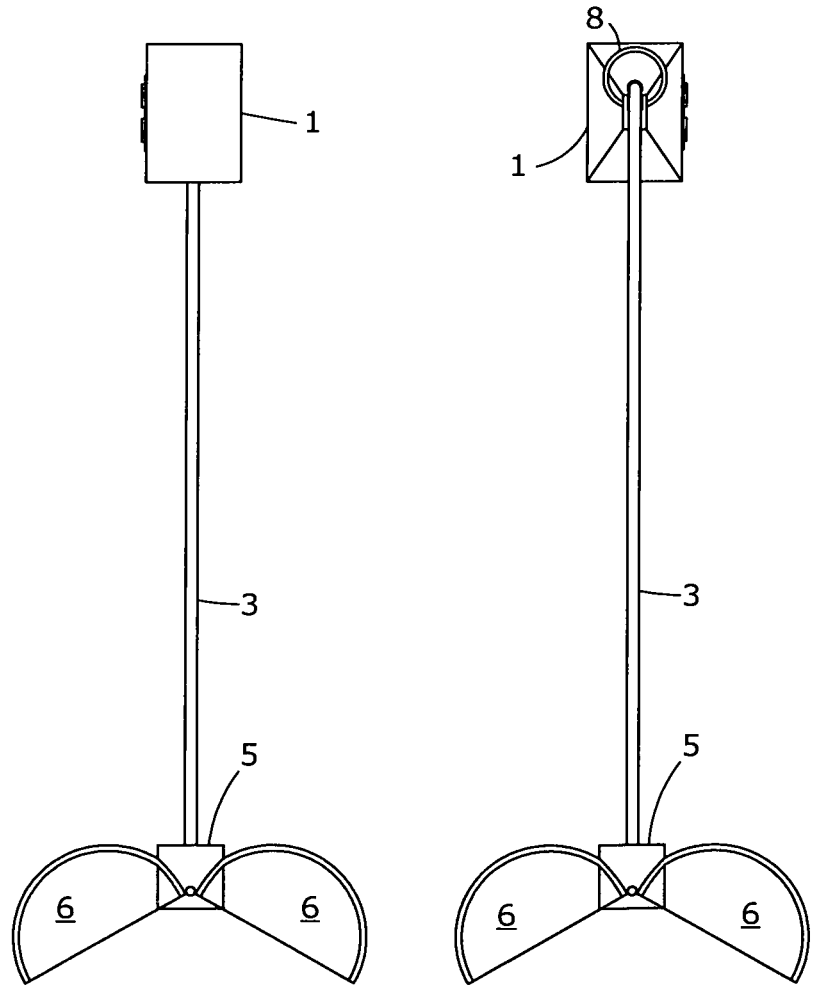
FIG. 9D shows a back view thereof.
FIG. 9E shows a front view thereof.

FIG. 9A shows a version of the ninth embodiment of the apparatus, viewed from the right, with the container ball open.

Figure 10A:
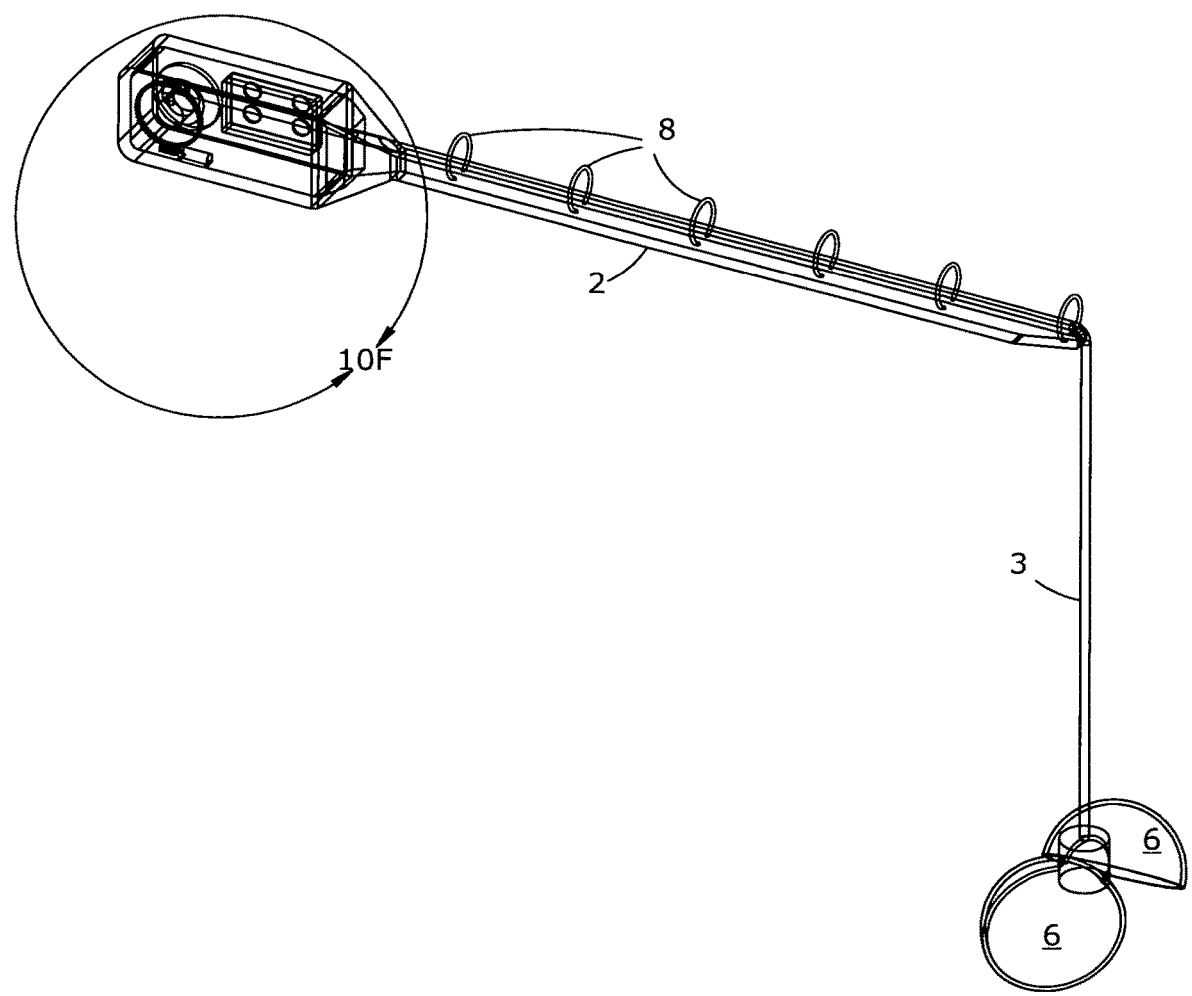
FIG. 10A shows a bird's-eye view of an example of the tenth embodiment of the apparatus, with a transparent container ball, which is open, with a transparent handle, and transparent long rod, and with a control panel visible.
Figure 10B:
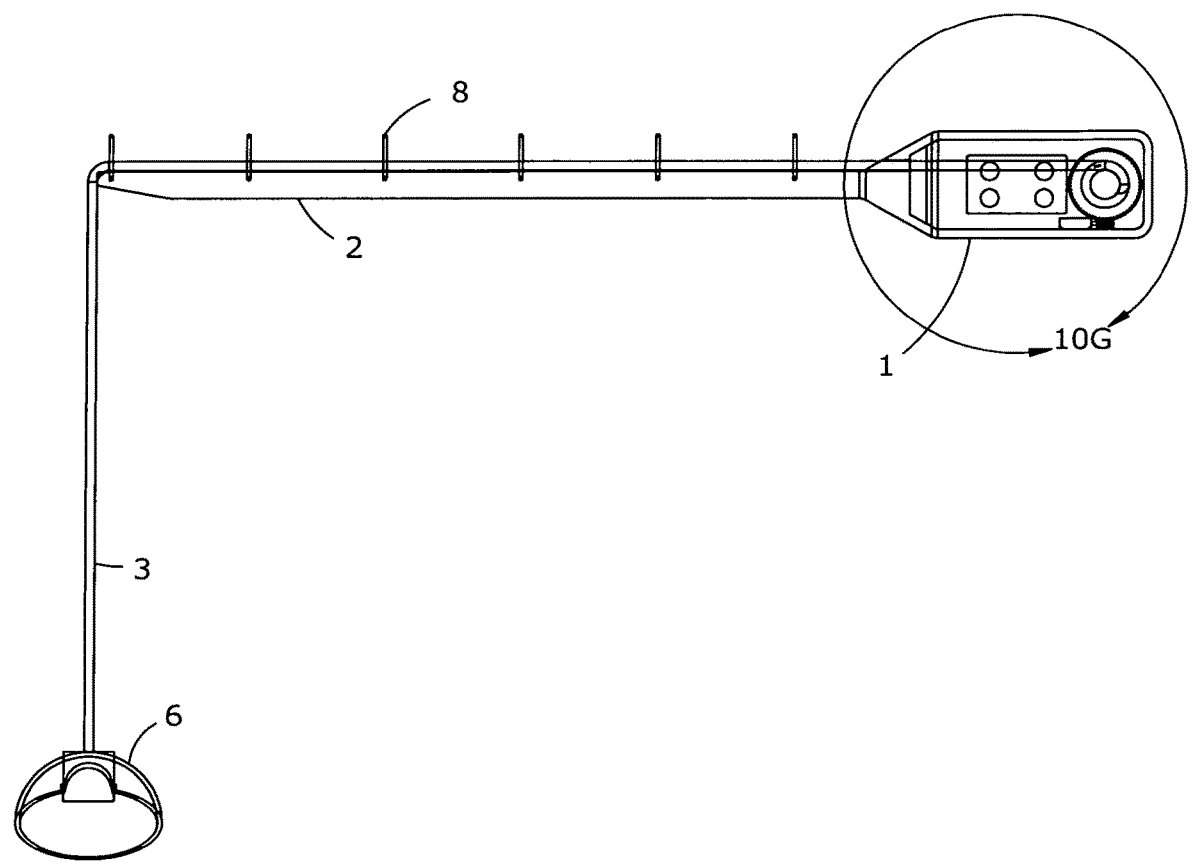
FIG. 10B shows a left view thereof, with a transparent handle, and transparent long rod, and transparent container ball, which is open.
Figure 10C:
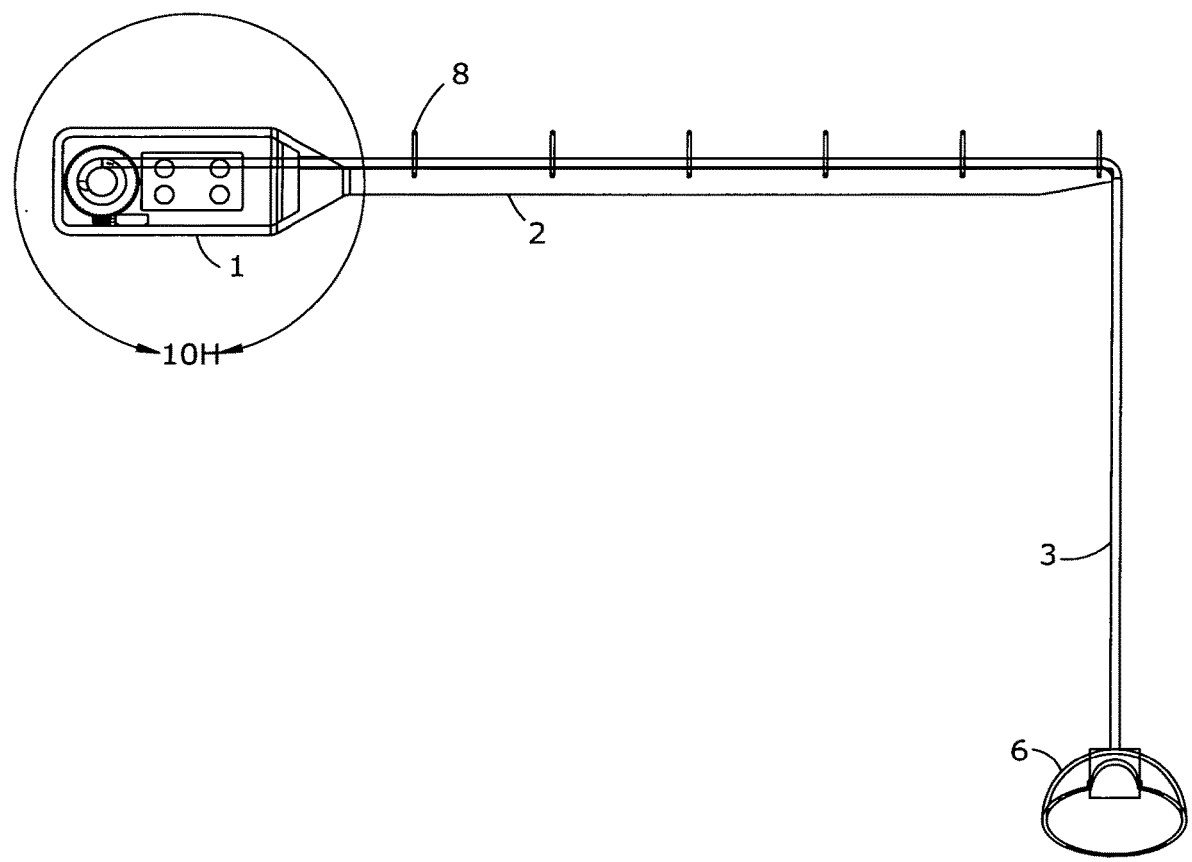
FIG. 10C shows a right view thereof, with a transparent handle, and transparent long rod, and transparent container ball, which is open.
Figures 10D, 10E:
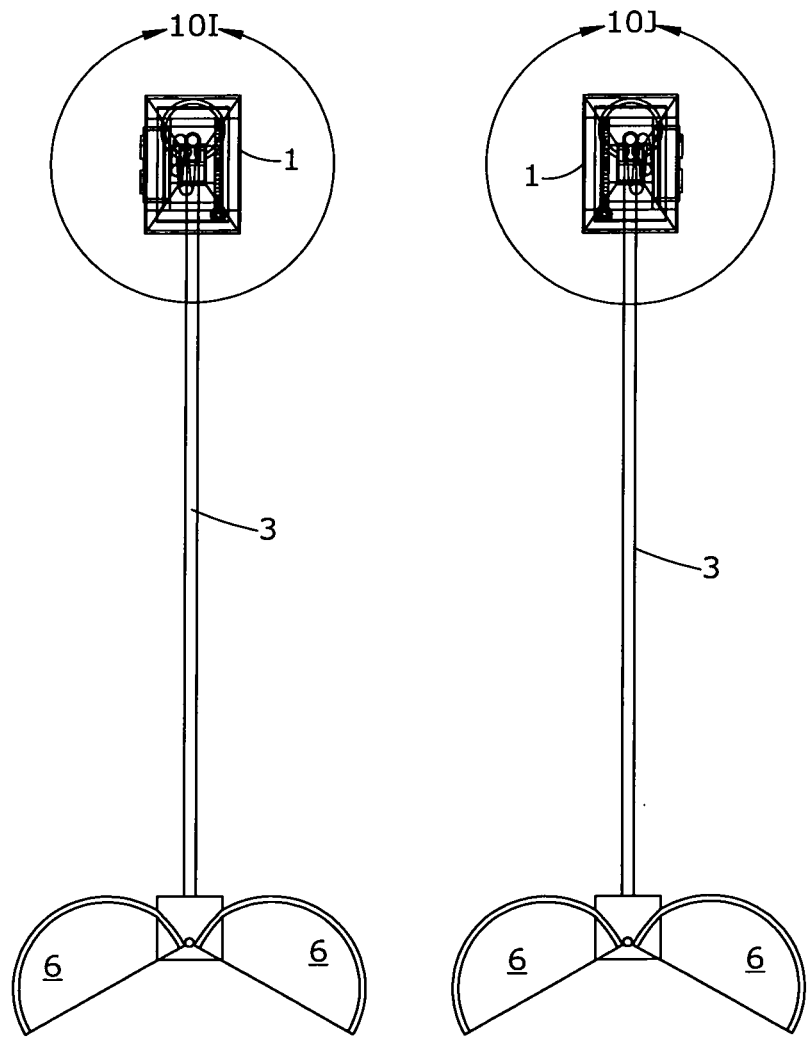
FIG. 10D shows a back view thereof.
FIG. 10E shows a front view thereof.
Figure 10F:
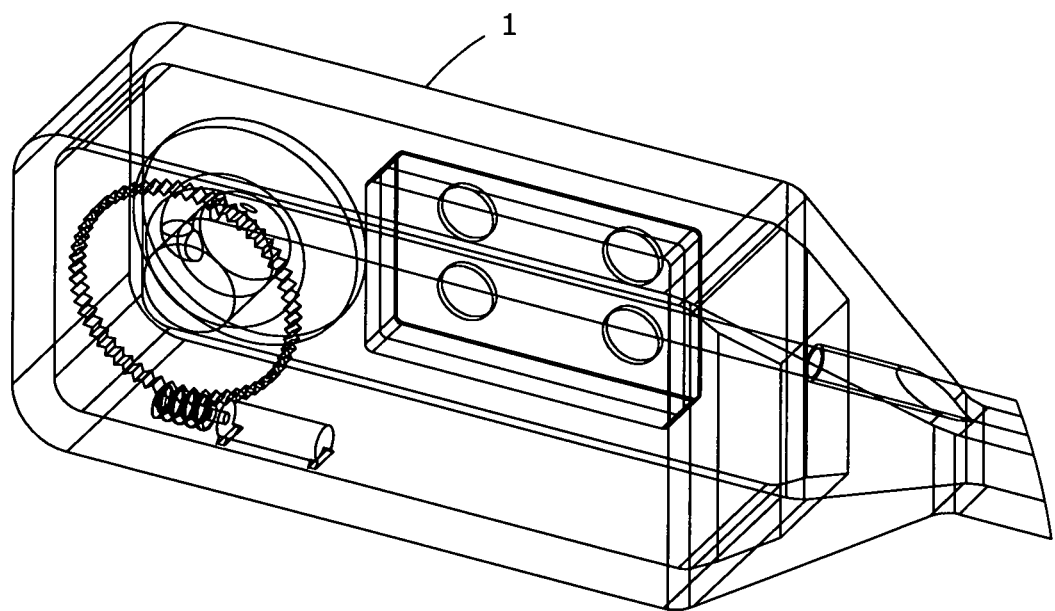
FIG. 10F shows a close-up view of the transparent handle that is shown in FIG. 10A.
Figure 10G:
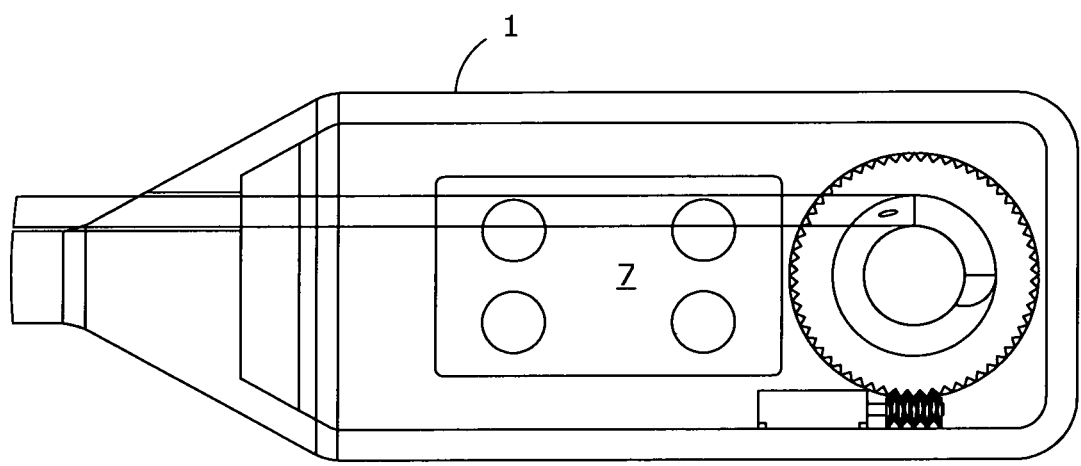
FIG. 10G shows a close-up left view of the transparent handle that is shown in FIGS. 10A, 10B, 10C, 10D, and 10E.
Figure 10H:
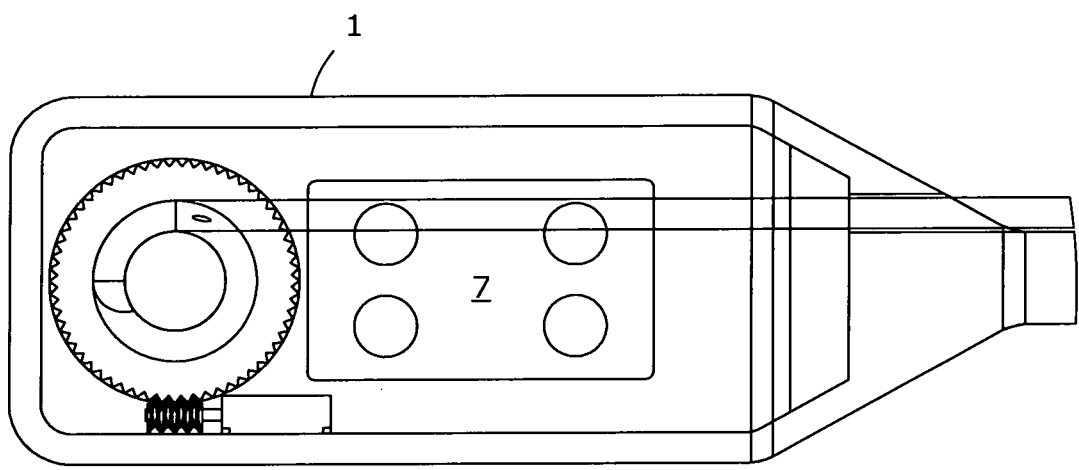
FIG. 10H shows a close-up right view of the transparent handle that is shown in FIGS. 10A, 10B, 10C, 10D, and 10E.
Figure 10I:
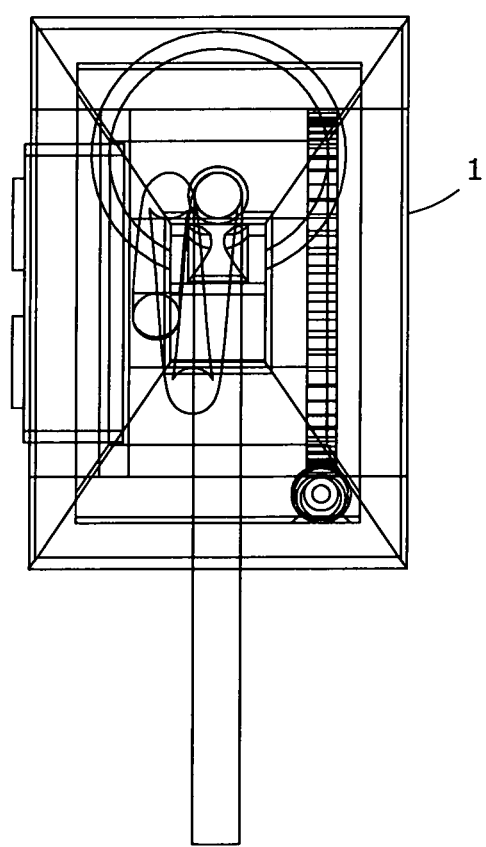
FIG. 10I shows a close-up back view of the transparent handle that is shown in FIGS. 10A, 10B, 10C, 10D, and 10E.
Figure 10J:
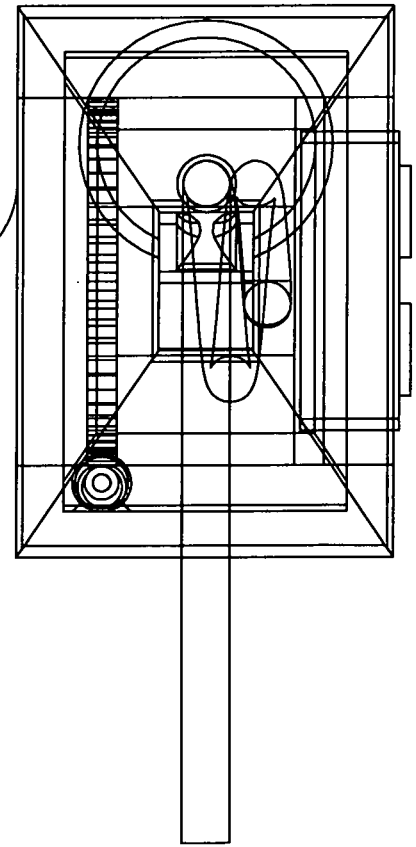
FIG. 10J shows a close-up front view of the transparent handle that is shown in FIGS. 10A, 10B, 10C, 10D, and 10E.

FIG. 10A shows a version of the tenth embodiment of the apparatus, viewed from the left, with the container ball open. The viewer can also see, inside the handle, an internal reel, and see how the main wire group is wrapped around this reel. The viewer can also see wires going from several controls to a small processor, inside the handle. The main wire group enters the handle and wraps around the internal reel. The small processor controls the internal reel, and also sends signals to the main wire group. Signals can then be sent through the main wire group to the container ball, causing the container ball to open and close.

FIGS. 10B-10E show the tenth embodiment of the apparatus, from different angles.

FIGS. 10F-10I show close-up pictures of the handle of the tenth embodiment of the apparatus.

Figure 11A:
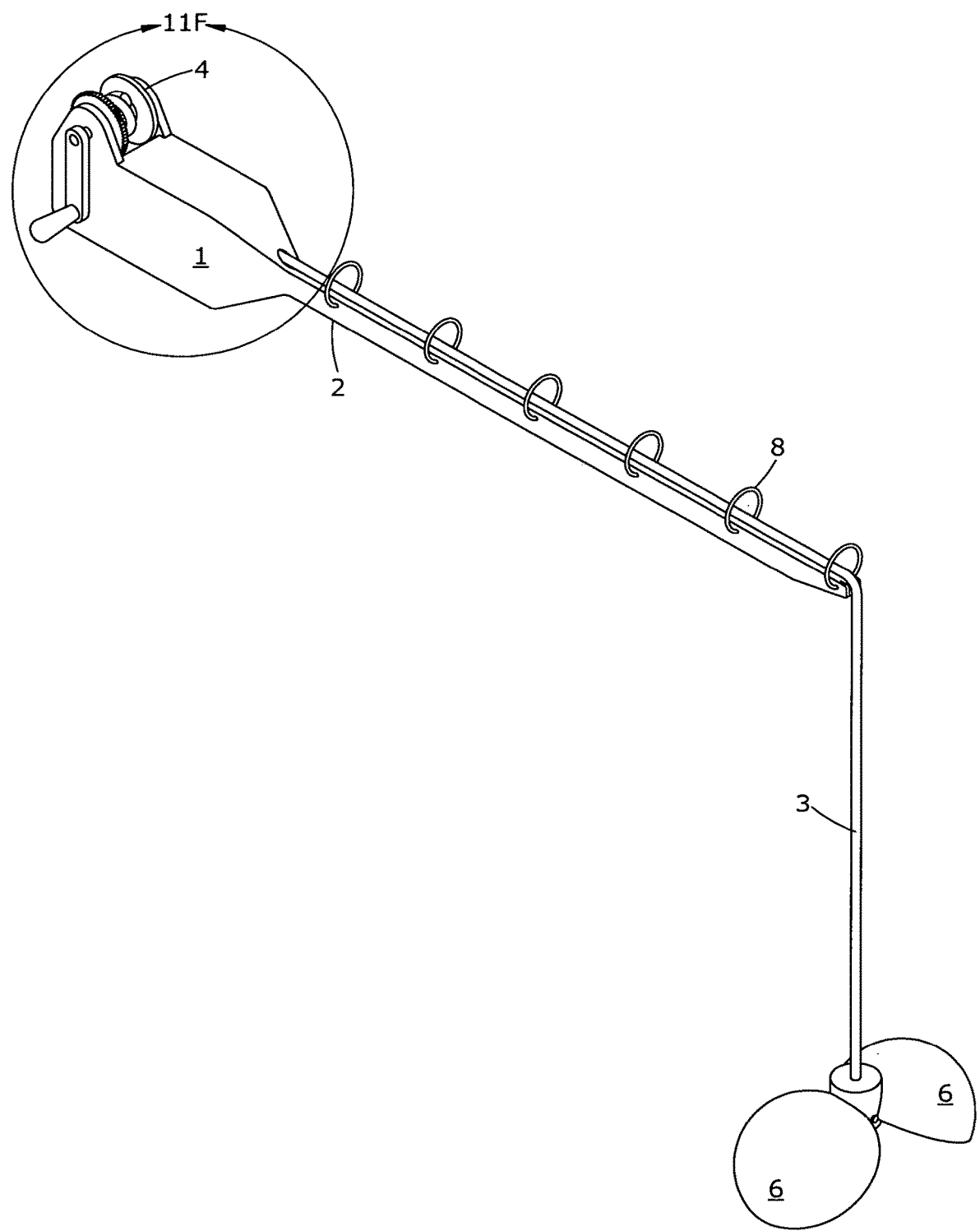
FIG. 11A shows a bird's-eye view of an example of the eleventh embodiment of the apparatus, with a non-transparent container ball, which is open, and with a control panel visible, and with an external reel.
Figure 11B:
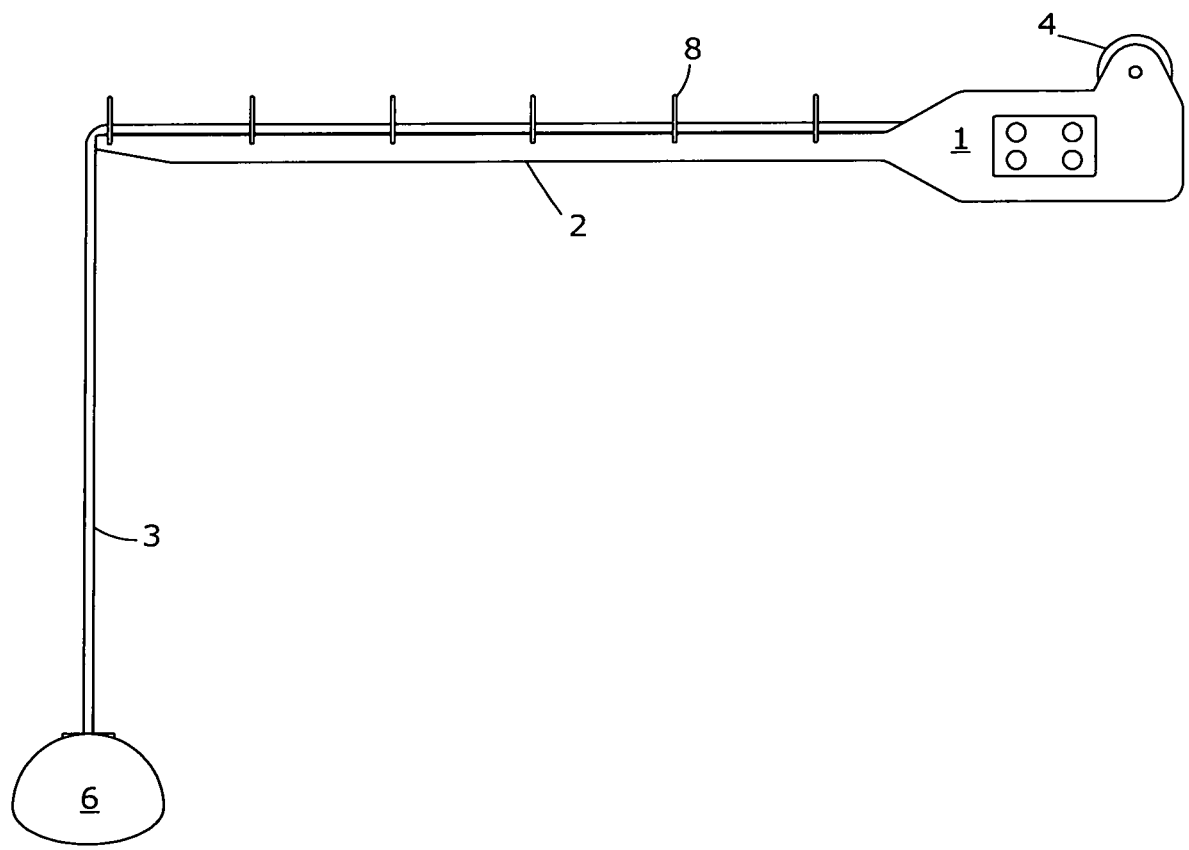
FIG. 11B shows a left view thereof, with a non-transparent container ball, which is open, and with a control panel visible, and with an external reel.
Figure 11C:
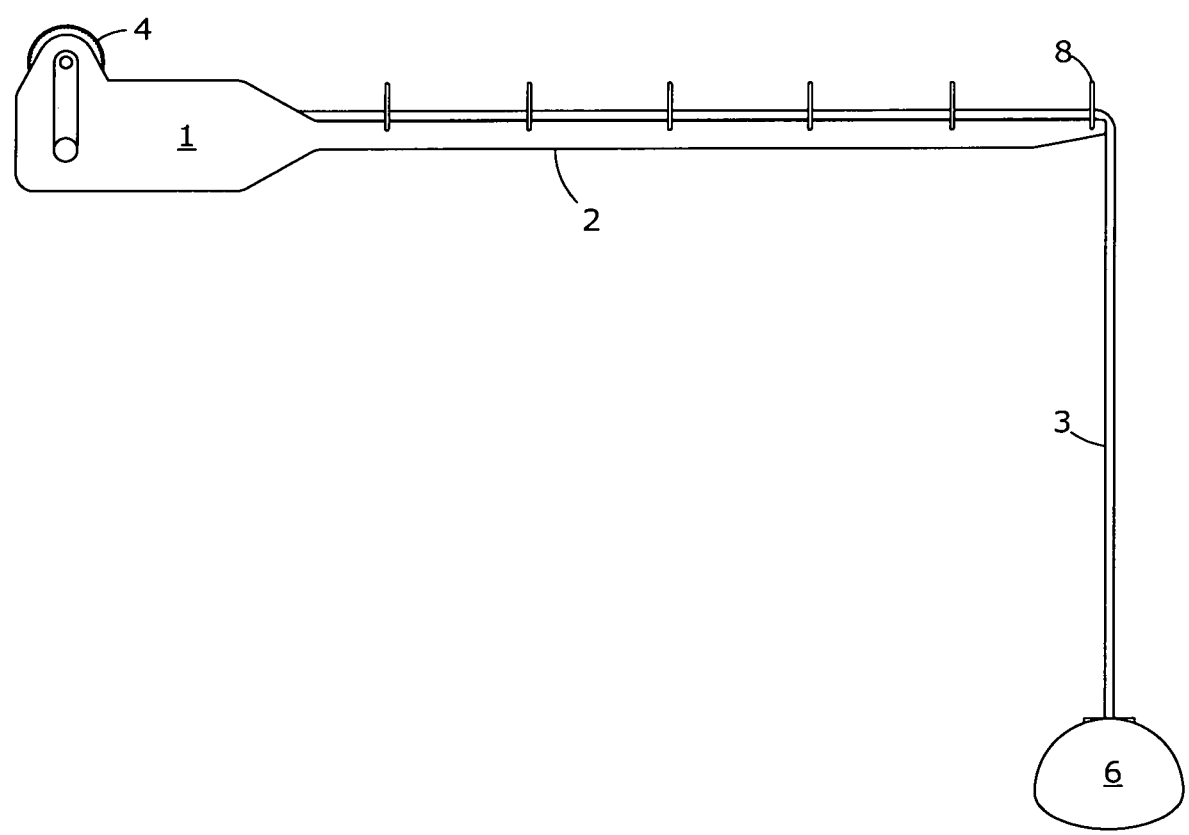
FIG. 11C shows a right view thereof, with a non-transparent container ball, which is open, and with a control panel visible, and with an external reel.
Figures 11D, 11E:
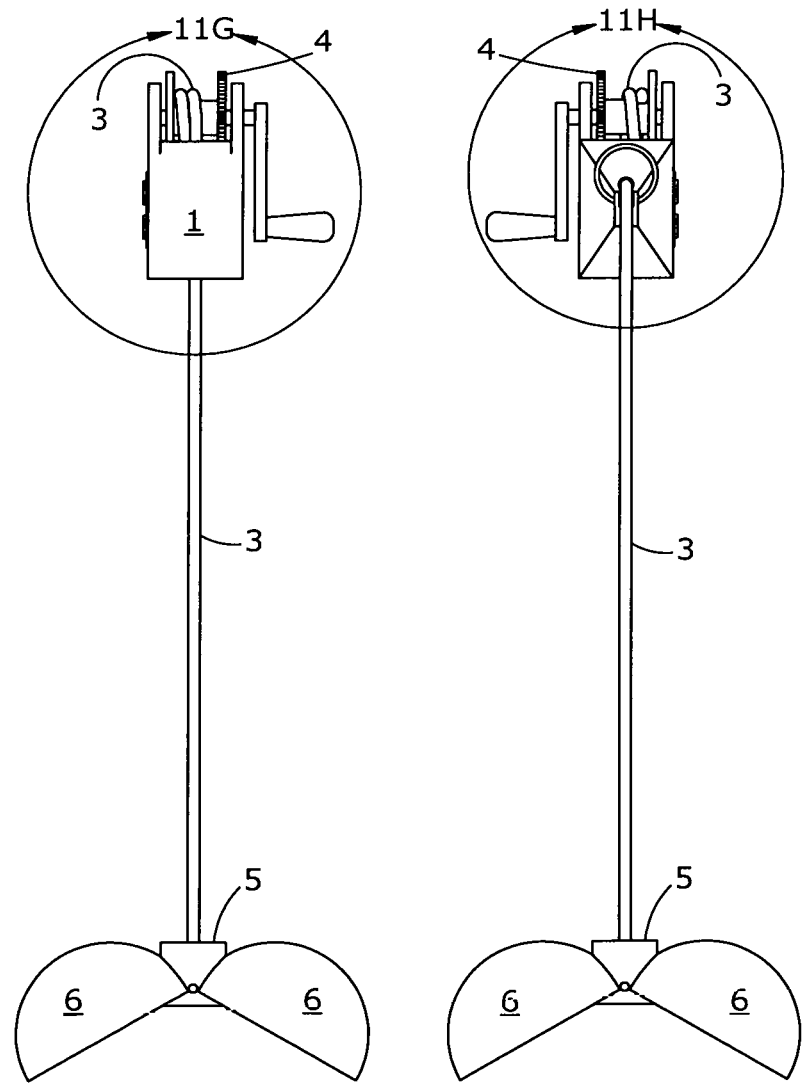
FIG. 11D shows a back view thereof.
FIG. 11E shows a front view thereof.

FIG. 11A shows a version of the eleventh embodiment of the apparatus, viewed from the right, with the container ball open. The external reel (4) is visible, and the drawing indicates that FIG. 11F shows a blown-up version of the reel.

FIGS. 11B-11E show the eleventh embodiments of the apparatus from different perspectives.

Figure 11F:
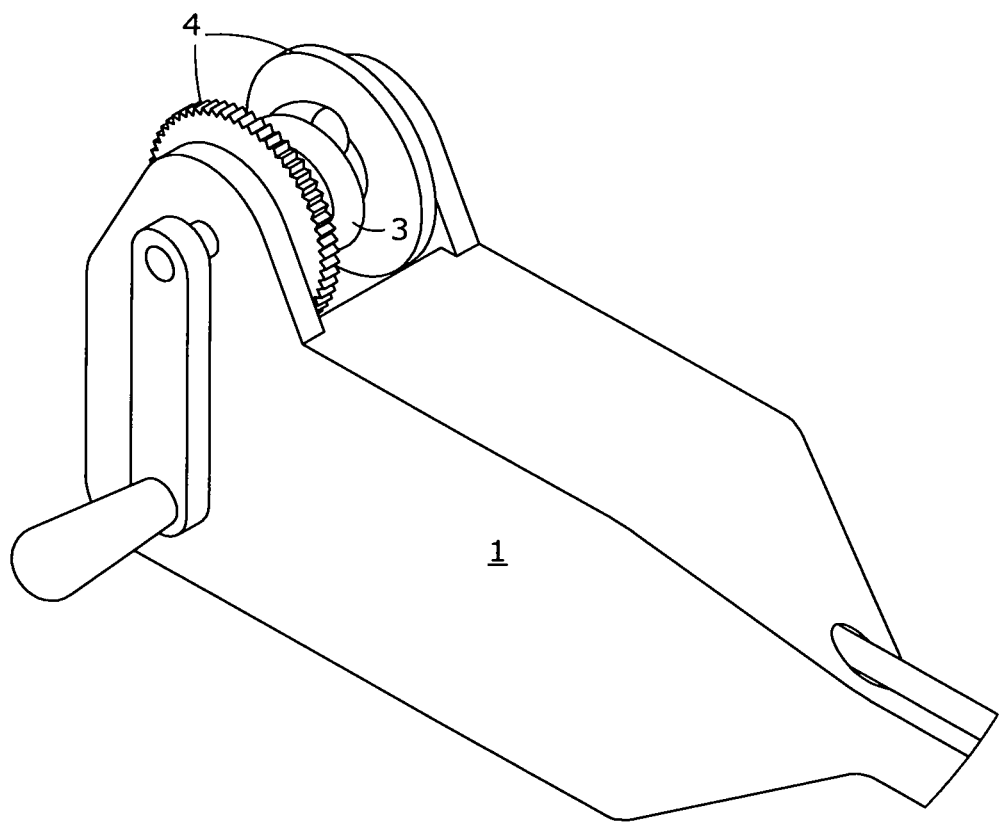
FIG. 11F shows a close-up view of a version of the handle and external reel that are part of the eleventh embodiment of the apparatus.
Figure 11G:
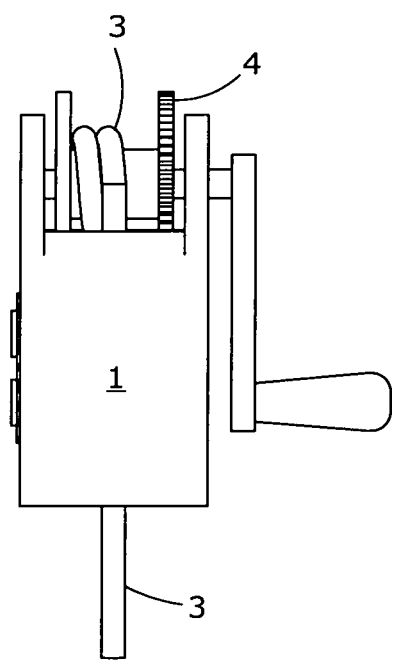
FIG. 11G shows a close-up back view thereof.
Figure 11H:
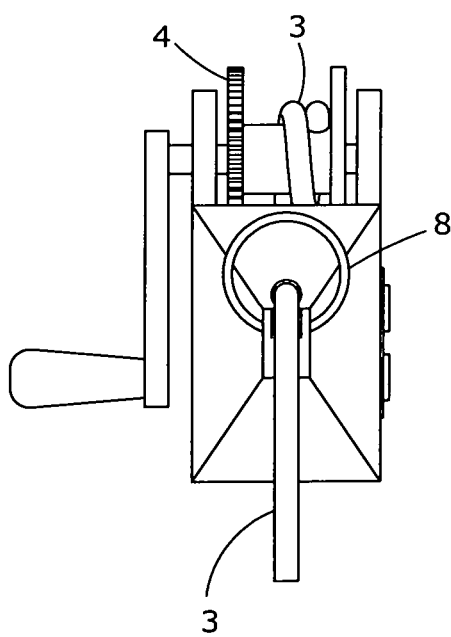
FIG. 11H shows a close-up front view thereof.

FIGS. 11F-11H show the external reel (4) from different perspectives.

Figure 12A:
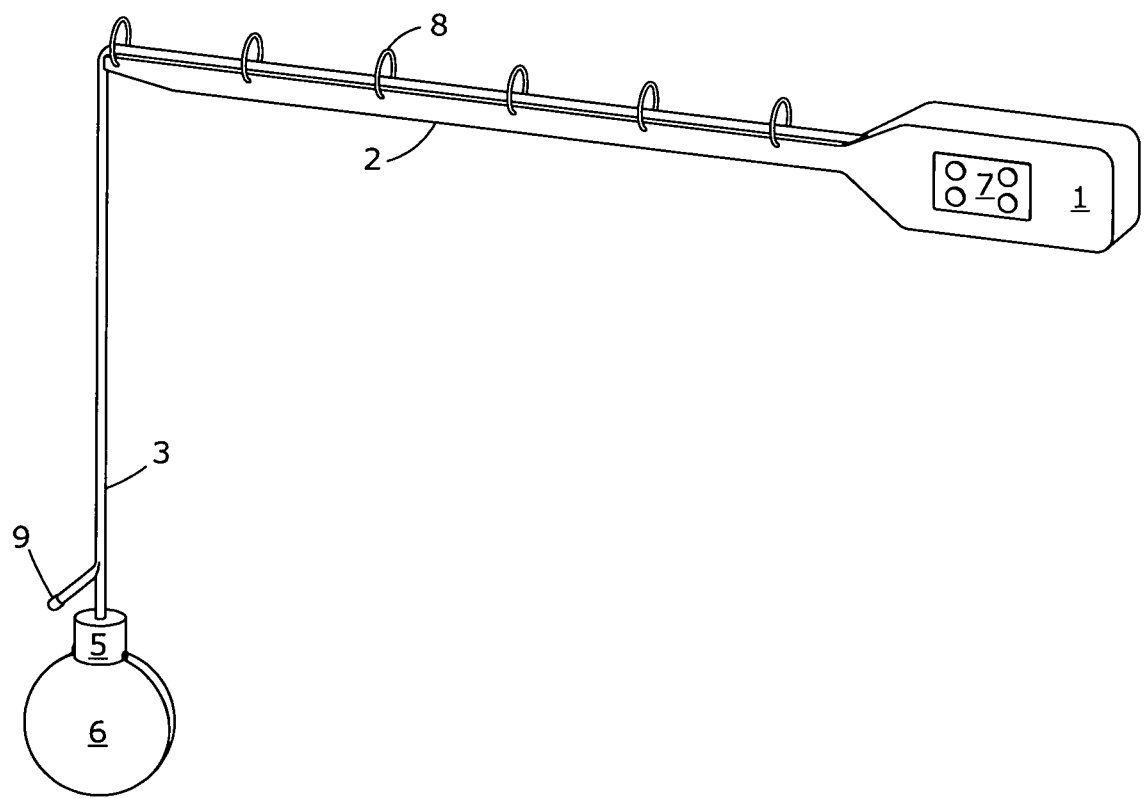
FIG. 12A shows a bird's-eye view of an example of the twelfth embodiment of the apparatus, with a non-transparent container ball, which is closed, and with a control panel visible, and with a light that is powered by a small wire that splits off from the main wire group above the container ball.
Figure 12B:
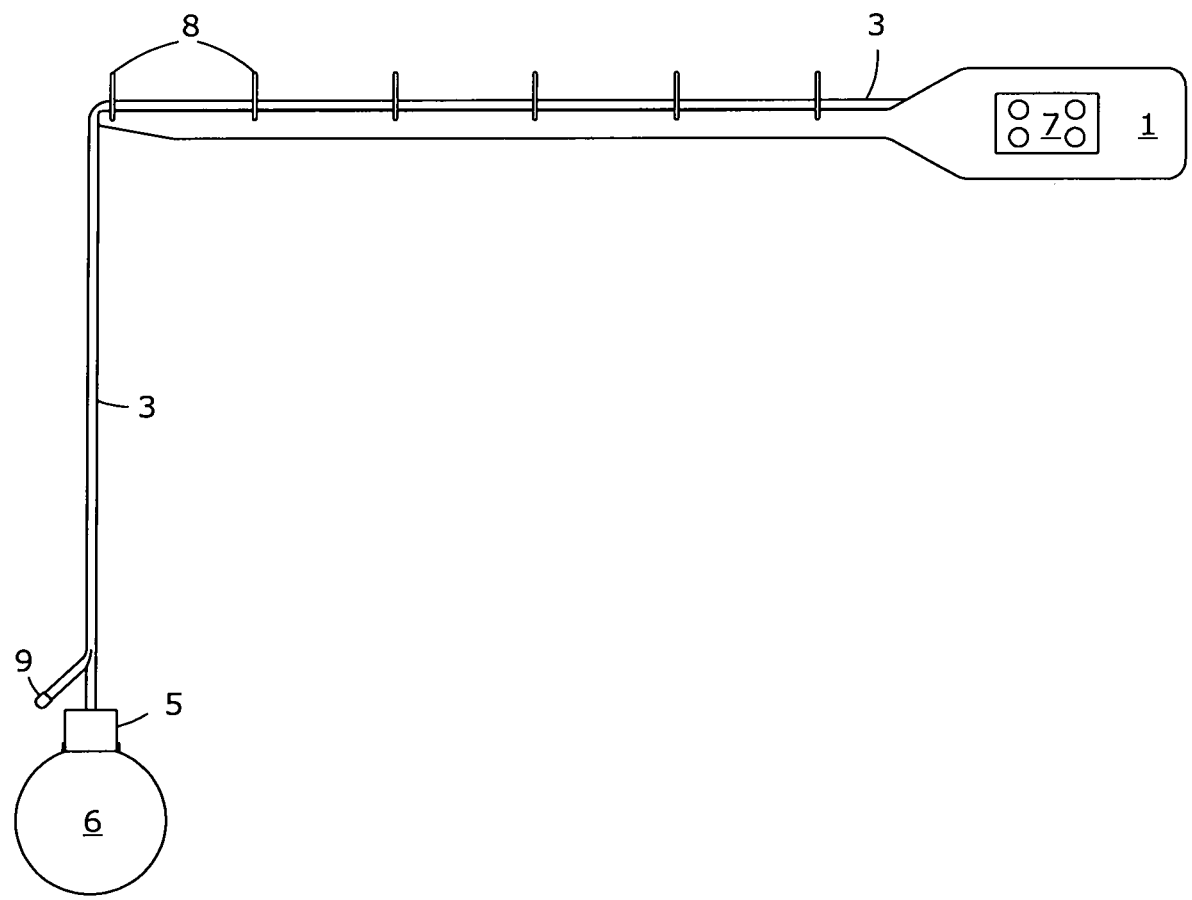
FIG. 12B shows a left view thereof, with a non-transparent container ball, which is closed, and with a control panel visible, and with a light that is powered by a small wire that splits off from the main wire group above the container ball.
Figure 12C:
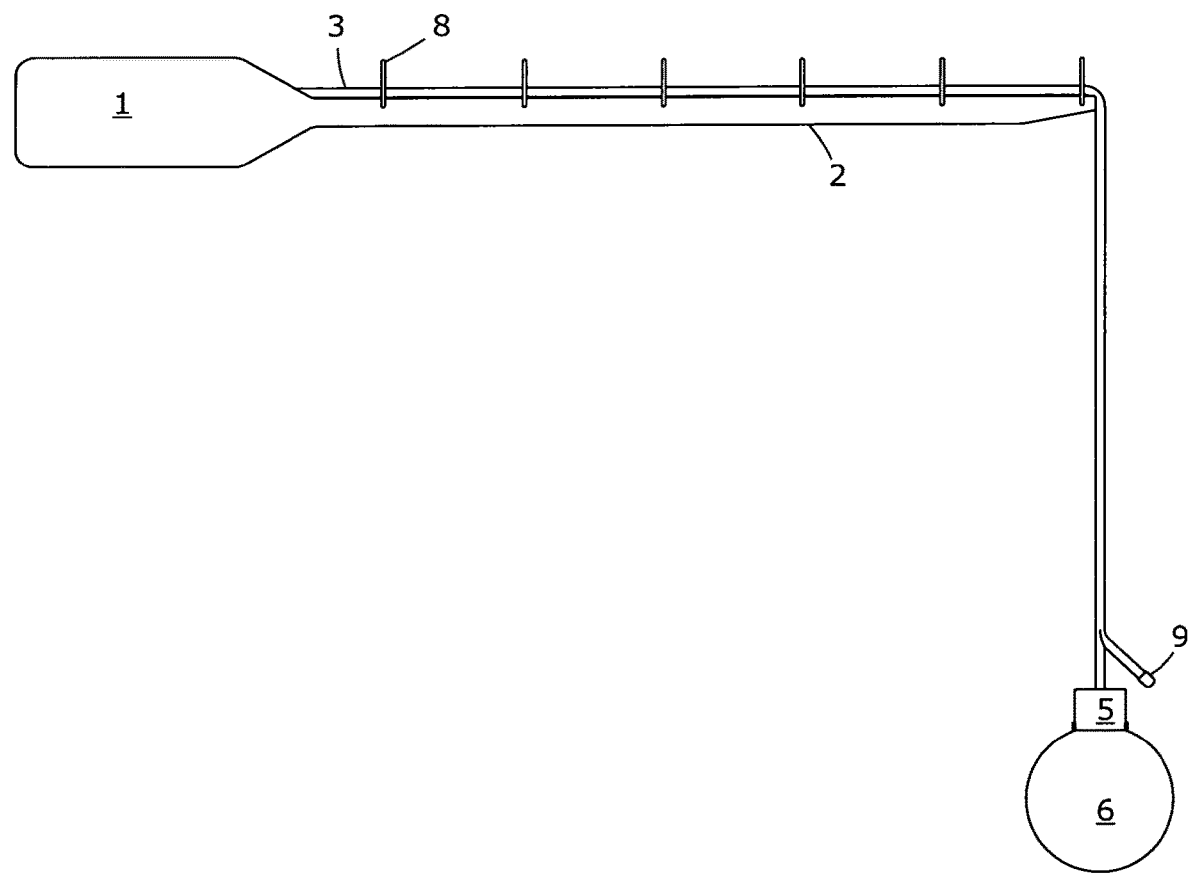
FIG. 12C shows a right view thereof, with a non-transparent container ball, which is closed, and with a light that is powered by a small wire that splits off from the main wire group above the container ball.
Figure 12D:
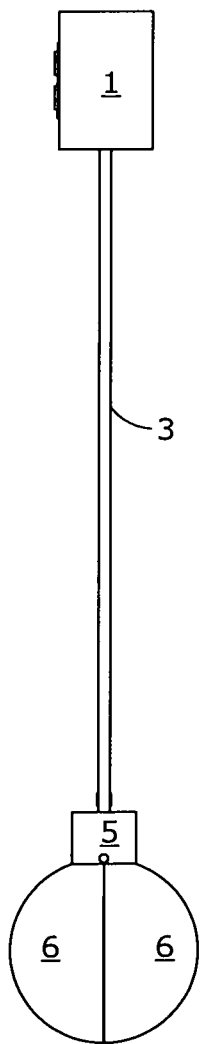
FIG. 12D shows a back view thereof.
Figure 12E:
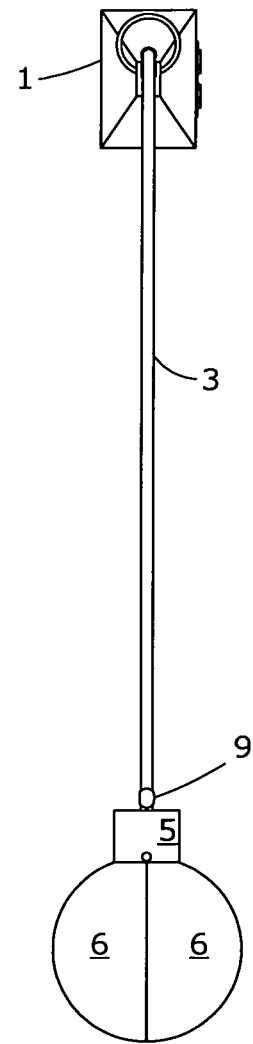
FIG. 12E shows a front view thereof.

FIG. 12A shows a version of the twelfth embodiment of the apparatus, viewed from the left, with the container ball closed. This version of the apparatus has the light powered by, and connected to, a separate small, insulated wire that splits off from the main wire group (2). The main wire group continues to the container ball (6).

FIGS. 12B-12E show the twelfth embodiment of the apparatus from several additional perspectives.

Figure 13A:
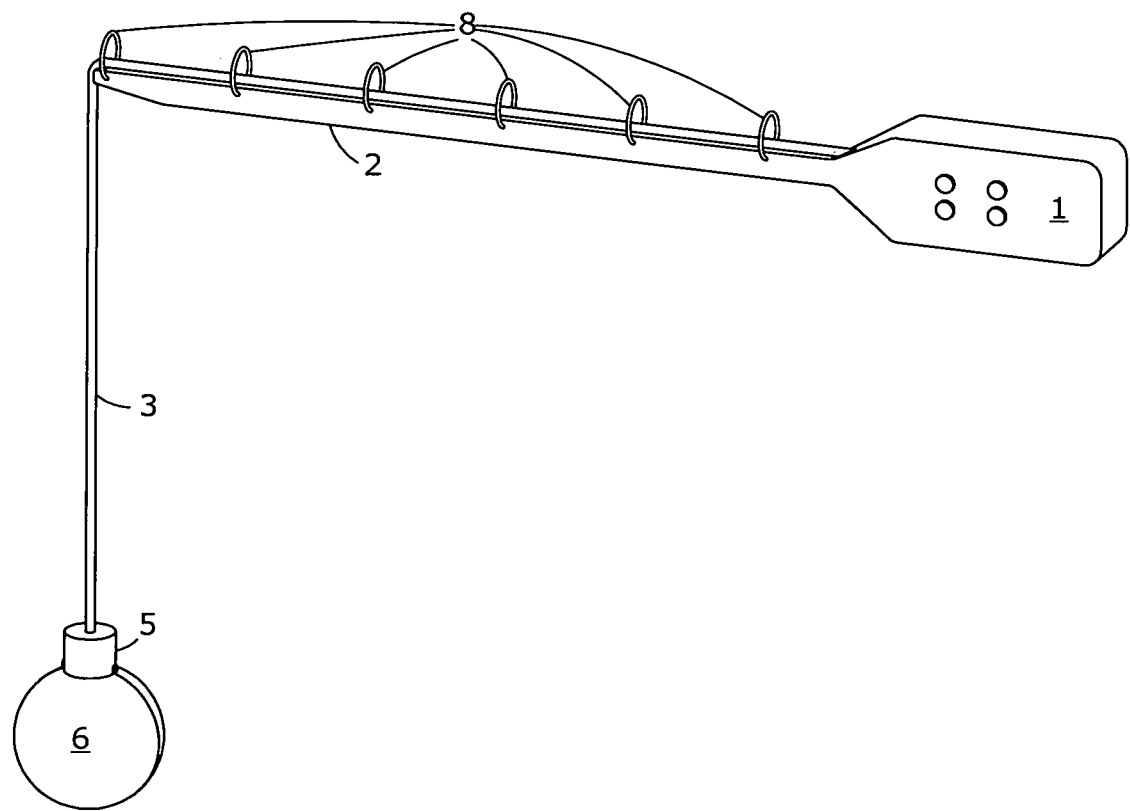
FIG. 13A shows a bird's-eye view of an example of the thirteenth embodiment of the invention, without a control panel, and with a non-transparent container ball, which is closed.
Figure 13B:
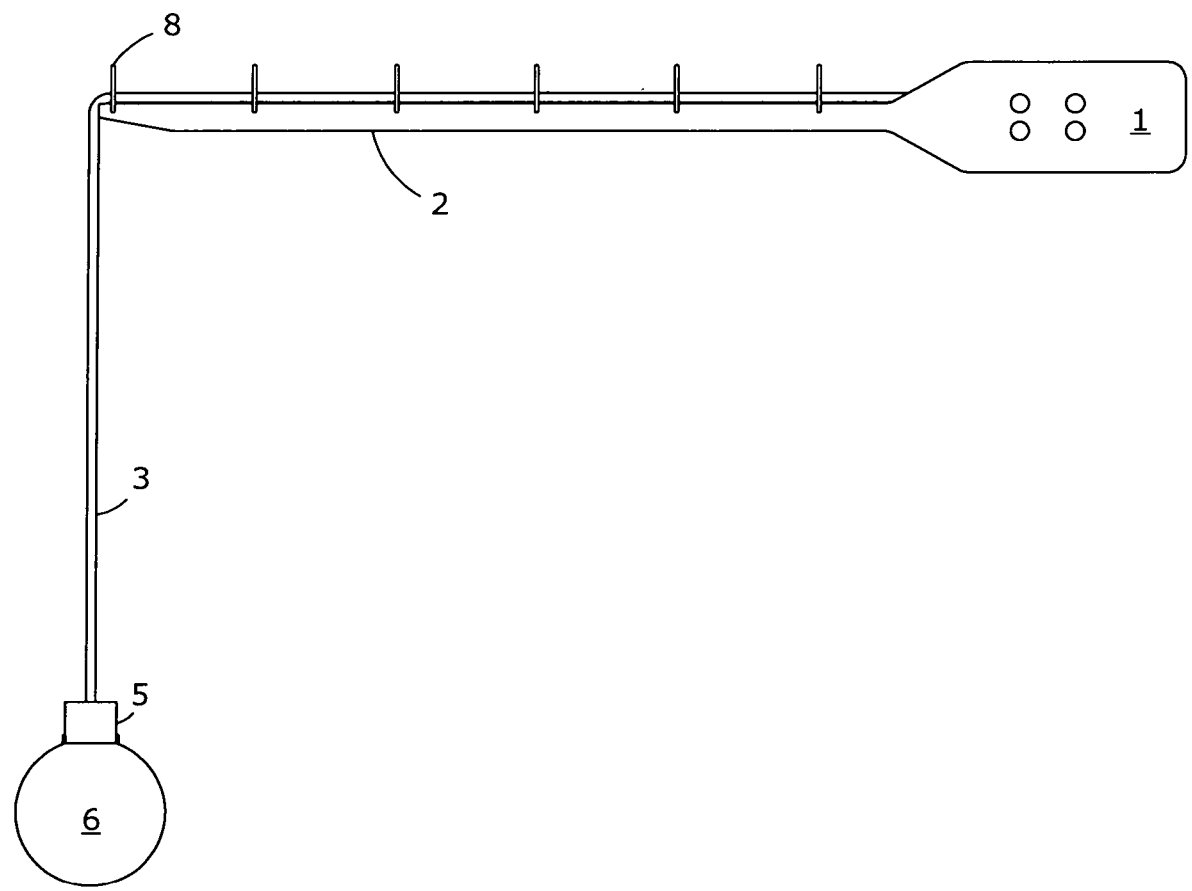
FIG. 13B shows a left view thereof, without a control panel, and with a non-transparent container ball, which is closed.
Figure 13C:
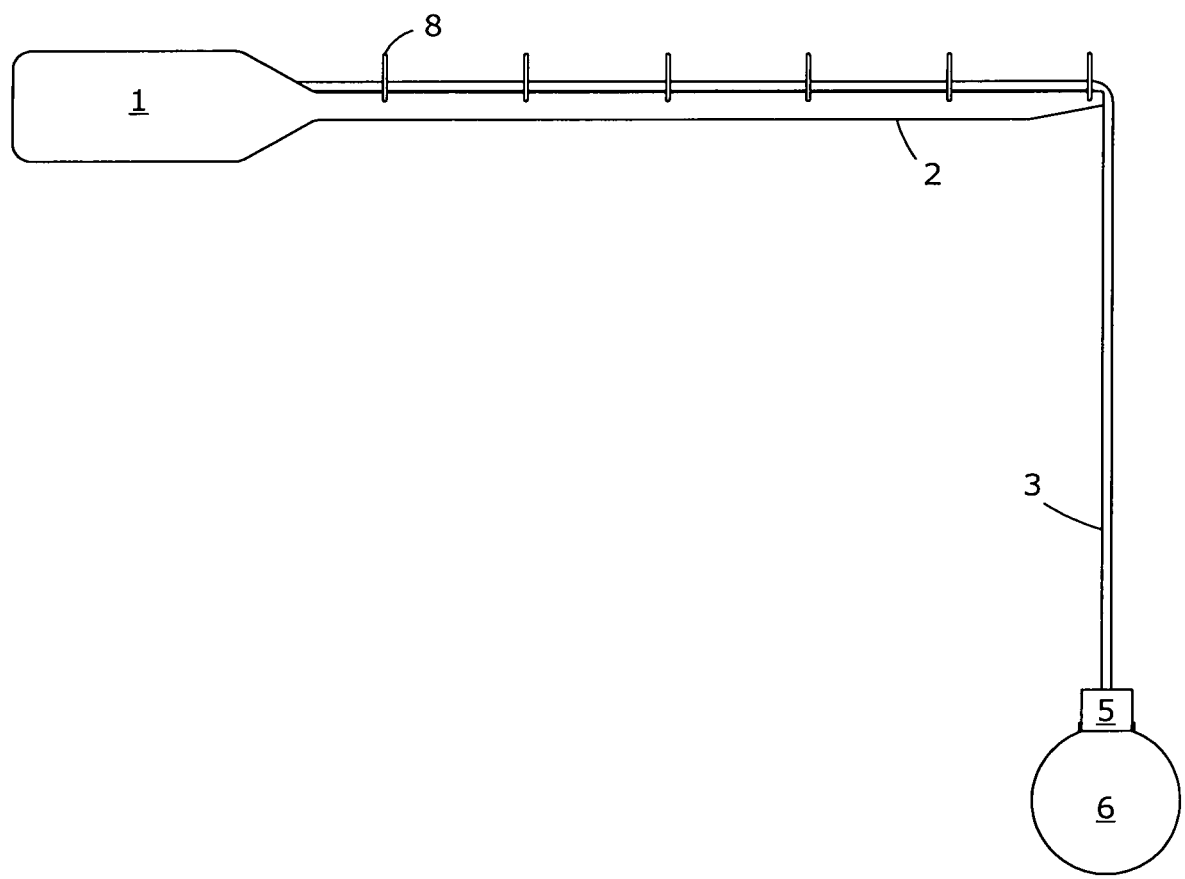
FIG. 13C shows a right view thereof, without a control panel, and with a non-transparent container ball, which is closed.
Figure 13D:
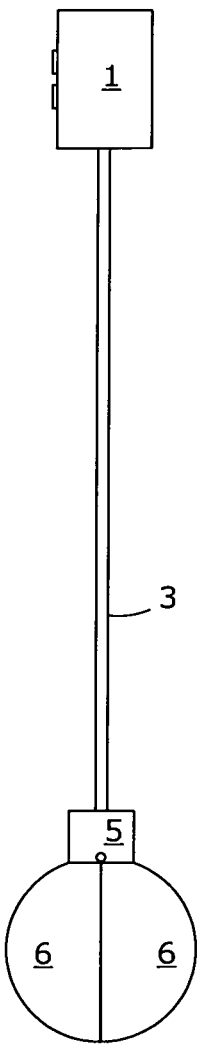
FIG. 13D shows a back view thereof.
Figure 13E:
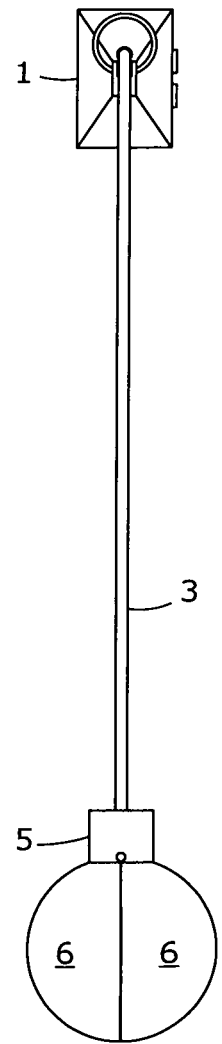
FIG. 13E shows a front view thereof.

FIG. 13A shows a version of the thirteenth embodiment of the apparatus, viewed from the left, with a non-transparent container ball, that is closed. The thirteenth embodiment does not have a specific control panel.

FIGS. 13B-13E show the thirteenth embodiment of the apparatus from several additional perspectives.

The invention claimed is:

1. A hand-held apparatus for safely trapping a small creature comprising:
a hollow container comprising an interior space configured to contain the creature and a covering creating a continuous wall surrounding the interior space, said covering defined by moveable sections connected to each other in at least one location;
a handle connected to the hollow container;
an electrically powered control unit that controls a means for moving the sections relative to one another;
said means for moving the sections configured to move the sections apart to create a gap between the sections while the sections remain connected at the at least one location for allowing the creature to enter the interior space and to move the sections together to create the continuous wall thereby preventing the creature from entering or exiting the interior space.

2. The apparatus of claim 1, further comprising:
a reel connected to a long rod; and
a main wire group comprising at least one insulated wire wound around said reel and extending along said rod, said main wire group connected to the hollow container and conveying electrical power from a power source to the control unit.

3. The apparatus of claim 2, wherein the reel is housed within the handle and said rod protrudes out of said handle, said handle further comprising an opening for the main wire group.

4. The apparatus of claim 2, wherein the rod is hollow and said main wire group extends through the hollow rod.

5. The apparatus of claim 2, further comprising rings spaced along the rod, said main wire group being threaded through said rings.

6. The apparatus of claim 2, further comprising a groove along a length the rod, said main wire group being located along the groove.

7. The apparatus of claim 1, wherein the hollow container is shaped like a ball.

8. The apparatus of claim 1, wherein the multiple movable sections are defined by two sections.

9. The apparatus of claim 1, wherein the means for moving the sections comprises electromagnets.

10. The apparatus of claim 1, further comprising one or more solar cells for providing electrical power to the apparatus.

11. The apparatus of claim 1, further comprising a light on or near the hollow container.

12. The apparatus of claim 1, wherein the apparatus is at least partially made of a transparent material.

13. The apparatus of claim 1, wherein the hollow container is made of a non-transparent material.

14. The apparatus of claim 1, wherein the apparatus is in wireless communication with an external computing device.

15. The apparatus of claim 1, wherein the apparatus further comprises a light within the interior space or bait placed on a protuberance within the interior space to encourage the creature to enter the interior space.

16. The apparatus of claim 1, further comprising a parameter influencer configured to alter a value of at least one parameter measured by one or more detectors.

17. A method for trapping a small creature in a way that does not physically harm said creature, said method comprising:
providing an apparatus comprising:
a hollow container comprising an interior space configured to contain the small creature and a covering creating a continuous wall surrounding the interior space, said covering being split into moveable sections connected to each other in at least one location;
a handle connected to the hollow container;
an electrically powered control unit that controls a means for moving the sections relative to one another;
said means for moving the sections configured to move the sections apart to create a gap between the sections while the sections remain connected at the at least one location for allowing the creature to enter the interior space and to move the sections together to create the continuous wall thereby preventing the creature from entering or exiting the interior space;
operating the control unit to move the sections apart to create the gap;
operating the control unit to move the sections together to form the continuous wall once the creature moves into the interior space of the hollow container thereby trapping the creature within the interior space.

18. The method of claim 17, wherein the apparatus further comprises one or more detectors located within the interior space configured to measure at least one parameter of water or air within the interior space and a display for displaying the measured at least one parameter.

19. The method of claim 18, wherein the at least one parameter is selected from the group consisting of Ph, salinity, nitrite concentration, oxygen concentration, and fluorine concentration.

20. The method of claim 18, wherein the apparatus wirelessly communicates with an external computing device.

21. The method of claim 20, wherein the external computing device transmits commands to the apparatus.

22. The method of claim 20, wherein the external computing device is configured with a creature database and a comparison module;
wherein said creature database stores information on an optimal value and tolerance ranges for the at least one parameter for one or more species; and
wherein said comparison module compares the optimal values and tolerance ranges in the creature database to a corresponding value of the at least one parameter measured by the one or more detectors.

23. The method of claim 22, wherein the apparatus further comprises a parameter influencer configured to alter the corresponding value of the at least one parameter measured by the one or more detectors based on output from the comparison module.

24. The method of claim 22, wherein the external computing device displays a warning if the corresponding value of the at least one parameter measured by the one or more detectors is outside the tolerance range for the at least one parameter.

25. The method of claim 24, wherein the comparison module automatically sends a command to a parameter influencer configured to alter the corresponding value of the at least one parameter measured by the one or more detectors based on output from the comparison module.

26. The method of claim 18, wherein the apparatus further comprises one or more transmitters for transmitting measurements by the one or more detectors to the display.

27. The method of claim 17, wherein the apparatus further comprises a light within the interior space or bait placed on a protuberance within the interior space to encourage the creature to enter the interior space.

28. The method of claim 17, wherein the apparatus further comprises:
   a reel connected to a long rod; and
   a main wire group comprising at least one insulated wire wound around said reel and extending along said rod, said main wire group connected to the hollow container and conveying electrical power from a power source to the control unit.

* * * * *